AUTOMATIC SEQUENCE CONTROLLED COMPUTER

Filed Oct. 2, 1959 29 Sheets-Sheet 1

INVENTORS
EDWARD W. HEMING
PHILIP E. RENSHAW
MARION R. DILLING
STEWART D. BARGER
BY
Mellin and Hanscom
ATTORNEYS

INVENTORS
EDWARD W. HEMING
PHILIP E. RENSHAW
MARION R. DILLING
STEWART D. BARGER

BY Mellin and Hanscom
ATTORNEYS

INVENTORS
EDWARD W. HEMING
PHILIP E. RENSHAW
MARION R. DILLING
STEWART D. BARGER
BY
Mellin and Hanscom
ATTORNEYS INVENTORS
EDWARD W. HEMING
PHILIP E. RENSHAW
MARION R. DILLING
STEWART D. BARGER
BY
Mellin and Hanscom
ATTORNEYS INVENTORS
EDWARD W. HEMING
PHILIP E. RENSHAW
MARION R. DILLING
STEWART D. BARGER
BY
Mellin and Hanscom
ATTORNEYS

AUTOMATIC SEQUENCE CONTROLLED COMPUTER

Filed Oct. 2, 1959 29 Sheets-Sheet 6

INVENTORS
EDWARD W. HEMING
PHILIP E. RENSHAW
MARION R. DILLING
STEWART D. BARGER
BY
Mellin and Hanscom
ATTORNEYS June 23, 1964 E. W. HEMING ETAL 3,138,702

AUTOMATIC SEQUENCE CONTROLLED COMPUTER

Filed Oct. 2, 1959 29 Sheets-Sheet 7

INVENTORS
EDWARD W. HEMING
PHILIP E. RENSHAW
MARION R. DILLING
STEWART D. BARGER

BY

Meelin and Hanscom
ATTORNEYS

AUTOMATIC SEQUENCE CONTROLLED COMPUTER

Filed Oct. 2, 1959 29 Sheets-Sheet 8

INVENTORS
EDWARD W. HEMING
PHILIP E. RENSHAW
MARION R. DILLING
STEWART D. BARGER

BY Mellin and Hanscom
ATTORNEYS

AUTOMATIC SEQUENCE CONTROLLED COMPUTER

INVENTORS
EDWARD W. HEMING
PHILIP E. RENSHAW
MARION R. DILLING
STEWART D. BARGER
BY
Mellin and Hanscom
ATTORNEYS

AUTOMATIC SEQUENCE CONTROLLED COMPUTER

INVENTORS
EDWARD W. HEMING
PHILIP E. RENSHAW
MARION R. DILLING
STEWART D. BARGER
BY
Mellin and Hanscom
ATTORNEYS

AUTOMATIC SEQUENCE CONTROLLED COMPUTER

Filed Oct. 2, 1959 29 Sheets-Sheet 11

INVENTORS
EDWARD W. HEMING
PHILIP E. RENSHAW
MARION R. DILLING
STEWART D. BARGER
BY
Mellin and Hanscom
ATTORNEYS

AUTOMATIC SEQUENCE CONTROLLED COMPUTER

Filed Oct. 2, 1959 29 Sheets-Sheet 12

INVENTORS
EDWARD W. HEMING
PHILIP E. RENSHAW
MARION R. DILLING
STEWART D. BARGER
BY
Mellin and Hanscom
ATTORNEYS

AUTOMATIC SEQUENCE CONTROLLED COMPUTER

INVENTORS
EDWARD W. HEMING
PHILIP E. RENSHAW
MARION R. DILLING
STEWART D. BARGER

BY

Mellin and Hanscom
ATTORNEYS

INVENTORS
EDWARD W. HEMING
PHILIP E. RENSHAW
MARION R. DILLING
STEWART D. BARGER
BY
Mellin and Hanscom
ATTORNEYS

AUTOMATIC SEQUENCE CONTROLLED COMPUTER

Filed Oct. 2, 1959 29 Sheets-Sheet 15

INVENTORS
EDWARD W. HEMING
PHILIP E. RENSHAW
MARION R. DILLING
STEWART D. BARGER

BY

Mellin and Hanscom
ATTORNEYS

AUTOMATIC SEQUENCE CONTROLLED COMPUTER

Filed Oct. 2, 1959 29 Sheets-Sheet 16

INVENTORS
EDWARD W. HEMING
PHILIP E. RENSHAW
MARION R. DILLING
STEWART D. BARGER

BY Mellin and Hanscom
ATTORNEYS

INVENTORS
EDWARD W. HEMING
PHILIP E. RENSHAW
MARION R. DILLING
STEWART D. BARGER
BY
Mellin and Hanscom
ATTORNEYS

AUTOMATIC SEQUENCE CONTROLLED COMPUTER

Filed Oct. 2, 1959

INVENTORS
EDWARD W. HEMING
PHILIP E. RENSHAW
MARION R. DILLING
STEWART D. BARGER
BY
Meelin and Hanscom
ATTORNEYS INVENTORS
EDWARD W. HEMING
PHILIP E. RENSHAW
MARION R. DILLING
STEWART D. BARGER
BY
Mellin and Hanscom
ATTORNEYS INVENTORS
EDWARD W. HEMING
PHILIP E. RENSHAW
MARION R. DILLING
STEWART D. BARGER
BY
Mellin and Hanscom
ATTORNEYS INVENTORS
EDWARD W. HEMING
PHILIP E. RENSHAW
MARION R. DILLING
STEWART D. BARGER
BY
Mellin and Hanscom
ATTORNEYS INVENTOR.
EDWARD W. HEMING
PHILIP E. RENSHAW
MARION R. DILLING
STEWART D. BARGER
BY
Mellin and Hanscom
ATTORNEYS INVENTORS
EDWARD W. HEMING
PHILIP E. RENSHAW
MARION R. DILLING
STEWART D. BARGER
BY
Mellin and Hanscom
ATTORNEYS INVENTORS
EDWARD W. HEMING
PHILIP E. RENSHAW
MARION R. DILLING
STEWART D. BARGER
BY
Mellin and Hanscom
ATTORNEYS

AUTOMATIC SEQUENCE CONTROLLED COMPUTER

Filed Oct. 2, 1959

INVENTORS
EDWARD W. HEMING
PHILIP E. RENSHAW
MARION R. DILLING
STEWART D. BARGER

BY Mellin and Hanscom
ATTORNEYS

INVENTORS
EDWARD W. HEMING
PHILIP E. RENSHAW
MARION R. DILLING
STEWART D. BARGER
BY
Mellin and Hanscom
ATTORNEYS

INVENTORS
EDWARD W. HEMING
PHILIP E. RENSHAW
MARION R. DILLING
STEWART D. BARGER

BY Mellin and Hanscom
ATTORNEYS

INVENTORS
EDWARD W. HEMING
PHILIP E. RENSHAW
MARION R. DILLING
STEWART D. BARGER
BY
Mellin and Hanscom
ATTORNEYS INVENTORS
EDWARD W. HEMING
PHILIP E. RENSHAW
MARION R. DILLING
STEWART W. BARGER
BY
Mellin and Hanson
ATTORNEYS United States Patent Office 3,138,702

Patented June 23, 1964

3,138,702

AUTOMATIC SEQUENCE CONTROLLED COMPUTER

Edward W. Heming, Philip E. Renshaw, Marion R. Dilling, and Stewart D. Barger, Seattle, Wash., assignors to Tally Register Corporation, Seattle, Wash., a corporation of Washington Filed Oct. 2, 1959, Ser. No. 844,047
17 Claims. (Cl. 235—157)

This invention relates to typewriter controlled computer units and more specifically relates to apparatus for carrying out one or more predetermined programs of calculating operations as selected by the operator.

More particularly, the present invention finds use in business machines of the type used in standardized accounting procedures. An illustrative example of such a procedure is the preparation of monthly statements to be sent out to customers of a business. Such statements usually involve a large number of additions, subtractions and multiplications even though the number of business transactions may be few, and will often contain errors due to the inattention of the operator because of the tedious nature of the task.

The present invention seeks to avoid these errors by reducing the amount of work done by the operator, so that the operator will only have to feed a minimum of numerical information into the computer. The computer will then do all of the computations required on the information fed to it and will automatically type out the answers on the statement.

The computer used with the present invention is designed to add, subtract and multiply numbers and can operate upon any problem which can be reduced to a combination of these functions. However, the computer alone will perform only one function at a time, and will stop after each function is complete until it is instructed to perform the next function. It would, of course, be possible for the operator to issue the new instruction every time the computer finishes a function, but this would introduce relatively large time delays since computers are designed to work on millisecond or microsecond time bases. In addition, if the operator were to issue each instruction, this would merely introduce another source of human error.

The primary purpose of this invention is to provide a device for issuing a series of predetermined instructions to a computer in order to carry out a desired program of operations upon numerical information fed to the computer from a typewriter.

It is a further object to provide such a device as will also instruct the typewriter to perform various predetermined operations while the computer is performing its operations.

Another object of the invention is to provide a programming apparatus for use with a typewriter-computer unit which will sequentially instruct the computer to perform predetermined operations upon numerical information fed to it from the typewriter, with each new instruction being given after a previously instructed operation has been completed, and in which the programming apparatus also contacts the operations of the typewriter to cause predetermined typewriter operation as required in the complete program of operation.

Another object of the invention is to provide convenient means for switching from one program of operations to another program when the operator decides to change programs.

A further object of the invention is to provide a stepping relay having a plurality of sequentially closable contacts, means to sequentially close the stepping relay contacts, means to use the sequentially closed contacts in circuit to sequentially energize predetermined units of a computer so that a desired sequence of computer functions will occur, and in which the means to use the sequentially closed contacts will be delayed until a previous computer function is complete, so that the next program step will always wait until the previous step is completed.

Yet another object of the invention is to provide a plurality of stepping relays as above in which the last instruction from one relay can be used to start another stepping relay into operation so that chains of instructions can be given by two or more of the stepping relays, as required, without a break in the operation and without requiring human attention.

Still another object of the invention is to provide a programming device as set forth in the above objects which will cause typewriter functions to occur as needed in a program, but which will allow the operator to set the column width and format as necessary for a given size paper without interference with the programmed operation.

A further object of the invention is to provide a programming device for use with a computer unit having a plurality of transfer units for carrying out addition, subtraction and multiplication functions and in which the programming device will issue a series of signals in a predetermined manner to sequentially energize the appropriate transfer means to perform the steps of a predetermined program.

Other objects and advantages will become apparent in the course of the following detailed description.

In the drawings, forming a portion of this application, and in which like parts are designated by like reference numerals throughout the same, FIG. 1 is a perspective view of the combined typewriter and computer unit.

FIGS. 22 through 41 are circuit diagrams of the computer and program units, in which FIG. 22 is a circuit diagram of the power supply.

FIG. 23 is a circuit diagram of the G-pulse generator.

FIG. 24 is a circuit diagram of the S-pulse generator.

FIG. 25 is a circuit diagram of the J- and K-pulse generators.

FIG. 26 is a circuit diagram of the emitter.

FIGS. 27, 28 and 29 show the circuits of the A register counters and control relays. FIG. 27 also shows the IOB restore relays, FIG. 28 also shows the diode used as filters, and FIG. 29 also shows the A register sign detection circuits.

FIG. 30 shows schematically the circuits of the B register.

FIG. 31 shows schematically the circuits of the C and D registers.

FIGS. 32 and 33 illustrate the read-out circuits and a portion of the IOB storage relays.

FIGS. 34, 35 and 36 illustrate the remainder of the IOB storage relays. In addition, FIGS. 34 and 35 illustrate the IOB read-out contacts and FIG. 36 shows the input circuits to the IOB.

FIG. 37 shows the circuits for the multiplication and shift-right functions.

FIG. 38 illustrates the connections between the programmer relays and the typewriter operating devices, and also illustrates the encoder system within the programmer for the entry of numerical information into the IOB from other than the typewriter.

FIG. 39 illustrates the output terminals of the stepper relays of the programmer and the plugboard hubs to which the terminals are connected.

FIG. 40 illustrates the program stepper relays and the controls therefor.

FIG. 41 shows the circuits for the selection of different programs and also illustrates the relays used for plus, minus or reverse entry of numbers from the IOB into different registers.

GENERAL DESCRIPTION OF THE TYPEWRITER AND COMPUTER UNIT

Figure 1:
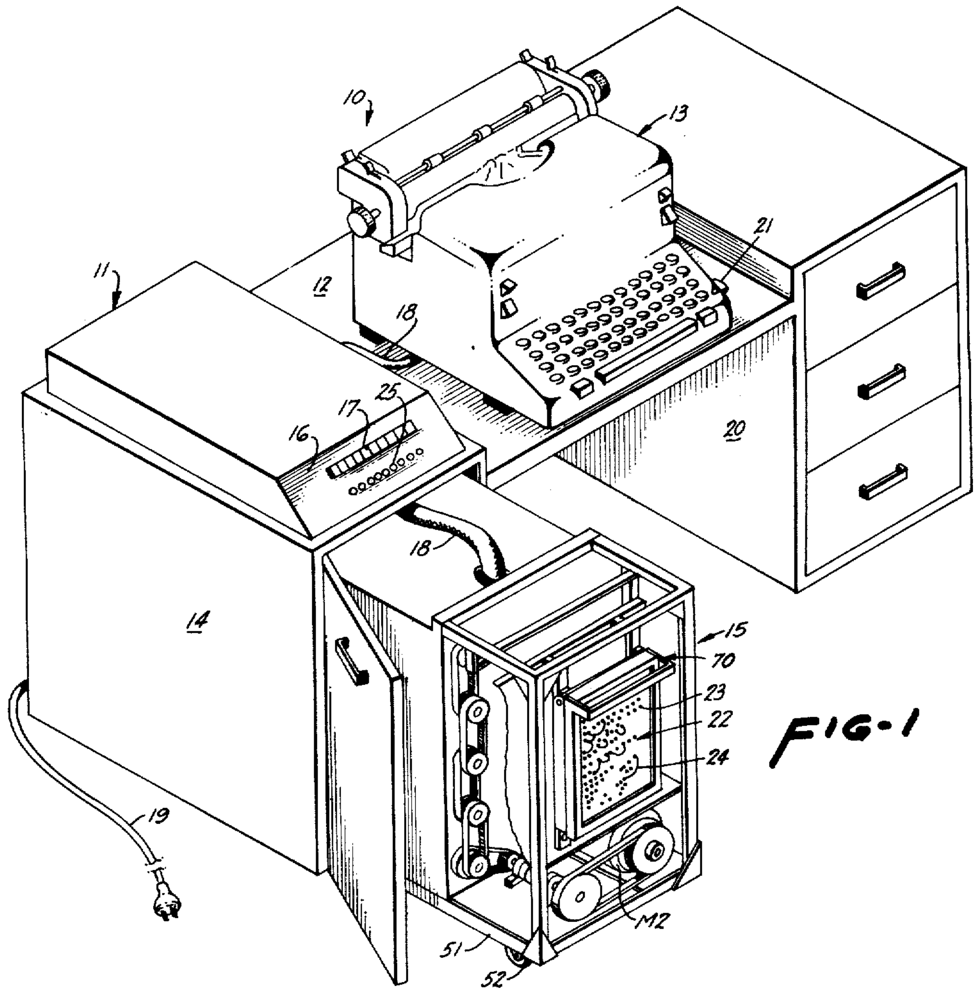
Figure 2:
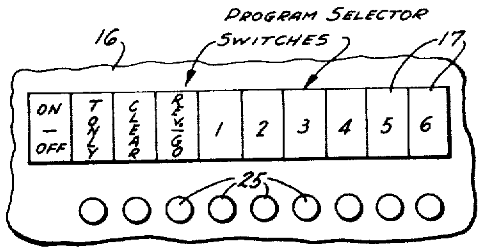
FIG. 2 is a view of the control panel, illustrating the various controls located thereon.

Referring to FIG. 1, wherein shown the combined typewriter and computer unit 10, a console 11 is provided, having a center shelf 12 supporting an electric typewriter 13, and a left pedestal 14 housing the computer unit 15. The upper front surface of the left pedestal comprises a control panel 16 having a plurality of manually operable pushbuttons 17 thereon (FIG. 2). Pilot lights 25 are associated with the pushbuttons 17, one light for each button, except for the "OFF-ON" button, to indicate when the computer unit is in program, as will be discussed hereinafter. A cable 18 provides electrical communication between the typewriter and computer unit, and a line cord 19 is provided to supply power to the typewriter and computer from any suitable power source.

The right pedestal 20 of the console is provided for storage space. The typewriter is provided with a palm operable switch 21, which is operable by the typist, and will be hereinafter referred to as the "Go" button. The purpose of this switch will be explained in full detail in thet following description.

The computer unit is provided with a removable plugboard 22 on the front end thereof. The plugboard has a plurality of hubs 23 into which jumper wires 24 may be plugged, for purposes to be described hereinafter.

Figure 3:
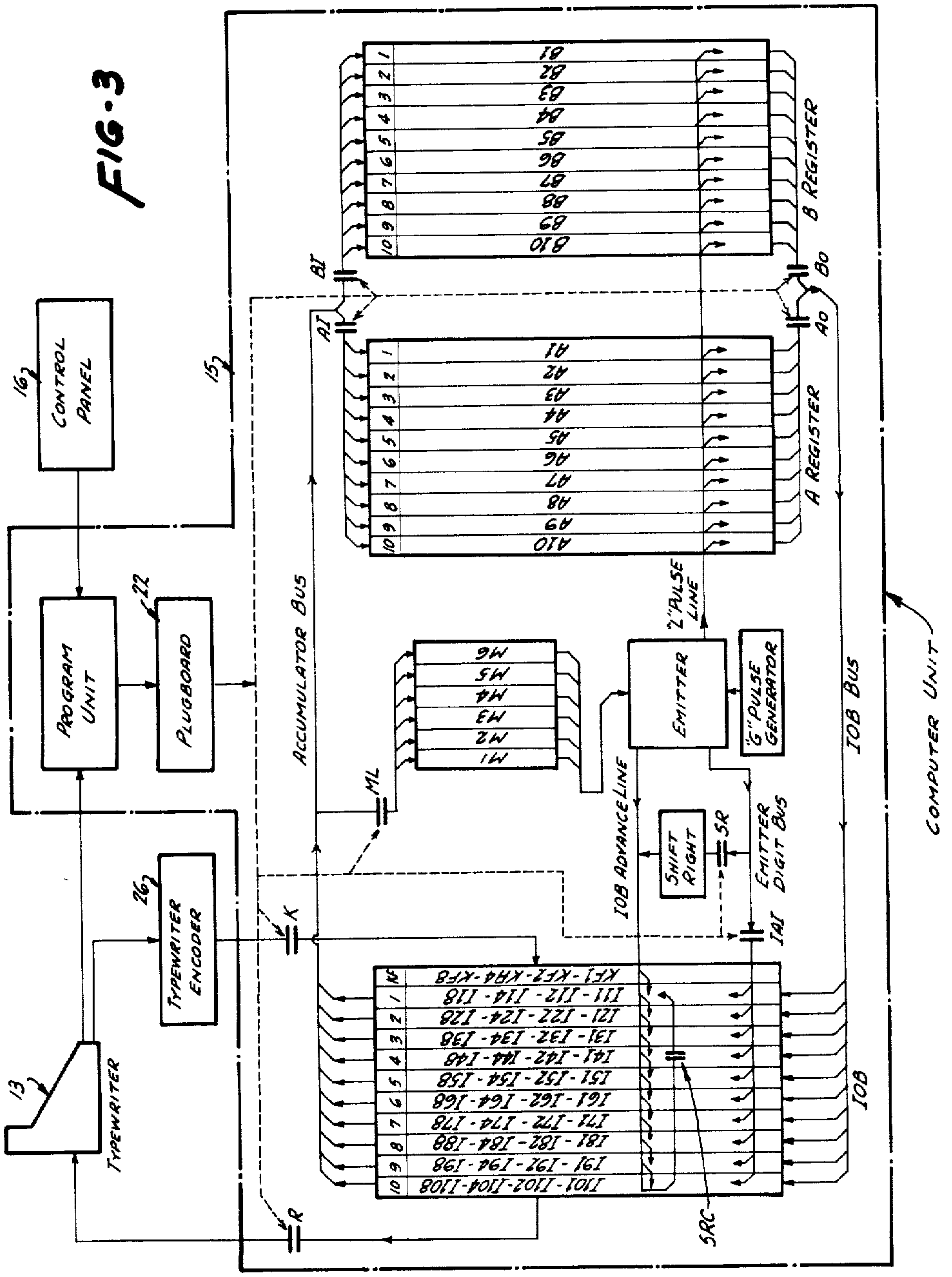
FIG. 3 is a block diagram of the combined typewriter, program unit and computer unit, illustrating the interfunctional relationships of the various units.

Referring now to the block diagram of FIG. 3, the general cooperation of the typewriter and computer unit and the internal functions of the computer unit will be described, it being understood that the specific details of the manner of cooperation and functioning will be described in greater detail hereinafter.

The typewriter 13 may be used by the typist in a normal manner until it is desired to start an automatic program of operation. The typist then presses an appropriate pushbutton 17 on the control panel 16 to cause the "program unit" to start into operation, sending a series of command signals through the plugboard 22 to the various components of the computer unit 15. The sequence of steps in the program will be determined by the manner in which the plugboard is jumper-wired.

If it is desired to enter numerical information into the computer unit from the typewriter, the command signal from the program unit is used to close the K contacts. Thereafter, the operation of a typewriter number key by the typist will send a signal through the typewriter encoder 26 which converts the signal into a binary-excess three code. This code signal then enters the IOB.

The IOB is an eleven position, non-accumulating binary-code storage unit, arranged in decade fashion, so that any number up to ten digits in length may be entered therein. All digits entering the computer unit from the typewriter are first entered into the KF (key follower) section of the IOB. A G pulse is then applied to the IOB "advance line" to shift the contents of each of the IOB positions one position to the left; i.e., to the next highest order position. That is, the digit which has been entered from the typewriter into the KF section will be transferred to the IOB position 1. The next digit entered from the typewriter is again stored in the KF section and another G pulse is applied to the IOB advance line to shift the digit in the first position to the second position and to shift the digit in the KF section to the first position. The entry of additional digits will cause the same thing to occur; namely, the new digit will go into the KKF section and then all digits in the IOB positions will be shifted to the next highest order position.

After the desired number of digits has been entered, the typist presses on the "Go" button 21 on the typewriter to instruct the program unit to resume the program operation. If the program calls for the numbers in the IOB to be transferred to the A register, the program unit will send command signals through the plugboard to close the AI contacts and the IAI contacts and will cause the emitter to send a series of pulses through the IAI contacts into the IOB to read out the IOB contacts to the accumulator bus. The IOB contacts pass through this bus and through the closed AI contacts into the A register.

The A register is a ten-position, decimal-accumulating register, with the positions arranged in decade fashion, designed to accumulate numbers up to ten digits in length. The B register, and the C and D registers (not shown on the diagram), are also ten-position, decimal-accumulating registers.

If the program calls for a multiplication, the program unit closes the K contacts to allow the typist to enter the multiplier into the IOB as above described. The program unit will then close the ML contacts and cause the emitter to transfer the IOB contacts into the multiplier register. The typist then types the multiplicand into the IOB and the program unit causes the emitter to transfer the IOB contents to the A register for a number of times equal to the last digit of the multiplier. A pulse on the IOB advance line then shifts the multiplicand one position to the left in the IOB and the emitter then transfers the IOB contents to the A register for a number of times equal to the next to last digit in the multiplier. This process continues until the IOB contents have been transferred to the A register in accordance with the digits of the multiplier.

If there is to be a shift right operation, because of decimals in the multiplication, the program unit causes the AO contacts to close, and causes the L pulse from the emitter to transfer the A register contents back into the IOB. If the decimal point is to be shifted to the left two places, the correct result will be obtained by shifting the digits in the IOB two places to the right, since the decimal should be between the second and third positions of the IOB.

To shift the IOB two positions to the right, a series of eight pulses is sent through the SR contacts and the Shift Right section to shift the IOB eight times to the left. The contents of the tenth position of the IOB are shifted back to the first position through the SRC contacts each time and the final result is the same as if the IOB positions had each been shifted twice to the right.

If it is desired to have the contents of any register read out to the typewriter, the program unit will cause the contents of a register to be transferred to the IOB. The contents of the tenth position of the IOB are interrogated and a pulse is sent out through the R contacts to operate a typewriter key in accordance with the tenth position contents. The IOB contents are then shifted one position to the left, and the tenth position (formerly the ninth position) is again read out to the typewriter. The same sequence of shifting and reading continues until all of the IOB contents have been read out to the typewriter.

As is seen in the above, all communication between the typewriter and IOB is in serial form, with the digits entering the KF position of the IOB from the typewriter and with the digits leaving the tenth position of the IOB to go to the typewriter. However, communication between the IOB and an accumulating register is in broadside manner; i.e., all ten positions of the IOB are transferred simultaneously to the ten positions of an accumulating register, or vice versa.

POWER SUPPLY

Figure 22:
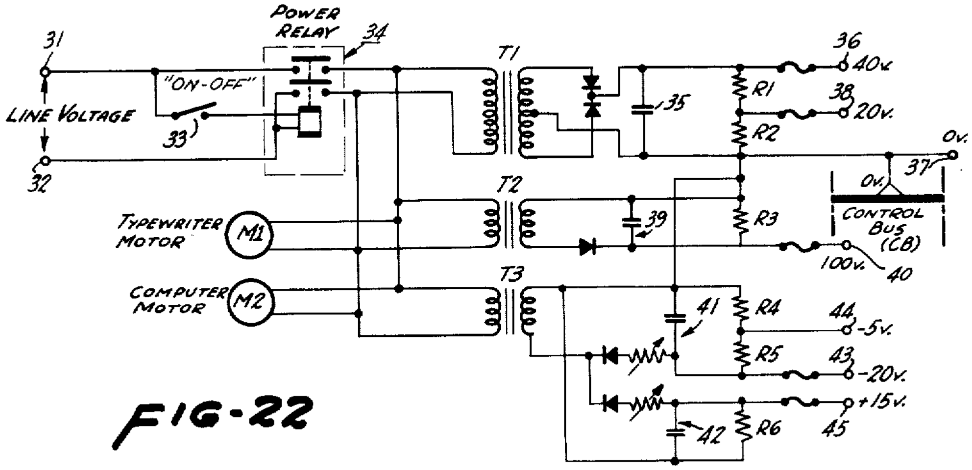

Referring to FIG. 22, the power to be supplied to the typewriter and computer unit is applied by the line cord 19 to terminals 31 and 32. The "Off-On" switch 33, located at the control panel, is connected in series with the coil of the power relay 34 across terminals 31 and 32 so that when switch 33 is closed, relay 34 will be energized to apply voltage simultaneously to the typewriter and computer motors M1 and M2 and to the primary windings of power transformers T1, T2 and T3.

The output voltage of transformer T1 is rectified by a conventional full-wave rectifier, generally indicated at 35, with 40 volts D.C. appearing at terminal 36 and with 0 volts D.C. appearing at terminal 37. A 20 volt D.C. output is obtained at terminal 38 connected to the juncture of voltage dividing load resistors R1 and R2.

The output voltage of transformer T2 is rectified by a conventional single wave rectifier, generally indicated at 39, with 100 volts D.C. appearing at terminal 40 across load resistor R3.

The output voltage of transformer T3 is rectified by two single wave rectifiers, generally indicated at 41 and 42, with a —20 volts D.C. appearing at terminal 43. A —5 volts D.C. is obtained at terminal 44 connected to the juncture of voltage dividing load resistors R4 and R5. A +15 volts D.C. appears at terminal 45 across load resistor R6. These voltages, —5, —20 and +15 are used in the various transistor amplifiers in the computer.

In the following circuit diagrams and description, it is to be understood that the 100, 40, 20, 15 —5 and —20 volts connections illustrated and described are all connected to the above described terminals of the power supply. The 0 volt terminal is also connected to the 0 v. line of the control bus, this 0 v. line being used as will be apparent in the course of the following detailed description.

MECHANICAL CONSTRUCTION OF THE COMPUTER UNIT

Figure 4:
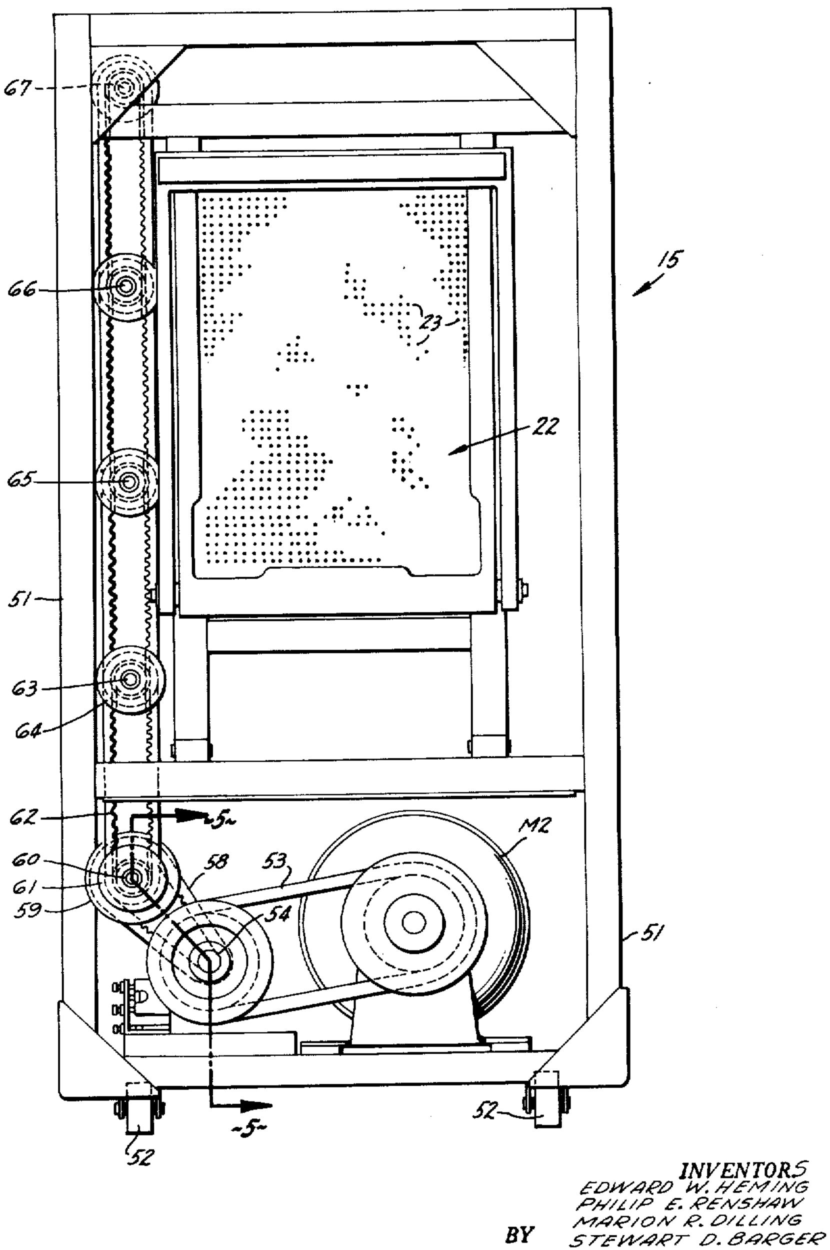
FIG. 4 is a front elevational view of the computer unit.
Figures 5, 6:
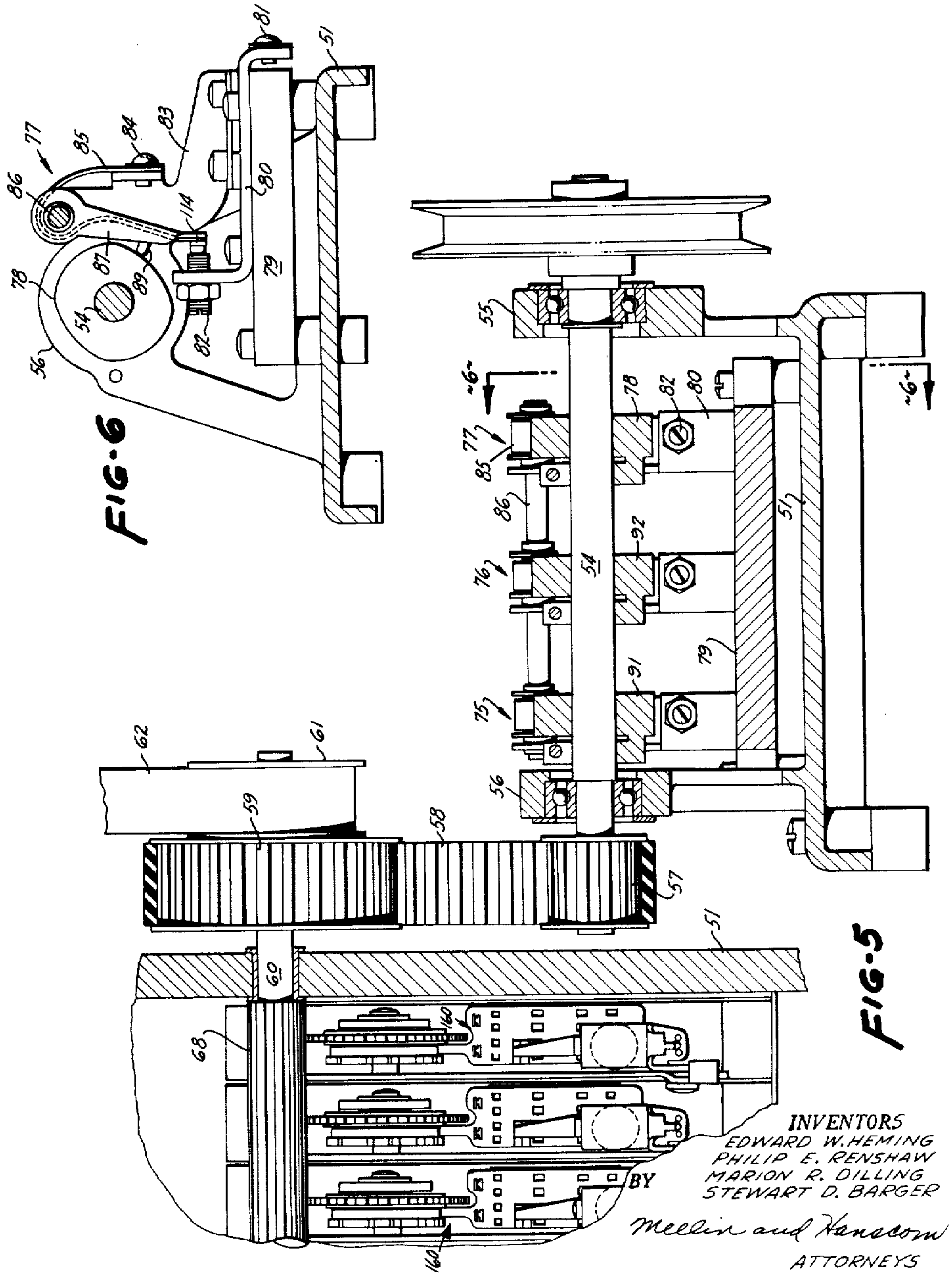
FIG. 5 is a sectional view taken on line 5—5 of FIG. 4.
FIG. 6 is a sectional view taken on line 6—6 of FIG. 5, illustrating the details of the G-pulse generator and access cams.

Referring now to FIGS. 4–6, the computer unit 15 comprises a frame 51 mounted on casters 52. The computer motor M2, mounted in the frame, drives belt 53 to rotate drive shaft 54 journaled for rotation in bearings 55 and 56.

Fastened on the other end of drive shaft 54 is a drive sprocket 57 having mounted thereon a ribbed drive belt 58 in driving engagement with sprocket 59 mounted on shaft 60 journaled for rotation in frame 51. A second sprocket 61 is also mounted on shaft 60, and a second ribbed drive belt 62 is provided to transmit the rotative movement of shaft 60 to sprocket 63 on shaft 64. In a similar manner, additional gears and ribbed belts are provided to drive shafts 65, 66 and 67, each shaft being journaled for rotation in frame 51.

Pinion gears 68 are provided on each shaft 60, 64, 65, 66 and 67, extending from one end of the frame 51 to the other, in meshing engagement with the drive gears of the pulse counters 100 and the pulse relays 150 and 160, to be described hereinafter.

Also mounted on the front end of frame 51 is the plugboard housing, indicated generally at 70. The details of the housing form no part of the invention, and it is sufficient to state that the housing is a conventional plugboard housing, allowing plugboards 22 to be inserted and removed by the typist, with terminals provided on the housing 70 to engage in mating relation the hubs of the plugboard, upon insertion of a plugboard into the housing.

The cam operated circuit breakers 75 and 76 used for the generation of G pulses, and the cam operated circuit breaker 77 used as an access cam are all mounted in operative association to the drive shaft 54, as best shown in FIGS. 5 and 6. These three circuit breakers are identical in operation and only breaker 77 will be described in detail.

A split collar cam 78 is mounted on and secured to drive shaft 54 for rotation therewith. An insulating block 79, bolted to frame 51, carries a conductor bar 80. This bar is provided at one end with a terminal screw 81, and carries at the other end an adjustable breaker point 82. Also bolted to the insulating block 79 is an upright support bracket 83 having a terminal screw 84. A leaf spring 85, formed from a conductive material, extends from the terminal screw 84 around the pivot pin 86 of the breaker cam 87 and connects to the breaker point 88. A non-conductive pin 89 on the breaker arm is urged by the action of leaf spring 85 into engagement with the cam 78. As may be seen in FIG. 6, the cam is so shaped that the breaker points 82 and 88 will open and close twice during each full revolution of the cam.

Circuit breakers 75 and 76 are provided with cams 91 and 92, respectively, mounted on drive shaft 54.

The computer motor M2 drives the drive shaft 54 at a rotative speed such that the cams 78, 91 and 92 will all rotate through 360° in 40 milliseconds. Thus, the closing of the breaker points associated with these cams will occur every 20 milliseconds. The cams are designed such that the breaker points associated therewith will open approximately seven milliseconds after they close.

In addition, the operation of the computer motor M2 drives all of the pinion gears 68 in unison so that the drive gears 104 of the pulse counters and relays within the computer unit will be rotated simultaneously, and in synchronism with the G-pulse generation cams 75 and 76.

PULSE COUNTERS AND RELAYS

The pulse counters 100 and pulse relays 150 and 160 used in the computer unit 15, and illustrated in FIGS. 7–19, are of the same mechanical construction and operation as those disclosed in the co-pending application of Philip E. Renshaw, Stewart D. Barger and Carl B. Crumb, Jr., entitled "High Speed Electric Pulse Counter and Relay Mechanisms," Serial No. 684,695, now Patent No. 2,984,413, filed September 18, 1957, which application has been assigned to the assignee of the present application. As the precise details of the pulse counters and relays used in the present invention form no part of the present invention, it is thought sufficient merely to describe the operational characteristics of these devices, with reference being had to the co-pending application for a complete disclosure of these devices.

Figure 7:
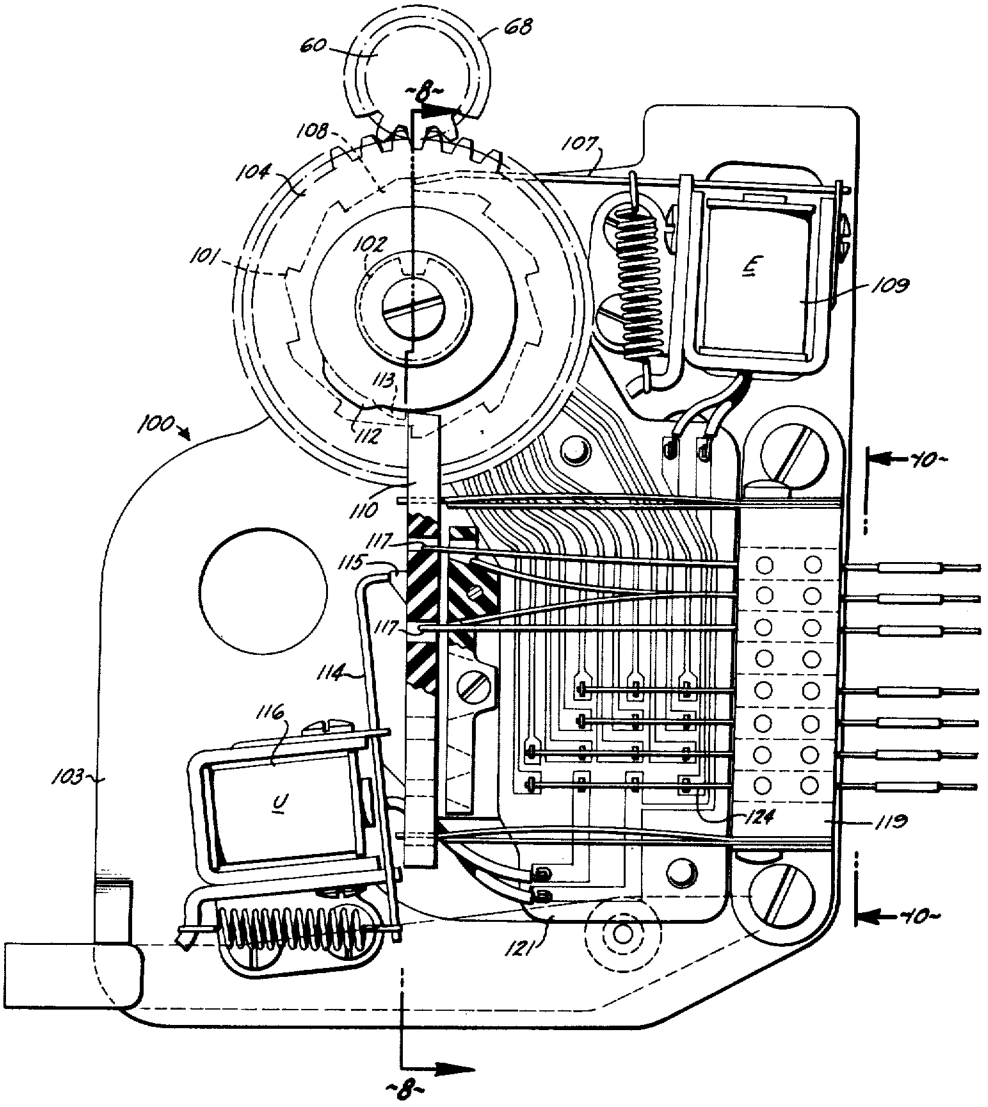
FIG. 7 is a front elevational view of a pulse counter used in the computer unit.
Figure 9:
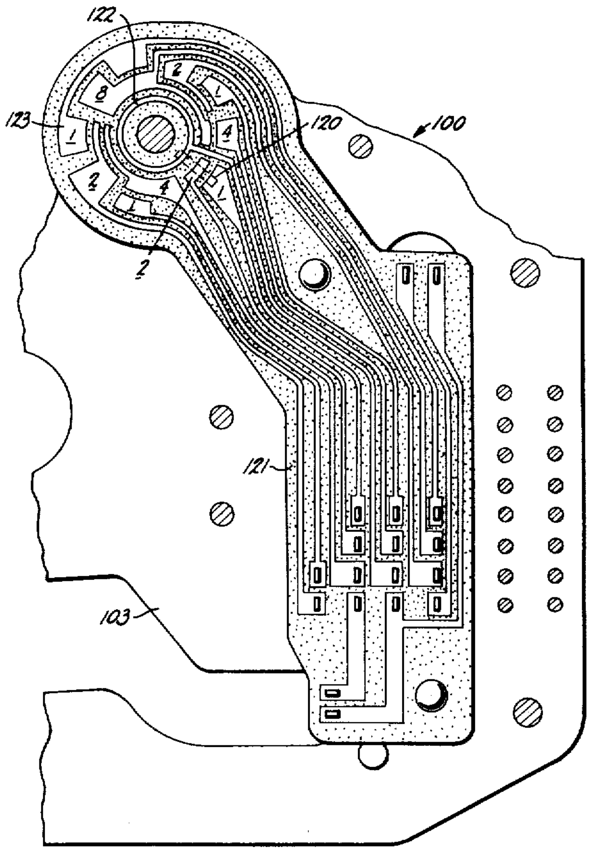
FIG. 9 illustrates the static read-out plate of the pulse counter illustrated in FIG. 7.
Figure 8:
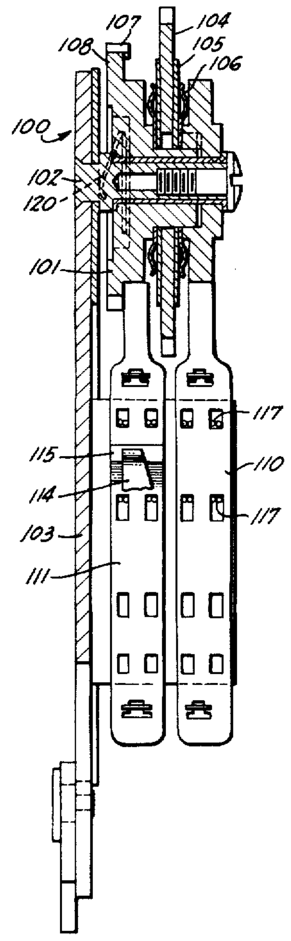
FIG. 8 is a sectional view of the pulse counter, taken on line 8—8 of FIG. 7, and with parts shown in elevation.

The pulse counter 100, shown in FIGS. 7 and 8, includes an escapement wheel 101 rotatably mounted on hub 102 which is fixed to base plate 103. A main drive gear 104 is mounted on the escapement wheel for free rotative movement thereon, and is continually driven by being in meshing engagement with the motor-driven pinion gear 68 of the computer unit 15. The drive gear 104 can impart rotative movement to the escapement wheel by means of the friction discs 105 keyed to the escapement wheel and held against the drive gear by spring member 106. The escapement wheel is normally held against rotation by the engagement of pallet lever 107 with one of the ten peripheral escapement teeth 108. When so held, the rotating main drive gear 104 merely rubs against the friction discs 105 without imparting rotative movement thereto.

If an electrical pulse is applied to the escapement coil (or E-coil), 109, the pallet lever 107 will be pivoted out of engagement with the escapement teeth, allowing the escapement wheel to be driven by the main drive gear. Rotation will continue until the escapement coil is deenergized, allowing the pallet lever to move back into position to engage the next escapement teeth 108 to stop further escapement wheel rotation. The electrical pulses are applied to the escapement coil 109 by a pulse generator (to be described hereinafter) and are shorter in length than the time it takes the escapement wheel to rotate through a one-tooth advance, and thus a single pulse will allow the escapement wheel to rotate through only a single-tooth advance. In addition, the electrical pulses are synchronized to the rotation of the escapement wheel so that if a series of pulses is impressed upon the escapement coil, the pallet lever 107 will first move from engagement with an escapement tooth to allow the escapement wheel to rotate. The lever will then move back into stopping position at the end of this pulse, so that normally it would stop the escapement wheel rotation. However, the next pulse in the series applied to the escapement coil 109 will move the pallet lever 107 out of the way so that the escapement wheel will continue in uninterrupted rotation. The alternate movement of the pallet lever in and out of stopping position will continue until the end of the last pulse applied to the escapement wheel, at which time the pallet lever will remain in stopping position and will engage the next escapement wheel teeth to prevent further escapement wheel rotation. Such rotation will be in direct proportion to the number of pulses applied to the escapement coil; if five pulses were applied, then the escapement wheel will advance through five single-tooth advances. As is apparent, the amount of rotation of the escapement wheel is a direct measure of the number of pulses applied to the escapement coil 109.

The pulse counter 100 performs switching functions by means of the two separate pushbars 110 and 111, which are biased upwardly by springs 112 into engagement with the escapement wheel 101. A cam lobe 112 is formed on the escapement wheel 101 to engage pushbar 110, and to push this bar downwardly. As shown in FIG. 7, the pulse counter is in its zero position, and the pushbar 110 will not be moved downwardly by cam lobe 112 until the escapement coil 109 has been pulsed nine times. The tenth pulse will then cause rotation of the cam lobe out of engagement with the pushbar 112, allowing the pushbar to return to its normal upper position. Since the pushbar 112 is actuated on the ninth pulse, it is referred to as the 9-pushbar.

In a similar manner, the cam lobe 113 formed on the escapement wheel will move the pushbar 111 downwardly after the escapement coil has been pulsed ten times. This pushbar 111 is referred to as the 10-pushbar. After the 10-pushbar has been moved downwardly, the spring biased latch 114 will engage the pushbar projection 115 to hold the pushbar in its downward position. An unlatch coil 116, mounted on the base plate, is adapted, when energized, to pull the latch 114 from the pushbar projection so as to allow upward return movement of pushbar 111. As will be seen in FIG. 7, the cam lobe 113 will be out of the way of pushbar 111 when the escapement wheel 101 is at rest, and thus the 10-pushbar can return from a latched position to its normal upper position without further rotation of the escapement wheel, merely by pulsing the unlatch coil 116.

Figure 10:
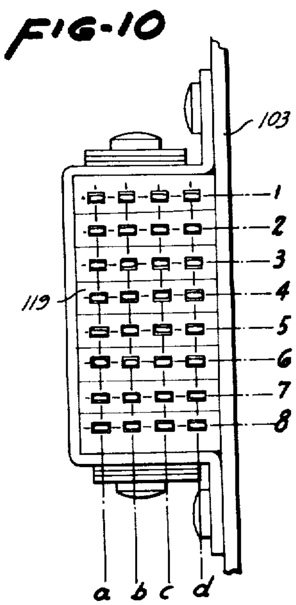
FIG. 10 is a view of the terminals of the pulse counter of FIG. 7, taken on the line 10—10 thereof, with legends applied to show the terminal description of the pulse counter.
Figure 11:
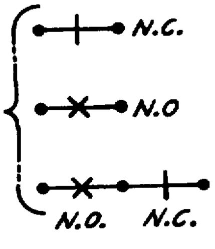
FIG. 11 illustrates the switch symbol designations used to represent the normally open and normally closed positions of the switch contacts of the pulse counter of FIG. 7 and the pulse relays of FIGS. 12 and 13.

The movement of the pushbars 110 and 111 causes the movable spring wire contacts 117 to move into or out of contact with the fixed wire contacts 118 so as to perform switching functions. These contacts 117 and 118 extend through the terminal block 119 and may be then connected in suitable electrical circuits, as will be fully described hereinafter. FIG. 10 illustrates the terminal designation of the various contacts extending through the terminal block, with any terminal of the pulse counter or the pulse relays (to be described) being identified by number and letter coordinates. FIG. 11 illustrates the switch contact symbols of the pulse counters and relays used throughout the circuitry of the computer unit.

An important feature of the pulse counter is that the cam lobes 112 and 113 are designed to delay actuation of the pushbars 110 and 111 until a short time after the escapement coil 109 has been pulsed. The pulse used to energize the escapement coil is of lesser time, thus the switching function performed by the pushbars will occur after the escapement coil is deenergized. The significance of this feature is that the same pulse is applied to the computer unit circuits controlled by the switch contacts 117 and 118 as is applied to the escapement coil 109, and thus the pulse will have ended before switching can occur, so that the switches cannot make or break a live circuit, thereby eliminating any possibility of arcing at the contact points.

The pulse counter is also designed so that the rotative position of the escapement wheel can be ascertained at any time, to afford an indication of the number of pulses which have been applied to the escapement coil 109. A read-out brush 120, mounted in the escapement wheel 101 so as to rotate therewith, brushes across the printed-circuit read-out plate 121. This plate has a common center conducting ring 122 and a plurality of information indicating conducting contact segments 123 arranged to give a binary representation of any of the ten positions of the escapement wheel 101. As shown in dotted lines in FIG. 9, the read-out brush 120 bridges the common contact 122 and one or more of the binary segment contacts 123 for any rotative position, so as to complete one or more circuits for each position and is shown in the zero indicating position. The individual contact segments 123 have been indicated on FIG. 9 by the binary numbers 1, 2, 4 and 8 in parentheses. Each of the read-out plate contacts 123 and the common ring have wires 124 connected thereto which also extend through the terminal block 119, so that various circuits, to be hereinafter described, may be connected to the pulse counter.

Figure 12:
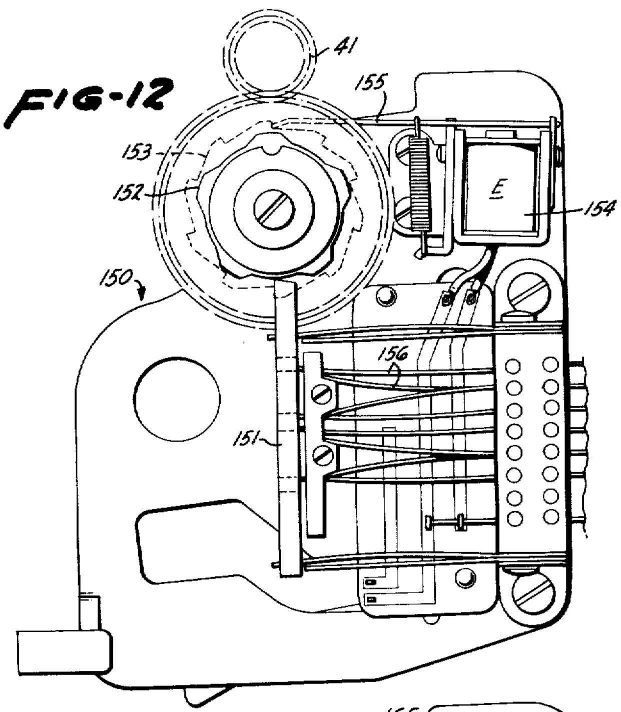
FIG. 12 is a front elevational view of one type of a pulse relay used in the computer unit.

FIG. 12 illustrates a pulse relay 150, used in the computer unit, which is a modification of the pulse counter 100, and which operates in the same general manner as that described above. The pulse relay 150 has a single pushbar 151, operated by the five cam lobes 152 on the escapement wheel 153. These cam lobes are arranged so that as the escapement coil 154 is pulsed by a single pulse, the pallet lever 155 will be moved to allow a single-tooth advance of the escapement wheel and the pushbar will be cammed downwardly. On the next pulse, the cam lobes will be rotated to allow the pushbar to return upwardly. Continued pulsing of the escapement coil will produce the alternate downward and upward movements of the pushbar. As before, this pushbar movement will perform switching operation of the switch contacts 156, with the switching being performed each time the escapement coil 154 is energized.

Figure 13:
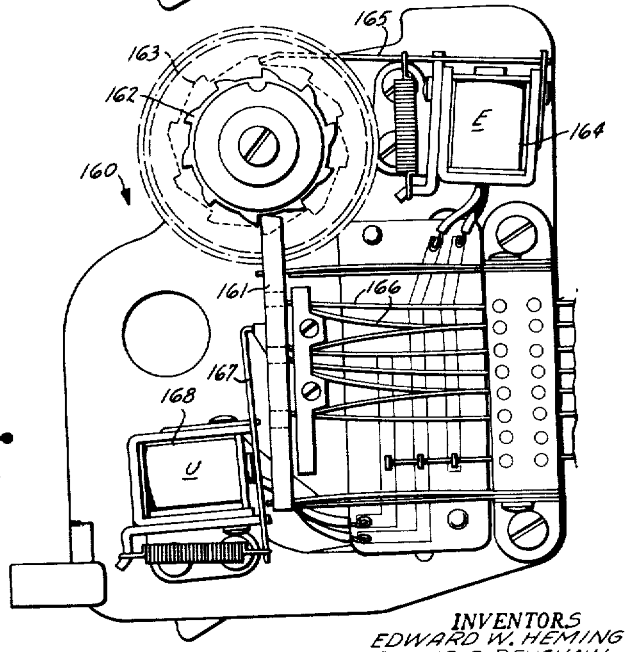
FIG. 13 is a front elevational view of another type of a pulse relay used in the computer unit.

The pulse relay 160, illustrated in FIG. 13, is also similar in operation to the pulse counter 100 and the pulse relay 150. In this relay, the single pushbar 161 is adapted to be moved downwardly by any of the ten cam lobes 162 formed on the escapement wheel 163. Thus, whenever the escapement coil 164 is pulsed, the pallet lever 165 will be removed from holding engagement with the escapement wheel, allowing it to rotate through a single-tooth advance. The cam lobes 163 will move the pushbar 161 downwardly, to operate the switch contacts 166. When the pushbar has been moved downwardly, the latch lever 167 will latch the pushbar in its downward position to prevent upward return movement thereof, until the unlatch coil 168 has been energized. As in the pulse counter 100, the cam lobes 162 are designed so that when the escapement wheel 163 is held against rotation, the pushbar 161 is free to move upwardly when unlatched by an energization of the unlatch coil. In this relay, switching functions take place by alternate energization of the escapement coil 163 and the unlatch coil 168. For example, when the relay is in the position shown in FIG. 13, an energization of the escapement coil 163 will cause the pushbar 161 to be cammed downwardly and latched. A subsequent energization of the escapement coil cannot cause any further movement of the pushbar. However, if the unlatch coil 168 is now energized, the pushbar will be free to return to its upper position where it will remain, despite any further energizations of the unlatch coil, until the escapement coil is again energized.

In both the pulse relays 150 and 160, the switching operations performed by the pushbars in response to energization of the escapement coils thereof will be delayed until after the energizing pulse has ended, again preventing the making or breaking of a live circuit by the switch contacts when connected into circuits on which the same energizing pulse is applied.

As is seen by the above, the switches controlled by the pulse counters 100 and the pulse relays 150 and 160 are bistable, and each set of switch contacts moves, in response to an energizing pulse, either from an open position to a closed position, or from a closed position to an open position.

As, for example, in the pulse counter 100, the switch contacts controlled by the 9-pushbar will remain at one position (either open or closed) for all rotative positions of the escapement wheel until after the ninth pulse applied to the escapement coil. The switch contacts will be moved to their other bistable, or operated, position and remain there until after the escapement coil is again pulsed. Similarly, the contacts controlled by the 10-pushbar will remain in one stable position until after the tenth pulse applied to the escapement wheel, at which time the contacts will be moved to their other stable, or operated, position, in which position they are latched by the latch bar. The contacts will remain in this other stable position until unlatched by a pulse applied to the unlatch coil so that the switch contacts can move back to their normal, or restored, stable position.

The pulse relay 150 is also bistable. That is, the switch contacts thereof will be in one stable position (either open or closed) until a pulse is applied to the escapement coil. The switch contacts will then move to their other stable positions, referred to as their operated position, and will remain in this operated position until the escapement coil is again pulsed, which will then move the switch contacts back to their normal, or restored, stable position.

In the same manner, the pulse relay 160 is a bistable relay, in that the switch contacts have a normal stable position (either open or closed). A pulse applied to the escapement coil will cause the contacts to be moved to their other, or operated, stable position wherein the pushbar is latched. These contacts will remain in their operated stable position until the unlatch coil is energized so that the contacts can move back to their normal, or restored, stable position.

Figure 24:
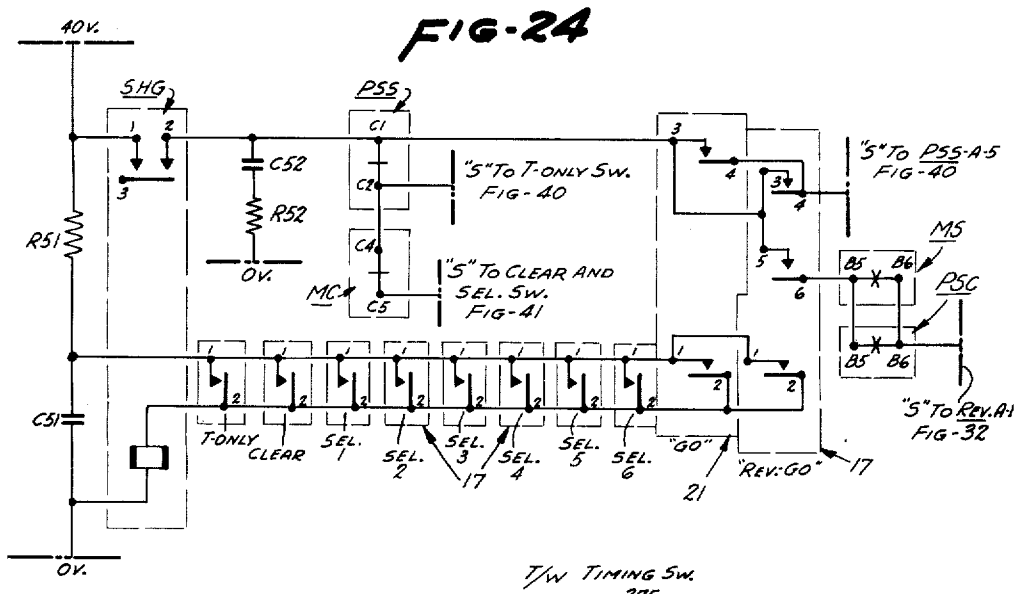

In the circuit diagrams of the computer unit, FIGS. 24 et seq., the switch contacts of the pulse counters and relays are all shown in their normal, or restored, stable position. In the description of these circuits, the notation PSS (A1–A2) is used to refer to the A1 and A2 switch contacts of the PSS relay, for example, and refers to the normal stable position of that relay, as shown on the drawings (whether the contacts are normally open or normally closed). If the contact designation is underlined e.g. <u>PSS (A1–A2)</u>, then the designation refers to the other, or operated, stable position of the relay contacts which would be opposite to the switch configuration shown on the drawings.

TYPEWRITER

Figure 19:
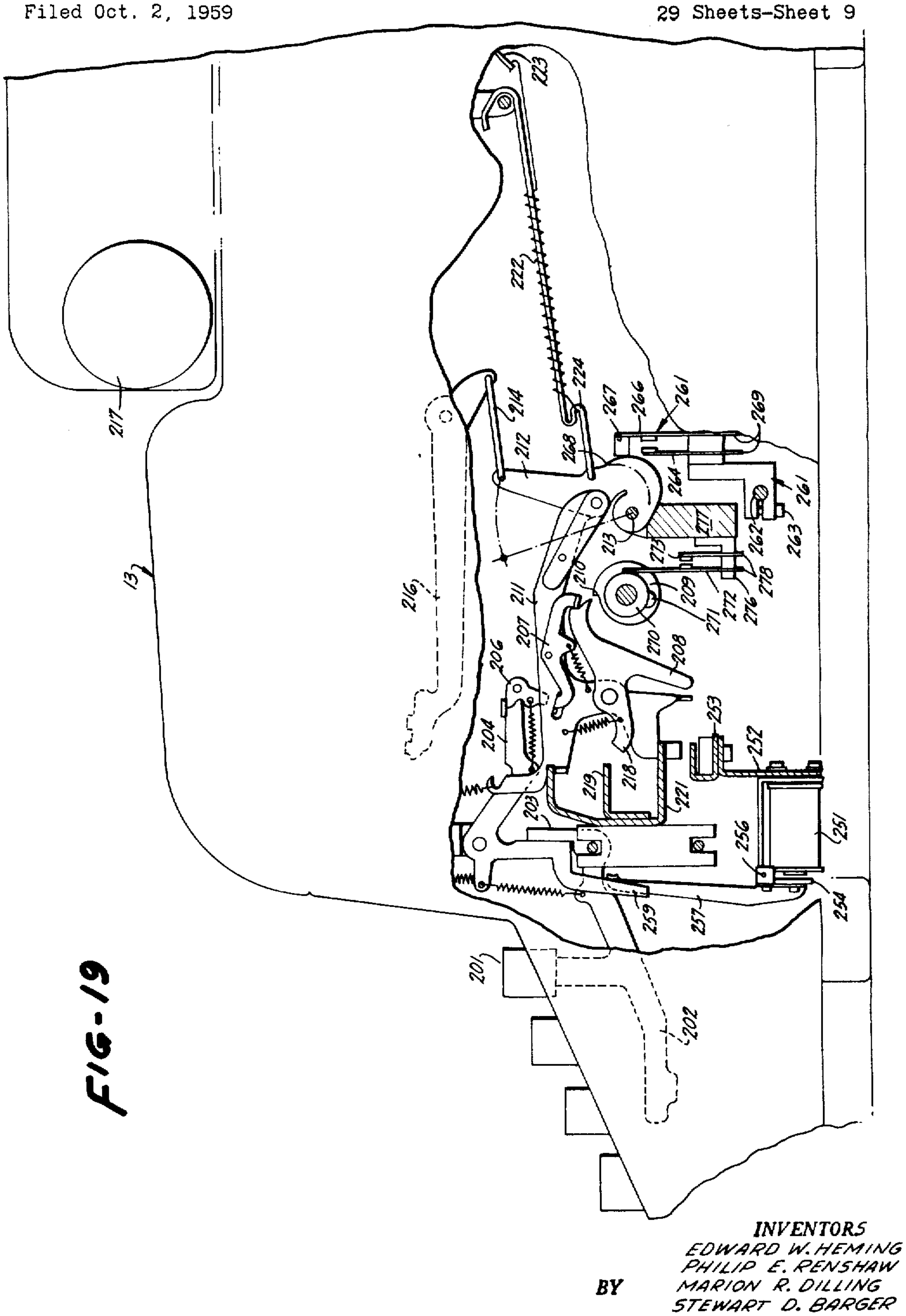
FIG. 19 is a side view of a conventional electric typewriter, as modified for use with the computer unit, and with portions cut away, in phantom and in section.

The typewriter 13, used with the computer unit 15, is a conventional electric typewriter, modified for use with the computer unit as illustrated in FIG. 19 and described in this section.

Figure 18:
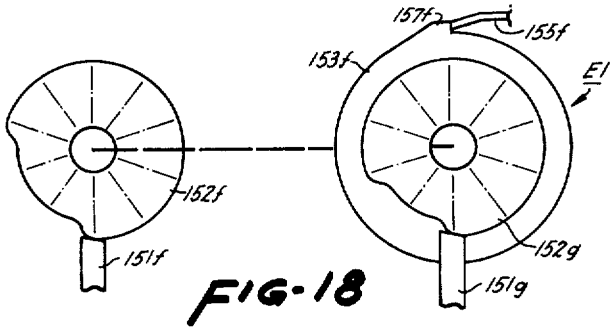

Referring to FIG. 19, each key of the typewriter functions in the same manner. For example, when key 201 is depressed, key lever 202 is pivoted in a counterclockwise direction, with the end 203 of key lever 202 causing the key lever trip arm 204 to pivot in a clockwise direction. The trip pawl 206 moves downwardly to engage the carrier arm pawl release 207, in turn causing the latter to pivot in a counterclockwise direction. This last motion releases the carrier arm trip pawl 208 so that it swings into engagement with the constantly rotating power roll 209. During engagement of the power roll tooth 210 by trip pawl 208, the carrier arm 211 is urged to move towards the left, as shown in FIG. 18, and consequently the type bar lever 212, pivotally connected at one end of carrier arm 211, will pivot around the frame support 213 in a counterclockwise direction, and through the link 214 will cause the type bar 216 to pivot in a clockwise direction into engagement with the platen 217.

In moving to the left, the carrier arm 211 will carry the carrier arm pawl release 207 out of engagement with trip pawl 206, and the left end 218 of the carrier arm trip pawl 208 will strike the center shelf 219 of the carrier arm guide 221, forcing the trip pawl 208 out of engagement with the ratchet roll 209 to allow the carrier arm to return to its original position under the influence of spring 222 attached at one end thereof to frame member 223 and at its other end to universal bar link 224, the latter being connected to the type bar lever 212.

Whenever a typewriter key is struck, the typewriter carriage will advance one column position by the usual typewriter escapement mechanism (not illustrated).

The above described structure and functioning of the typewriter during a keystroke operation is conventional. The following modifications have been made to this conventional structure, to adapt the typewriter for use in the present invention. As illustrated in FIG. 19, an electromagnet 251 has been attached by means of bracket 252 to typewrite frame member 253 by suitable fastening means. The electromagnet 251 has mounted, in attractive relation thereto, plate 254 pivoted about pivot pin 256, the plate 254 having an upwardly extending arm 257 provided with a lip 258 adapted to engage the lower end 259 of the key lever trip arm 204. The electromagnet 251 is one of the key puller coils to be discussed hereinafter, and, as may be apparent, whenever the electromagnet 251 is energized, the arm 257 will force the key lever trip arm 204 in the same manner as if the key 201 had been depressed, and thus an energizing pulse applied to the magnet 251 will cause the type bar 216 to strike the platen 217, and will cause the carriage to advance. A separate electromagnet 251 and key-actuating mechanism is provided for every indicia key on the typewriter, as well as for every typewriter operation key, such as the space bar, carriage shift, carriage return, tab and the like. Thus, the typewriter can be completely remotely controlled to perform every operation that a typist can perform.

A single pole switch assembly 261 is mounted rigidly on frame member 262 by screws 263, the switch assembly being provided with a stationary switch blade 264 and a movable switch blade 266, the latter being provided with a non-conductive pin 267 held in abutting relation to cam surface 268 of the type bar lever 212 by the resiliency of the movable switch blade 266. The switch blades 264 and 266 terminate at their bottom ends in terminals 269, enabling the switch blades to be operatively connected into appropriate electrical circuits. As shown, the switch assembly 261 provides a normally open, single pole switch, the switch being allowed to close when the type bar lever is pivoted in a counterclockwise direction on a keystroke operation. The function of the switch assembly 261 will be hereinafter discussed, it being sufficient for the present to state that such a separate switch assembly is mounted in operative relationship to every type bar lever 212 and to the space bar of the typewriter.

In normal operation of the typewriter, the switches 261 will be closed for approximately 6–10 milliseconds upon a keystroke operation.

The power roll 209 has a cam 270 secured thereto so that the cam lobe 271 will close the normally open contacts 272 and 273 of the typewrite timing switch 275 once during each rotation of the power roll. The contacts 272 and 273 are mounted in an insulating block 276 secured to frame member 277. The contacts 272 and 273 will be closed by cam lobe 271 for approximately 15 milliseconds to complete a circuit between the switch terminals 278.

TYPEWRITER ENCODER

As has been previously described, every typewriter key is provided with a set of normally open switch contacts 261, which will close for approximately 6–10 milliseconds whenever a key is operated.

Figure 21:
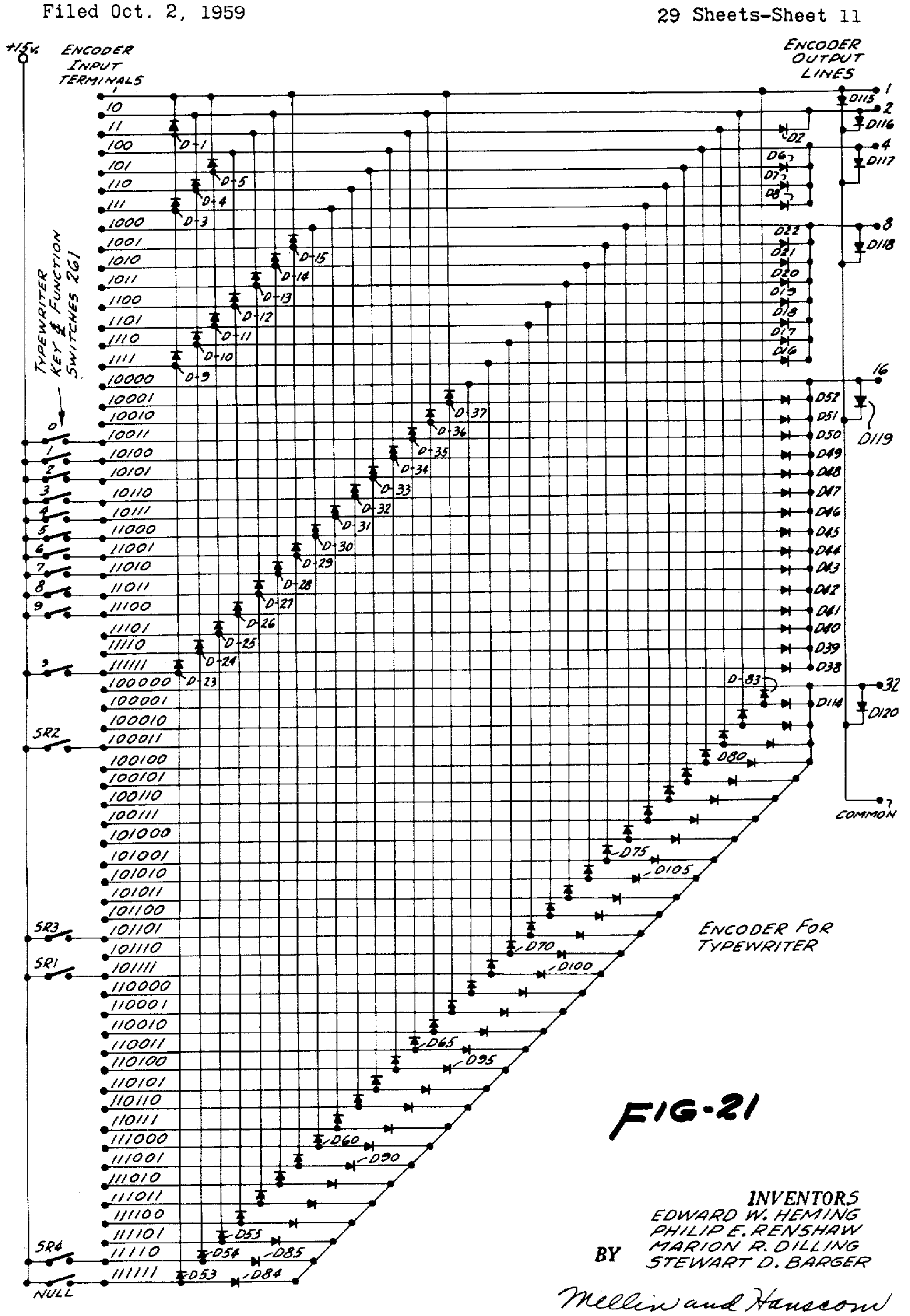
FIG. 21 is a circuit diagram of an encoder for coding typewriter operations into a binary code.

The typewriter encoder 26, FIG. 21, is used to convert the closing of any of the switches 261 into a binary representation of the operated key, with each key having a different binary code. The encoder is illustrated as having 63 different input terminals: 1, 10, 11, 100, 111, . . ., 111110 and 111111, and seven output lines: 1, 2, 4, 8, 16, 32 and common. Each of the input terminals is adapted to be connected to one terminal 269 of the typewriter key switches 261, the other terminal 269 of these switches being connected together and connected to a positive voltage source. Although only the typewriter key switches 261 associated with the 0, 1, 2, 3, 4, 5, 6, 7, 8, 9, comma, "SR1," "SR2," "SR3," "SR4" and "null" typewriter keys are illustrated in FIG. 21, it is to be realized that all of the typewriter key switches are connected one each to one of the encoder input terminals.

It is to be also realized that any of the letter keys 201 on the typewriter may be chosen to be used for the SR1, SR2, SR3, SR4 and null keys. As, for example, the "*t*," "*c*," "*m*," "*d*" and "*x*" keys may be chosen for these purposes, respectively, if desired.

As an illustration of the function of the encoder, let us assume that the "4" typewriter key has been operated by the typist. This will close the switch 261 associated therewith, to complete a path from the 15 volts through the "4" key switch 261 to encoder input terminal 10111. From there, 4 paths are complete through the encoder: through diode D46 to encoder output line 16, through diodes D31 and D8 to encoder output line 4, through diodes D31, D3 and D2 to encoder output line 2, and through diodes D31, D3 and D1 to encoder output line 1. Thus the encoder output lines 1, 2, 4 and 16 are all energized by the closing of the "4" typewriter key switch, representing the binary code 10111.

In addition, the encoder output lines 1, 2, 4, 8, 16 and 32 are all connected by diodes D115–120 to the encoder output common line so that whenever any one or a combination of the lines 1, 2, 4, 8, 16 and 32 are energized, the common line will be also energized.

The encoder converts the number keys of the typewriter into a binary-excess three code as follows:

| | | | |
|---|---|---|---|
| 0 | 10011 | 5 | 11000 |
| 1 | 10100 | 6 | 11001 |
| 2 | 10101 | 7 | 11010 |
| 3 | 10110 | 8 | 11011 |
| 4 | 10111 | 9 | 11100 |

As is seen, each number key will energize the 16 line. The coding of the other typewriter keys is selected so that no other key will energize the 16 line without also energizing the 32 line, except for the "comma" key, which will energize the 1, 2, 4, 8 and 16 lines. The SR1, SR2, SR3, SR4 and null keys are converted by the encoder into binary form as follows:

| | |
|---|---|
| SR1 | 101111 |
| SR2 | 100011 |
| SR3 | 101101 |
| SR4 | 111110 |
| Null | 111111 |

The purpose of the above coding will become more clear in connection with the later description of the manner in which numerical information is transferred into the computer and of the manner in which the typist can correct errors and instruct the computer to perform a shift right function in a multiplication operation.

PULSE GENERATION

The automatic operation of the computer unit and typewriter is initiated by two different electrical primary command signals; namely, "S" and "K" pulses, which may be produced when desired by the typist.

In general, an S pulse is produced by the manual closing of any of the switches 17 on the control panel 16, or by operating the "Go" button 21 on the typewriter. A K pulse is produced in response to any operation of the typewriter that the typist may produce, as, for example, a key stroke, carriage return, tabulate, etc.

These S and K pulses are used in the computer unit to cause "G" pulses to be generated, which G pulses are then used to perform all the transferring of numerical information within the computer from one section thereof to another.

In addition, "J" pulses can be generated as desired by the computer, in synchronism with the operation of the typewriter, for operating the key puller coils 251 of the typewriter.

"G" PULSES

Figure 23:
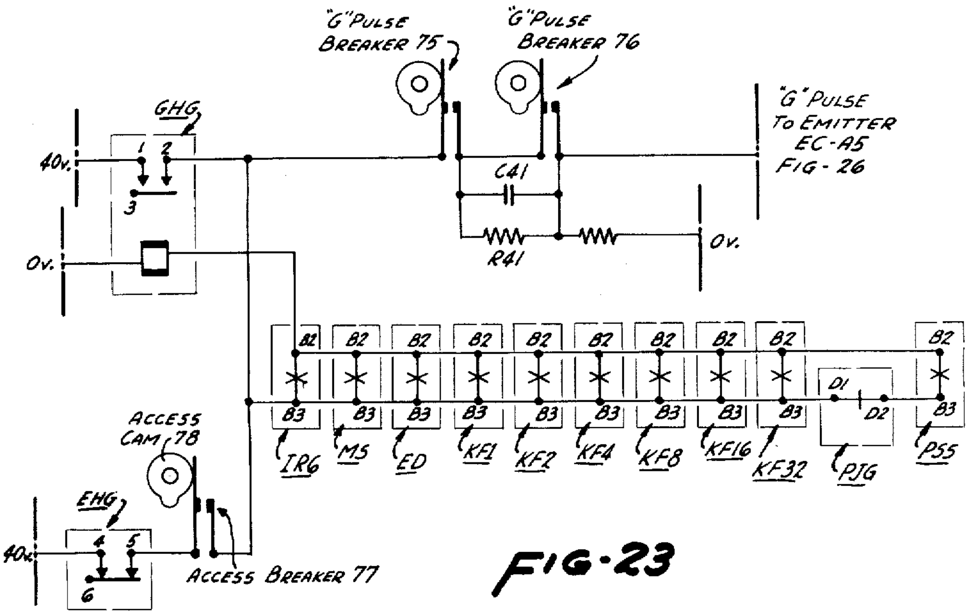

The circuit diagram for the generation of G pulses is shown in FIG. 23.

As has been previously described, the access cam 78 and the two G-pulse cams 91 and 92 are all secured for rotation with the drive shaft 54 and each cam will close the breaker points associated therewith twice in each revolution of the drive shaft. The cams are designed such that the breaker points thereof will each be closed for approximately 7 milliseconds. The angular relationship of the G-pulse cams 91 and 92 is adjusted so that the breaker 75 closes before the breaker 76 and so that for a 6 millisecond period of time, both of the breaker points associated therewith will be closed. Stated another way, the periods of time in which each of the breakers 75 and 76 will be closed is adjusted so that there is a 6 millisecond overlap when both are closed. The angular relationship of the access cam 78 relative to the G-pulse cams 91 and 92 is adjusted so that the access cam breaker points are closed about one millisecond after the breaker 76 opens; i.e., when both breakers 75 and 76 are open.

In the operation of the G-pulse generator, let it be assumed that none of the hold contacts—IR6(B2–B3), MS(B2–B3), ED(B2–B3), KF1(B2–B3), KF2(B2–B3), KF4(B2–B3), KF8(B2–3), KF16(2–B3), KF32(B2–B3) or PSS(B2–B3)—has been closed, and that the EHG contacts 4 and 5 are closed.

The 40 volts will periodically be applied through EHG (4–5) and the access cam breaker 77 to the G-pulse breaker 75, but this voltage will never be applied to the G-pulse output hub because the access cam breaker points are never closed at the same time that the G-pulse breakers 75 and 76 are both closed.

If one of the above hold contacts is closed; e.g., KF1(B2–B3), the access cam breaker will allow the GHG mercury relay coil to be energized. The closing of the GHG contacts 1 and 2 allows the 40 volts controlled thereby to hold the GHG relay coil energized through the now closed hold contacts, KF1(B2–B3). The access cam breaker may now open without deenergizing the GHG relay coil. 40 volts is now continuously applied to, and is periodically gated through the G-pulse breakers 75 and 76 to produce 6 millisecond, 40 volt G pulses, until the GHG relay is deenergized. Such deenergization is brought about by the opening of the KF1(B2–B3) contacts. When these open, the GHG relay will be deenergized and the G pulses will cease.

The EHG contacts 4 and 5, in the circuit with the access cam breaker points, are used to delay G-pulse generation until after a K pulse has ended. As will be brought out in greater detail hereinafter, a K pulse can be used to close the KF1 relay hold contacts (B2–B3). The EHG contacts (4–5) open during the generation of a K pulse, and thus the GHG relay cannot be energized during the K pulse. After the K pulse ends, the EHG contacts (4–5) close. As soon thereafter as the access cam breaker 77 closes, the GHG relay will be energized through the closed hold contacts KF1(B2–B3). Approximately 10 milliseconds or so later, the G-pulse breakers 75 and 76 will gate a G pulse through to the G-pulse output terminal. Thus, the first G pulse will be delayed for at least about 15 milliseconds after the end of the K pulse which triggered the G-pulse generator. The purpose of this delay will be apparent hereinafter.

The 40 volt, 6 millisecond G pulses wil be produced one each 20 milliseconds for use in the computer. Resistor R41 and capacitor C41 across the G-pulse breaker contacts provide for spark suppression, and resistor R42 provides a load resistor for the circuit.

"S" Pulses

S pulses are 40 volt, 6 millisecond pulses generated in the computer in response to the manual operation of various push-button switches at the control panel 16 and typewriter 13 by the typist. These switches are the "T-only," "Clear," "Reverse-Go" and the six branch selector switches "1," "2," "3," "4," "5" and "6" located on the control panel, as indicated on FIG. 1, and the "Go" button, or palm operated switch, 21 on the typewriter.

Figure 25:
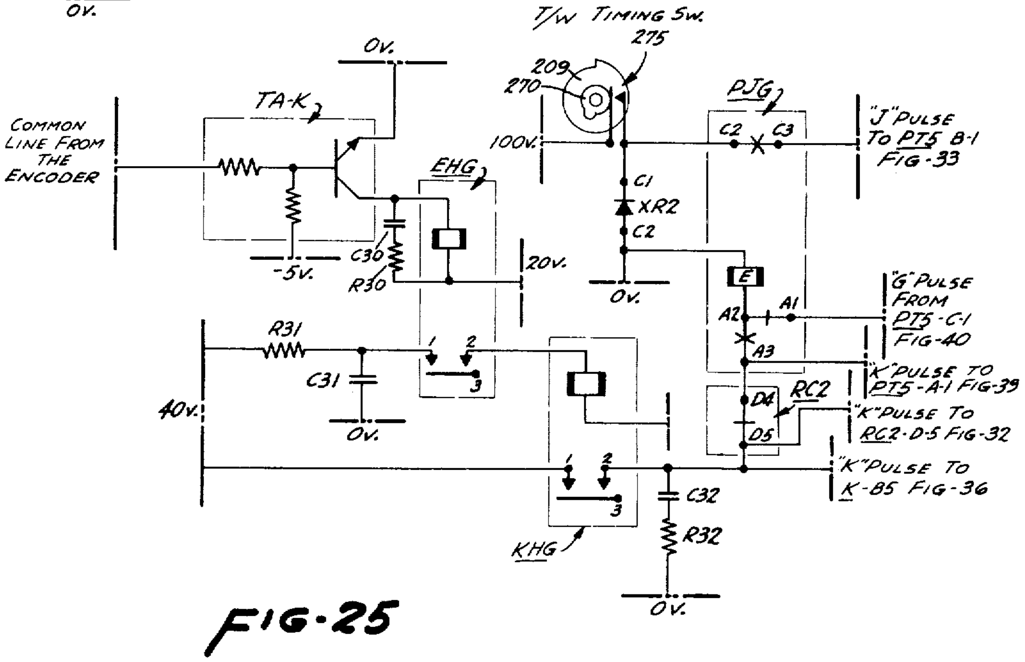

As is seen in FIG. 25, with all of the above switches open, the relay coil of the mercury relay SHG will be deenergized, and capacitor C51 will charge through resistor R51 to 40 volts. If any of the above switches is now operated, the (1–2) contacts thereof will close, placinfi the SHG relay coil across capacitor C51 which discharges through the relay coil to close the SHG contacts (1–2). The resistance values of the relay coil and resistor R51 and the capacity of capacitor C51 are chosen such that the voltage across capacitor C51 and the delay coil will decay to the drop-out value of the SHG relay in approximately 6 milliseconds. Thus, the closing of any of the above switches will cause a 6 millisecond closing of the SHG relay contacts, even though the manually closed switch may be held closed for a longer period of time.

The SHG relay cannot again operate to close its contacts until the manually closed switch is opened to allow capacitor C51 to recharge to 40 volts.

Resistor R52 and capacitor C52 provide for spark suppression at the SHG contacts when they open at the end of a 6 millisecond time duration.

Figure 40:
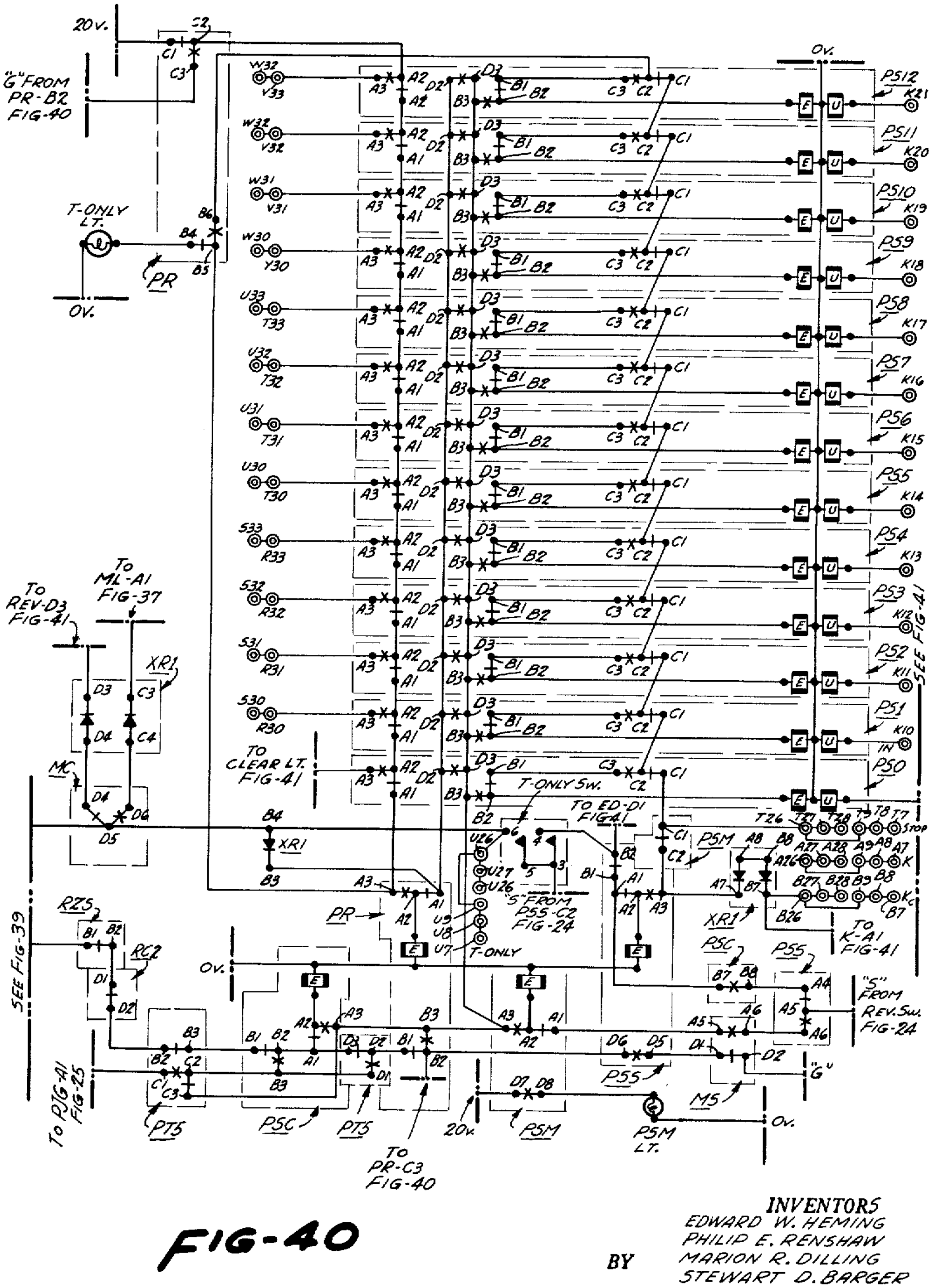
Figure 41:
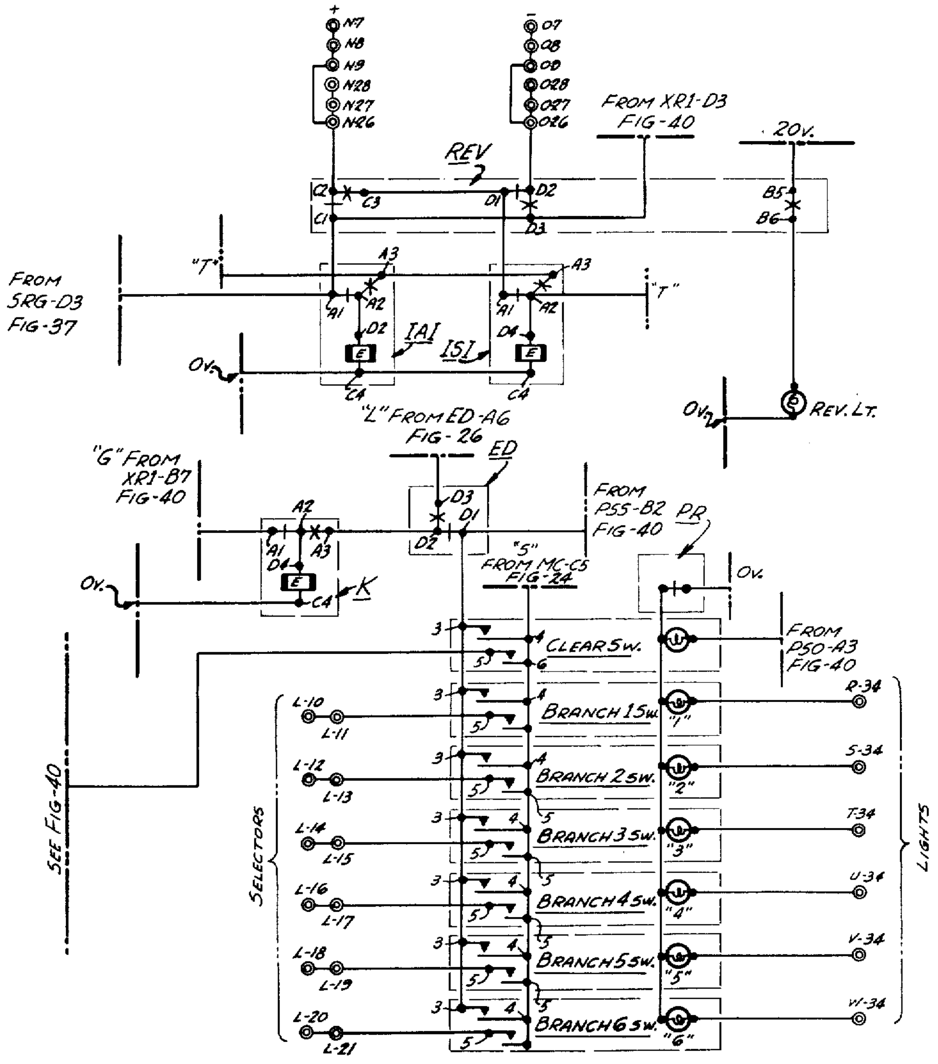

If the PSS relay contacts (C1–C2) are in the normally closed position illustrated, an S pulse will be sent to terminal 3 of the T-only switch on FIG. 40, and if the PSS and MC relay switches are both in the normally closed positions illustrated, an S pulse will be sent to terminals 4 and 6 of the Clear and Selector switches on FIG. 41.

Figure 32:
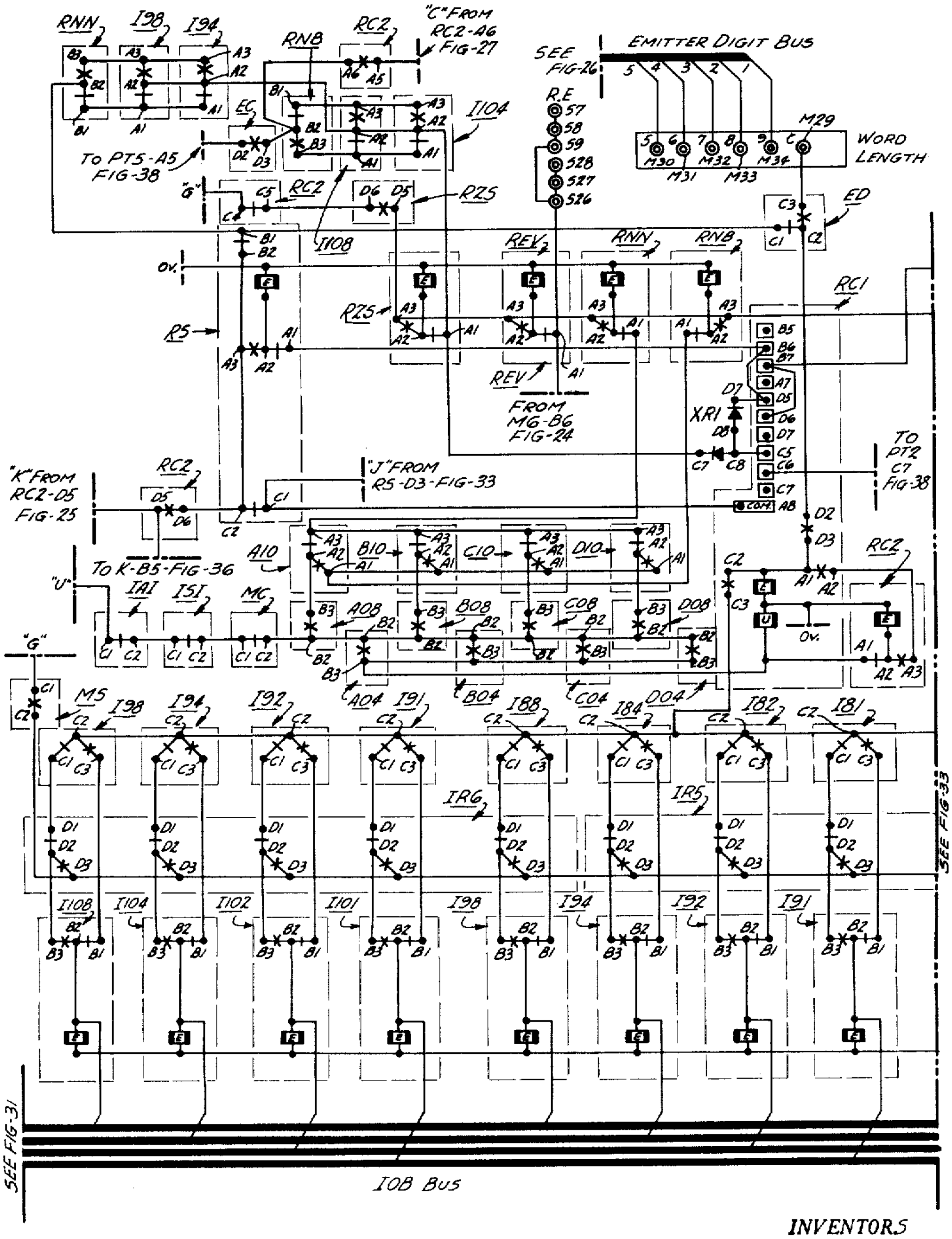

If the manual operation of the "Go" button or the "Reverse-Go" switch had generated the S pulse, this S pulse will pass to contact PSS(A5) on FIG. 40. If the "Reverse-Go" switch had been operated, the S pulse will also pass to contact REV(A1) on FIG. 32, provided that either of the MS and PSC relay contacts had moved to operative position.

The function of the S pulses, generated as above, will be fully described hereinafter.

"K" Pulse

A "K" pulse is generated in response to any operation of the typewriter 13, whether to a keystroke operation or to any other typewriter function such as a carriage return, space bar operation, tabulation or the like.

As has been previously explained, every typewriter function creates a 6–10 millisecond pulse on the seventh, or common, line from the typewriter encoder 26 to the computer. On FIG. 25, this pulse is amplified by a conventional transistor amplifier TA–K to energize the coil of the mercury relay EHG. Resistor R30 and capacitor C30, connected across the EHG relay coil, provide a time delay in the drop-out of the EHG relay in case the pulse from the typewriter is of shorter duration than 6 milliseconds, for it is essential to the production of a proper length K pulse that the EHG relay be energized for at least 6 milliseconds.

With the EHG relay contacts 1 and 2 open, the capacitor C31 is charged to 40 volts, and when the EHG contacts 1 and 2 close, the capacitor C31 will discharge through the KHG mercury relay coil to energize same and close the KHG contacts 1 and 2 until the voltage across the KHG relay coil drops to the drop-out value of the KHG relay.

The resistance values of the KHG relay coil and R31 and the capacity of C31 are chosen so that the KHG relay contacts 1 and 2 will be closed for 6 milliseconds.

The closing of the KHG contacts 1 and 2 thus produces a 40 volt, 6 millisecond K pulse at the K-pulse terminal. Resistor R32 and capacitor C32 provide spark suppression for the KHG relay contacts upon the opening thereof.

"J" Pulses

As is seen in FIG. 25, a G pulse can pass through contacts PJG(A1–A2) to energize the E-coil of the PJG relay and close the (C2–C3) and (A3–A2) contacts thereof. The typewriter timing switch will close for approximately 15 milliseconds on each revolution of the power roll of the typewriter, and will apply 100 volts through the typewriter timing switch and through the PJG contacts C2–C3 to the J-pulse terminal. The pulse will then be used in a manner hereinafter to be described, to operate a function of the typewriter.

Such typewriter operation will produce a K pulse, as above described, which will pass through contacts RC(D5–D4) (if not operated and therefore closed) and PJG(A3–A2) to energize PTG(E-coil) and restore the PJG relay to its normal position shown.

Thus, if the PJG relay has been actuated, a 100 volt, 15 millisecond pulse will be produced once for each revolution of the typewriter power roll 209 and the echo, or K, pulse from a typewriter function produced by the J pulse will be used to restore the PJG relay to discontinue J-pulse generation.

The diode XR2(C1–C2) is used to provide spark suppression for the typewriter timing switch when it opens.

THE EMITTER

Figure 26:
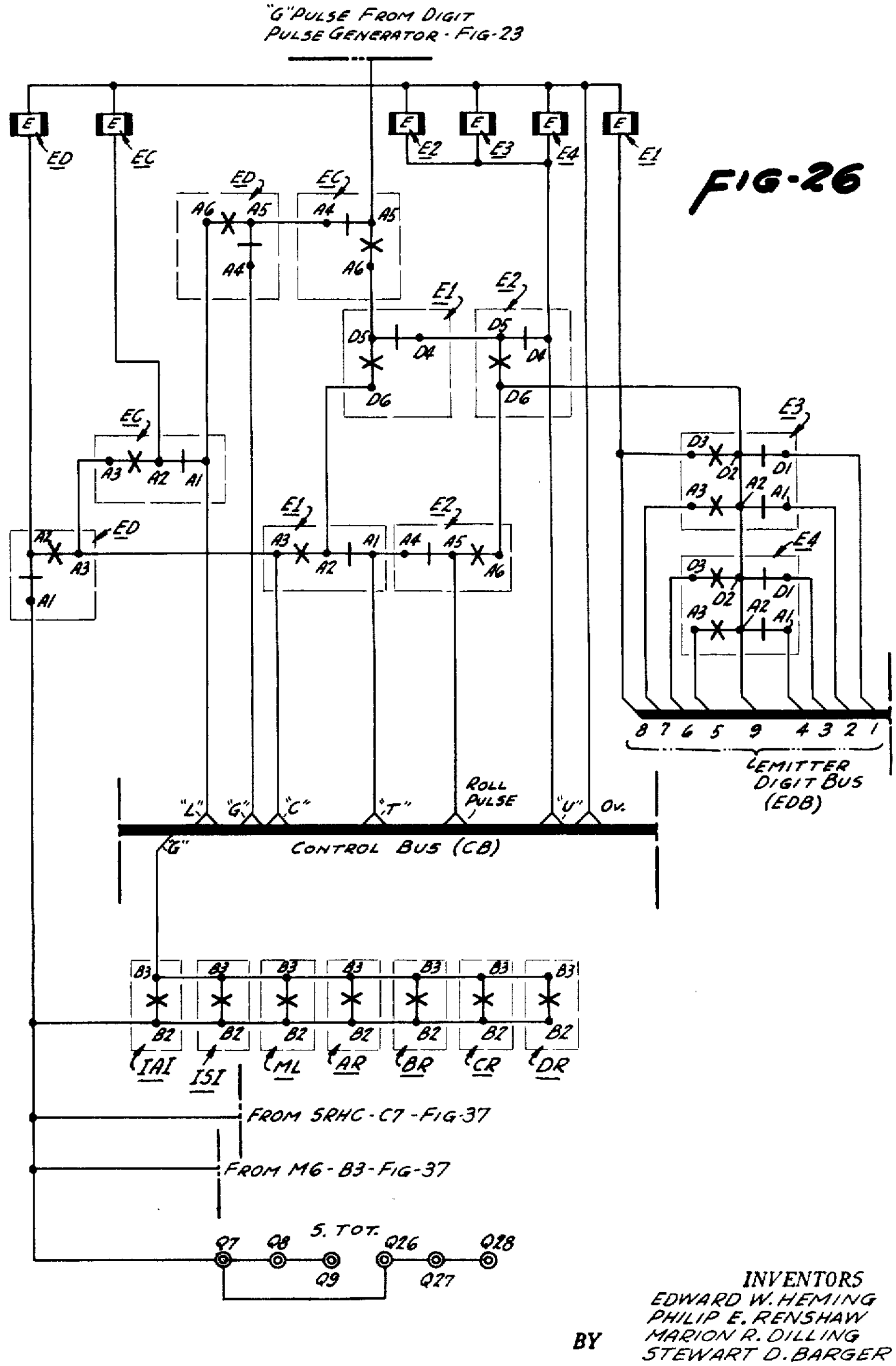

The emitter, the circuit of which is shown in FIG. 26, is the pulse control center of the computer unit, for it is with the emitter that command signals are generated for transferring information from the IOB to any desired register, or from any desired register back into the IOB. The emitter command signals are also employed in performing multiplication functions.

In general terms, the emitter utilizes a plurality of pulse relays 150 to switch a chain of G pulses generated by the operation of the G-pulse generator breakers cams 75 and 76, FIG. 23, onto six different emitter output lines which are then sent through the computer unit control bus to the desired points of use. These six output lines will have command pulses appearing thereon in a given time sequence so that the computer unit components will operate in a desired sequence, as will be described more fully hereinafter.

At the same time, the emitter will switch the chain of pulses to an "emitter digit bus," which has nine separate output lines, so that each of the nine lines will have differing numbers of pulses on each line, from one pulse on the first line up to nine pulses on the ninth line.

To illustrate the sequential operation of the emitter, Table No. 1 has been prepared. The first column of the table indicates the sequential step of the operation, each step occurring at a discrete time interval from the preceding step. The second column indicates the time occurrence of a series of G pulses, generated by the G-pulse generator and delivered to the emitter. Column three indicates a relay coil in the emitter, if any, energized by one of the G pulses. Column four indicates the time occurrence of the actuation of the relay switches from their normal positions, as shown on FIG. 23, and column five indicates the time occurrence of the return of the actuated switches to their normal positions.

Columns 6 through 11 indicate the various output lines connected to the control bus, and the time occurrence of the various pulses of column two thereon, and columns 12 through 20 indicate the various output lines of the emitter digit bus and the time occurrence of the various pulses of column two on each line thereof.

(1) With the emitter not in operation, a G pulse, here designated by G(1), generated by the G-pulse generator, will pass through the normally closed contacts A5–A4 of the EC and ED relays to be impressed upon the "G-pulse" line of the control bus. The emitter is started into operation by previously closing a switch, such as the IAI contacts (B3–B2). This will allow the G(1) pulse to be applied through IAI(B3–B2) and the normally closed contacts (A1–A2) of the ED relay to energize the E-coil of the ED relay.

(2) All of the ED relay switch contacts will be moved to operated condition, and, as before described, the closing of the ED relay contacts B2–B3 (FIG. 23) will allow the G-pulse generator to continue in operation. The relay contacts in Step two will be switched after the end of the G(1) pulse of step one and before the beginning of the next G pulse, G(2). This will be true throughout the description, that is the relay contacts will be switched in the interval between consecutive G pulses.

(3) The next G pulse, G(2), will pass through the normally closed contacts A5–A4 of the EC relay, and the now closed contacts A5–A6 of the ED relay to appear on the "L-pulse" line of the control bus. The (G2) pulse also passes through the normally closed contacts A1–A2 of the EC relay to energize the E-coil of the EC relay.

(4) Before the next G pulse occurs, all of the EC relay switch contacts are moved to operated position.

(5) The next G pulse, G(3), passes through the now closed contacts A5–A6 of the EC relay, and the normally closed contacts D5–D4 of the E1 and E2 relays, to appear on the "U-pulse" line of the control bus. The G(3) pulse also energizes the E-coils of the E2, E3 and E4 relays.

Figure 16:
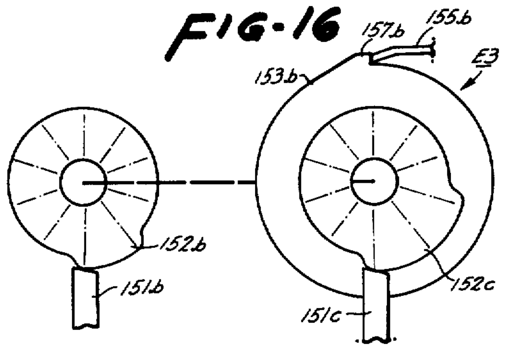
FIGS. 15, 16, 17 and 18 illustrate schematically the various pulse relays used in the emitter section of the computer unit.
Figure 15:
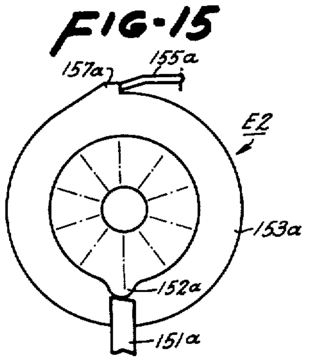
Figure 17:
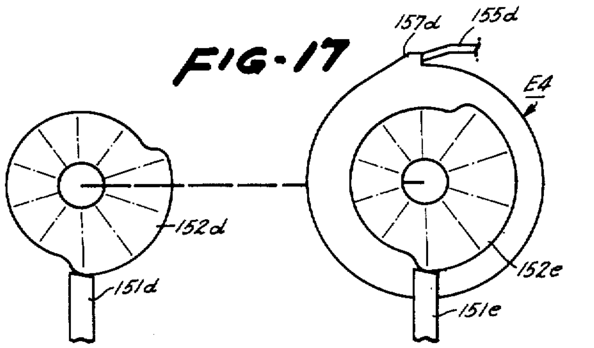

The E2, E3 and E4 relays are of the same general mechanical structure and operation as the pulse relays 150, and the escapement wheel and pushbars of each are schematically illustrated in FIGS. 15, 16 and 17, respectively. As is seen, the escapement wheel 153*a* of the E2 relay has a single escapement tooth 157*a* thereon, so that when the pallet lever 155*a* is moved out of engagement with the tooth by a single pulse applied to the E-coil thereof, the escapement wheel will be rotated through a complete revolution before it is again stopped by the pallet

*Table No. 1*

Emitter Operation

| | Pulses from G-Pulse Generator | Emitter Relay Coil Energized | Relay Contacts Moved to Actuated Position | Emitter Operation | | | | | | | | | | | | | | | |
|---|---|---|---|---|---|---|---|---|---|---|---|---|---|---|---|---|---|---|---|
| | | | | Relay Contacts Restored to Normal Position | Emitter Output Lines | | | | | | | | | | | | | | |
| | | | | | Control Bus | | | | | | Emitter Digit Bus | | | | | | | | |
| | | | | | G | L | U | Roll | T | C | 1 | 2 | 3 | 4 | 5 | 6 | 7 | 8 | 9 |
| 1 | G(1) | ED | | | G | | | | | | | | | | | | | | |
| 2 | | | ED—all | | | | | | | | | | | | | | | | |
| 3 | G(2) | EC | | | | L | | | | | | | | | | | | | |
| 4 | | | EC—all | | | | | | | | | | | | | | | | |
| 5 | G(3) | E2, E3, E4 | | | | | U | | | | | | | | | | | | |
| 6 | | | E2—all | | | | | | | | | | | | | | | | |
| 7 | G(4) | | | | | | | 1 | | | 1 | 1 | 1 | 1 | | | | | 1 |
| 8 | | | E3—D Contacts | | | | | | | | | | | | | | | | |
| 9 | G(5) | | | | | | | 2 | | | | 2 | 2 | 2 | | | | 1 | 2 |
| 10 | | | E3—A Contacts | | | | | | | | | | | | | | | | |
| 11 | G(6) | | | | | | | 3 | | | | | 3 | 3 | | | 1 | 2 | 3 |
| 12 | | | E4—D Contacts | | | | | | | | | | | | | | | | |
| 13 | G(7) | | | | | | | 4 | | | | | | 4 | | 1 | 2 | 3 | 4 |
| 14 | | | E4—A Contacts | | | | | | | | | | | | | | | | |
| 15 | G(8) | | | | | | | 5 | | | | | | | 1 | 2 | 3 | 4 | 5 |
| 16 | G(9) | | | | | | | 6 | | | | | | | 2 | 3 | 4 | 5 | 6 |
| 17 | G(10) | | | | | | | 7 | | | | | | | 3 | 4 | 5 | 6 | 7 |
| 18 | G(11) | | | | | | | 8 | | | | | | | 4 | 5 | 6 | 7 | 8 |
| 19 | G(12) | | | | | | | 9 | | | | | | | 5 | 6 | 7 | 8 | 9 |
| 20 | | | E1—D Contacts | E2—all, E3—all, E4—all. | | | | | | | | | | | | | | | |
| 21 | G(13) | | | | | | | 10 | T | | | | | | | | | | |
| 22 | | | E1—A Contacts | | | | | | | | | | | | | | | | |
| 23 | G(14) | ED, EC | | | | | | | | | | C | | | | | | | |
| 24 | | | | E1—all | | | | | | | | | | | | | | | |
| 25 | G(15) | | | | G | | | | | | | | | | | | | | |

lever. As has been explained previously, the escapement wheel will be rotated through a complete revolution in the time that 10 G pulses are generated.

The E1 relay escapement wheel 150*a* has a single cam lobe 152*a* thereon adapted to engage the single pushbar 151*a*. With the escapement wheel held against rotation by the pallet lever, the cam lobe will hold the pushbar in its downward position. The cam lobe 152*a* is designed so that when the escapement wheel is released for rotation by a G pulse, the pushbar will be allowed to move upwardly before the next succeeding G pulse is generated, and the pushbar will be returned to its normal downward position just before a full revolution of the escapement wheel is completed.

The E3 relay is similar to the E2 relay, in that a single escapement tooth 157*b* is provided, but the E3 relay escapement wheel 153*b* has two cam lobes 152*b* and 152*c* operating on two pushbars 151*b* and 151*c*. Again, when the E3 escapement wheel 153*b* is at rest, the two pushbars will be held in their normal downward position by the cam lobes. The cam lobes are designed so that when the pallet lever 155*b* releases the escapement wheel for rotation by a first G pulse, cam lobe 157*b* will allow pushbar 151*b* to move upwardly in the interval between the second and third succeeding G pulses, in a string of G pulses, and switch the D1–D2–D3 switch contacts associated therewith, and cam lobe 152*c* will allow pushbar 151*c* to be moved upwardly in the interval between the third and fourth G pulses, to switch the A1–A2–A3 contacts associated therewith to operated position. Both pushbars 151*b* and 151*c* will be returned to their normal positions just before a full revolution of the escapement wheel is complete.

The E4 relay is similar to the E3 relay, and the cam lobes 152*d* and 152*e* are designed so that when a first G pulse causes the pallet lever 155*d* to release the escapement wheel 153*d* for rotation, the pushbar 151*d* will be allowed to move upwardly in the interval between the fourth and fifth G pulses to switch the D1–D2–D3 switch contacts, and the pushbar 151*e* will be allowed to move upwardly in the interval between the fifth asd sixth G pulses, to switch the A1–A2–A3 switch contacts to operated position.

(6) Before the next G pulse occurs, all of the E2 relay switch contacts will be moved to operated position.

(7) The G(4) pulse passes through EC(A5–A6), E1(D5–D4) and E2(D5–D6), to appear on line 9 of the emitter digit bus. The G(4) pulse also passes through the still normally closed contacts D2–D1 of the E1 relay to line 1 of the emitter digit bus, the contacts A2–A1 of the E2 relay to appear on line 2 of the emitter digit bus, and the contacts D2–D1 and A2–A1 of the E4 relay to appear on lines 3 and 4 of the emitter digit bus.

The G(4) pulse also passes through the now closed contacts A6–A5 of the E2 relay to appear on the "roll pulses" line of the control bus.

(8) Before the next G pulse occurs, the D1–D2–D3 contacts of the E3 relay are switched.

(9) The G(5) pulse again passes through the same route as the preceding pulse to appear on the emitter digit bus lines 9, 2, 3 and 4 and through the now closed contacts D2–D3 of the E3 relay to appear on the emitter digit bus line 8.

The G(5) pulse also appears on the roll pulses line of the control bus.

The G(5) pulse also energizes the E-coil of the E1 relay. This relay (FIG. 18) is of the same type as the E3 and E4 relays in that it has a single escapement tooth 157*f* and two cam operated pushbars 151*f* and 151*g*. The cam lobes 152*f* and 152*g* are designed so that when the pallet lever 155*f* releases the escapement wheel 153*f* for rotation by the first of a chain of G pulses, the cam lobe 152*f* will allow the pushbar 151*f* to move upwardly in the interval between the eighth and ninth G pulses to switch the A1–A2–A3 contacts to operated position, and the cam lobe 152*g* will allow the pushbar 151*g* to move upwardly in the interval between the ninth and tenth G pulses to switch the D4–D5–D6 contacts to operated position. Both pushbars will be moved downwardly to their normal positions after the tenth G pulse to return all of the switch contacts of the E1 relay to their normal positions.

(10) Before the G(6) pulse, the A1–A2–A3 contacts of the E3 relay are switched.

(11) By the same paths as described in the last G pulse, the G(6) pulse appears on the emitter digit bus lines 9, 3, 4 and 8, and through the now closed contacts A2–A3 of the E3 relay to line 7.

The G(6) pulse also appears on the roll pulses line of the control bus.

(12) The contacts D1–D2–D3 of the E4 relay are switched.

(13) By the same paths as in the G(5) pulse, the G(6) pulse appears on the emitter digit bus lines 9, 4, 8 and 7, and through the now closed contacts D2–D3 of the E4 relay to line 6.

Again, the G(6) pulse appears on the roll pulses line of the control bus.

(14) The contacts A1–A2–A3 of relay E4 are switched.

(15) Again, the G(7) pulse appears on the emitter digit bus lines 9, 8, 7 and 6, and through the now closed contact A2–A3 of the E4 relay to line 5.

The G(7) pulse also appears on the roll pulses line of the control bus.

(16–19) The next four G pulses, G(8) through G(12), are each applied as in the previous pulse to the emitter digit bus lines 9, 8, 7, 6 and 5, as well as to the roll pulses line of the control bus.

(20) The contacts D4–D5–D6 of the E1 relay are now switched. All of the pushbars of the E2, E3 and E4 relays are returned to their normal positions as the escapement wheels thereof have completed a full revolution.

(21) The G(13) pulse passes through the still closed contacts A5–A6 of the EC relay, the now closed contacts D5–D6 of the E1 relay, and the still normally closed contacts A2–A1 of the E1 relay to appear on the "T-pulse" line of the control bus. The G(13) pulse also passes through the again normally closed contacts A4–A5 of the E2 relay to appear on the roll pulses line of the control bus.

(22) The contacts A1–A2–A3 of the E1 relays are now switched.

(23) The G(14) pulse follows the same initial path as the G(13) pulse, but is now switched through the now closed contacts A2–A3 of the E1 relay to appear on the "G-pulse" line of the control bus.

The G(14) pulse also passes through the still closed contacts A3–A2 of both the EC and ED relays to again energize the E-coils of these two relays.

(24) Before the next G pulse, all contacts of the ED and EC relays will be returned to their normal positions. The E1 relay will now have completed a full revolution, and its contacts will be restored to normal positions.

(25) Since all of the emitter relays have been restored to their normal positions, the G(15) pulse will follow the same path as the G(1) pulse, and will appear on the G-pulse line of the control bus. If the IA1 contacts (B2–B3) (FIG. 24) are still closed, another emitter cycle of operation will begin.

By the preceding sequence of operations, the series of G pulses has been switched to the different lines of the control bus so that in consecutive order an L pulse will appear on the L-pulse line, a U pulse will appear on the U-pulse line, ten roll pulses will appear on the roll pulses line, a T pulse will appear on the T-pulse line (at the same time that the tenth roll pulse occurs) and a C pulse will appear on the C-pulse line.

At the same time as the first nine of the ten roll pulses appear on the roll pulses line, pulses will appear on the emitter digit bus lines 1 through 9, with one pulse on line 1, two pulses on line 2, three pulses on line 3, and so on, up to nine pulses on line 9.

In the figures of the drawings, to be hereinafter described, the control bus and emitter digit bus are shown, with various designated lines of these buses being connected to the computer unit circuits. It is to be realized that whenever a pulse is applied to any of these lines by the emitter, the same pulse will be present on the corresponding line at any part of the computer. The following description will indicate the purpose and use of each of the above described pulses.

TRANSFER OF NUMERICAL INFORMATION FROM THE TYPEWRITER INTO THE COMPUTER

As has been described previously, the operation of any number key of the typewriter will energize preselected output lines of the typewriter encoder 26 (FIG. 21) with 6–10 millisecond pulses. The manner in which these pulses will enable the computer to receive numerical information from the typewriter will now be described.

To illustrate this operation, let it be assumed that the typist wishes to enter the number "128" into the computer, by typing the 1, 2 and 8 typewriter keys in succession. As an aid in the explanation of this operation, the following table of consecutive operations has been prepared. The first column indicates the time spaced steps of operation. Column two indicates the typewriter key operated by the typist. Column three indicates the pulse generated at the particular step which is used to energize the desired relays. Column four indicates the particular relays energized by the pulses in column three, which relays then move their contacts from the position illustrated to their operated position. Column five indicates the particular relays energized by the pulses in column three, which relays then restore their contacts from their operated positions to their illustrated normal positions.

25). On FIG. 15, this K pulse passes through K(B5–B6), HG4(1–3), KF4(A1–A2) to energize the KF4 relay coil.

Relay KF16 is similarly energized.

The relays HG4 and HG16 will open at the end of the K pulse.

(3) Since the KF4 and KF16 relays are now operated, a G pulse will be generated (FIG. 23), with this G pulse being delayed approximately 14 milliseconds after the end of the K pulse because of the delay due to the operation of the access cam breaker 77.

On FIG. 15, the G pulse passes through K(A6–A5), KF8(D5–D4), KF16(D6–D5), KF32(D5–D4), SRC(B5–B4), KF4(C2–C3), I14(B1–B2) to 0 volts to energize the E-coil of the I14 relay.

The KF4 relay is restored by this G pulse passing through the following route: G pulse, diode XR1(A4–A3), HG4(B4), KF4(A3–A2), KF4 (E-coil), 0 volts.

The KF16 relay is similarly restored.

(4) The typist now strikes the "2" typewriter key to energize the encoder output lines 1, 4 and 16, which then energize the HG1, HG4 and HG16 relays as in step 2.

(5) The K pulse, generated by operating the "2" typewriter key, energizes the KF1, KF4 and KF16 relays as in step 3 above, and the HG1, HG4 and HG16 relays drop-out.

(6) The G pulse, delayed in generation until after the KF1, KF4 and KF16 relay contacts move to operated position, energizes the I11 relay as follows: G pulse, K(A6–A5), KF2(D5–D4), KF16(D6–D5) K32(D5–D4), SRC(D5–D4), KF1(C2–C3)—I11(B1–B2)—I11(E-coil), 0 volts.

The G pulse also energizes the I24 relay by the following route: G pulse, K(A6–A5), KF2(D5–D4), KF16(D6–D5), K32(D5–D4), I14(C2–C3), I24(B1–B2), I24(E-coil), 0 volts.

*Table No. 2*

TRANSFER OF NUMERICAL INFORMATION (e.g. "128") FROM TYPEWRITER TO IOB

| Step | Typewriter Key Struck | Pulse Generated | Relay Coil Energized to move contacts to operated position | Relay Coil Energized to restore contacts to normal position | IOB Relay Indications |
|---|---|---|---|---|---|
| A | | | K | | 0000000000 |
| 1 | 1 | Encoder | HG4, HG16 | | |
| 2 | | K | KF4, KF16 | HG4, HG16 | |
| 3 | | G | I14 | KF4, KF16 | 0000000001 |
| 4 | 2 | Encoder | HG1, HG4, HG16 | | |
| 5 | | K | KF1, KF4, KF16 | HG1, HG4, HG16 | |
| 6 | | G | I11, I24 | KF1, KF4, KF16 | 0000000012 |
| 7 | 8 | Encoder | HG1, HG2, HG8, HG16 | | |
| 8 | | K | KF1, KF2, KF8, KF16 | HG1, HG2, HG8, HG16 | 0000000012 |
| 9 | | G | I12, I18, I21, I34 | I14 | 0000000128 |
| B | | | | K | |

(A) The K relay, FIG. 41, is energized by the program unit in a manner to be hereinafter described. The movement of the K relay contacts to their operated position conditions the computer to receive numerical information from the typewriter.

(1) The typist now strikes the "1" typewriter key. As has been previously explained, this will energize the typewriter encoder output lines 4 and 16 by a 6–10 millisecond pulse. The pulse on line 4, passing through K(B7–B8) and amplified by a conventional transistor amplifier TA–4 (FIG. 36) energizes the mercury relay HG4, to close the contacts (3–1) thereof and open the contacts (4–1) thereof. Resistor R63 and capacitor C63 provide a time delay in the drop-out of relay HG4 so that the relay will remain energized for at least about 8 milliseconds, in case the encoder pulse is shorter than this length of time.

The mercury relay HG16 is similarly energized.

(2) As has been explained, any operation of the typewriter energizes the common output line from the typewriter encoder to produce a 6 millisecond K pulse (FIG.

The I14 relay remains operated because the contacts I14(B1–B2) are now open, and the G pulse cannot get through to the E-coil of the I14 relay.

(7) The typist now strikes the "8" typewriter key to energize the typewriter encoder output lines 1, 2, 8 and 16, which energize the HG1, HG2, HG8 and HG16 relays, as in step 2 above.

(8) The K pulse energizes the KF1, KF2, KF8 and KF16 relays as in step 3, and the HG1, HG2, HG8 and HG16 relays drop out.

(9) The G pulse energizes the I12, I18, I21 and I34 relays in the same manner as in step 6 above. I24 and I11 remain in operated position.

The G pulse also restores the I14 relay by the following route: G pulse, K(A6–A5), KF4(D5–D4), KF16(D6–D5), KF32(D5–D4), SRC(B5–B4)–KF4(C2–C1), IR(B4–B5), I14(B3–B2), I14(E-coil), 0 volts.

B) The K relay is restored by the program unit in a manner to be hereinafter described, to disrupt communication between the typewriter and computer.

The section of the computer which includes the forty relays designated by I11, I12, I14, I18, I21, I22, I24, I28, . . . I101, I102, I104, I108 will be referred to in this description as the IOB, or Input-Output Buffer. The forty relays are divided into ten groups of four, with each group representing in binary excess three manner one of the digits of a possible ten digit number.

After step 3 above, the I14 relay is the only IOB relay actuated, to indicate the binary-excess three representation of the number "1" in the first IOB position (i.e., tenth group of four IOB relays).

After step 6, the operated relays are I24, I11, and I14, to indicate the binary-excess three representation of the numbers "1" and "2" in the second and first IOB positions.

After step 9, the operated IOB relays are I34, I21, I24, I11, I12 and I18, indicating the binary-excess three representation of the numbers "1," "2" and "8" in the third, second and first IOB positions, respectively. As will be noted, each number that is typed is entered into the first IOB position, and the number represented in each IOB position is shifted to the next highest IOB position as the new number comes in. This shifting occurs whenever a G pulse is applied to the IOB advance line.

During the above process; i.e., whenever the K relay has been operated, the KF1, KF2, KF4, KF8, KF16, and KF32 relays will be operated in response to any key operation of the typewriter. However, only numbers can enter the IOB, since the G pulse can only get to the IOB advance line if the KF16 relay has been operated and the KF32 relay has not been operated. All keys of the typewriter other than the number keys are connected to the input terminals of the typewriter encoder such that either the 16 line is not energized, or, if the 16 line is energized, the 32 line is also energized. These conditions will prevent the G pulse from then getting to the IOB advance line and thus will prevent the actuation of the first IOB position in accordance with the operation of the KF relays. The only exception to the above is the "comma" key, whose operation will energize the encoder output lines 1, 2, 4, 8 and 16, and thus will operate the KF1, KF2, KF4, KF8 and KF16 relays. However, this will open the D5–D4 contacts of the KF1, KF2, KF4 and KF8 relays to prevent a G pulse from getting through to the IOB advance line.

In the operations discussed above, the time required for a number to be entered from the typewriter to the IOB will range from about 35 to 55 milliseconds, depending upon the time delay between the end of the K pulse and the closing of the access cam in the G-pulse generator. However, the maximum time of 55 milliseconds is considerably shorter than the average speed of a standard electric typewriter (approximately 100 milliseconds per character), and thus there is no possibility that the typewriter can be operated by the typist at a speed greater than the number can be entered into the IOB.

TRANSFER OF NUMERICAL INFORMATION FROM THE IOB TO THE A REGISTER

Having thus described the manner in which numerical information can be entered into the IOB from the typewriter and the sequence of operations of the emitter, the manner in which numerical information in the IOB can be transferred to any register will now be described.

In order to best describe this transfer, let it be assumed that the number "128" has been put into the IOB, as described above, and let it be assumed that the A register has already accumulated the number 472 therein. The IOB relays which are presently energized are the following: I34, I21, I24, I11, I12 and I18. The A register counters stand at 0000000472.

Table No. 3, similar to Table No. 2, has been prepared to illustrate the sequential operation of the transfer function from the IOB to the A register.

*Table No. 3*

TRANSFER OF NUMERICAL INFORMATION (e.g. "0000000128") FROM IOB TO A REGISTER, TO ADD TO NUMBER (e.g. "472") IN A REGISTER

| Step | Pulse Generated | Relay Coil Energized to move contacts to operated position | Relay Coil Energized to restore contacts to normal position | A Register counter indications (A1–A10) |
|---|---|---|---|---|
| A | | AI, IAI, ED | | 0000000472 |
| 1 | G | | | |
| 2 | U | A1–A10(U) | | |
| 3–11 | 1–9 | A1 (8), A2 (2), A3 (1). | | 0000000690 |
| 12 | T | AC | AI, IAI | |
| 13 | C | A2, A3, IR1–IR6 | AC, ED | 0000000600 |
| 14 | | | IOB, IR1–IR6 | 0000000600 |

(A) To condition the computer to perform a plus transfer from the IOB to the A register, the AI, IAI and ED relays will have been energized by the program unit in a manner to be hereinafter described. The energization of the ED relay will cause an emitter cycle of pulses.

(1) The first emitter pulse, the L pulse, is not used in this transfer, and performs no operations.

(2) The U pulse energizes the U-coils of all of the A register counters A1 through A10, since the U-pulse line (FIGS. 27 and 28) is connected directly to these U-coils. If any of the 10-pushbars of these counters had been previously moved down and latched, they will now be unlatched for upward movement. If these 10-pushbars had not previously been moved down and latched, the energization of the U-coil will have no effect.

(3–11) The next nine pulses are applied by the emitter to the nine emitter digit bus lines, and are used to transfer the contents of the IOB positions simultaneously to the corresponding A register accumulating positions. In this transfer, one pulse will be sent from the third IOB position to the third A register counter A3, two pulses will be sent from the second IOB position to the second A register counter A2 and eight pulses will be sent from the first IOB position to the first A register counter A1.

Figure 35:
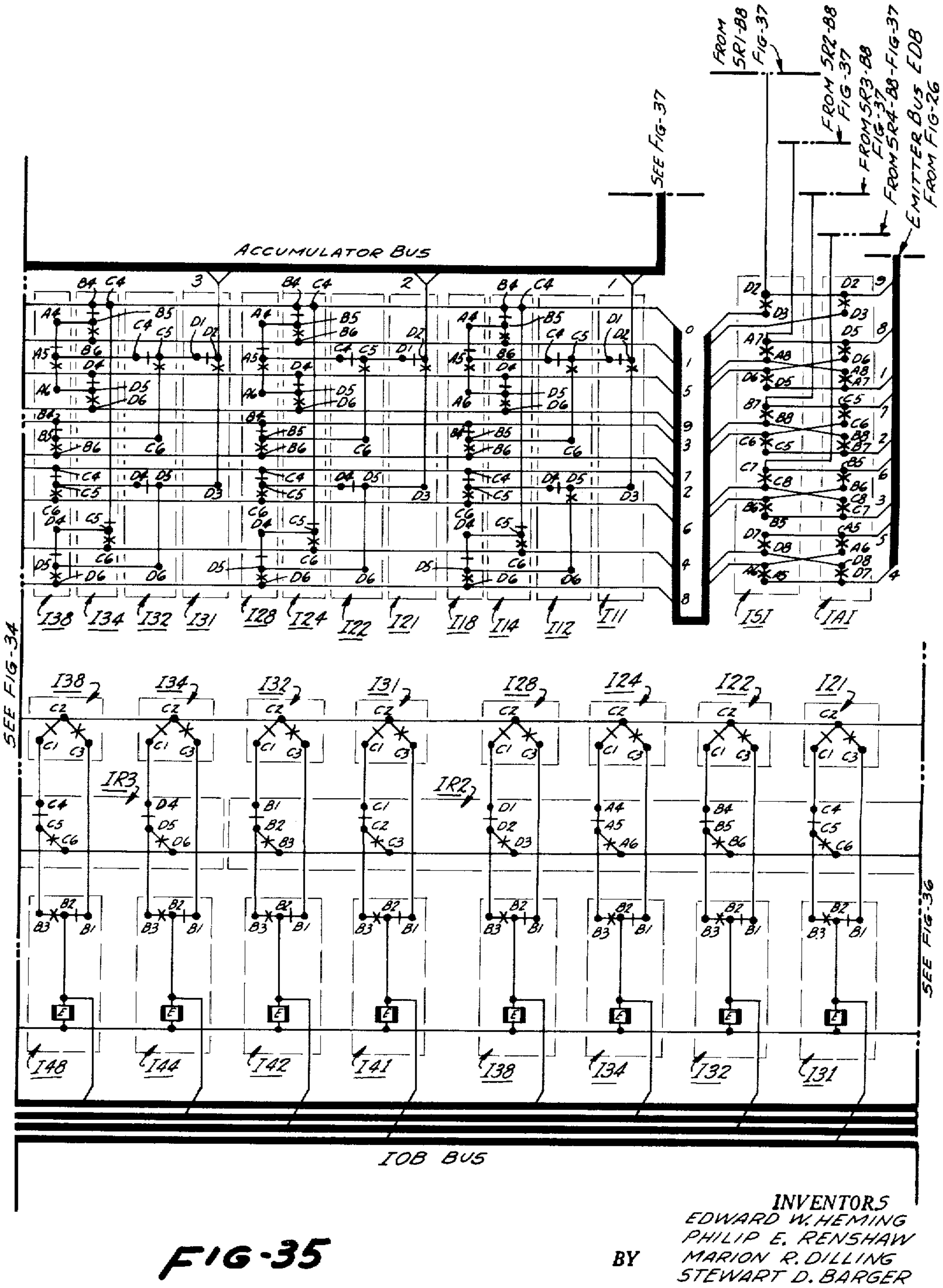

The completed circuit from the third IOB position to the A register counter A3 is as follows: (FIG. 35) Emitter digit bus line 1, IAI(D5–D6), I34(B6–B5), I38(A4–A5), I32(C4–C5), I31(D1–D2), accumulator bus line 3, (FIG. 28) accumulator bus line 3, AI(B7–B8), A3(E-coil) 0 volts. The one pulse on emitter digit bus line 1 will pulse the E-coil of the A3 counter once during these steps.

The completed circuit from the second IOB position to the A register counter A2 is as follows: (FIG. 35) Emitter digit bus line 2, IAI(B7–B8), I28(C4–C5), I22(D4–D5), I21(D3–D2), accumulator bus line 2 (FIG. 28), accumulator bus line 2, AI(C7–C8), A2(E-coil), 0 volts. The two pulses on the emitter digit bus line 2 will pulse the A2(E-coil) twice.

The completed circuit from the first IOB position to the first A register counter A1 is as follows: (FIG. 35) Emitter digit bus line 8, IAI(D5–D6), I18(D6–D5), I12(D6–D5), I11(D3–D2) accumulator bus line 1 (FIG. 28), accumulator bus line 1, AI(D7–D8), A1(E-coil), 0 volts. The eight pulses on the emitter digit bus line 8 will pulse the A1(E-coil) eight times during these steps.

The A register counters now indicate the following number: 0000000590. Since the A2 counter stands at "9," the 9-pushbar thereof is moved down to switch the B contacts thereof. The A1 counter has moved to "0" which has caused the 10-pushbar thereof to move down and latch the C contacts in operated position.

(12) The T pulse energizes the C relay for a "carry" function as follows: (FIG. 29) T pulse, AI(B2–B3), AC(A1–A2), AC(E-coil), 0 volts.

The T pulse restores the AI relay. (FIG. 29) T pulse, AI(A3–A2), AI(E-coil), 0 volts.

The T pulse also restores the IAI relay (FIG. 41) T pulse, IAI(A3–A2), IAI(E-coil), 0 volts.

(13) The C pulse performs a "carry" function to pulse both the A3 and A2 counters so that the A register will indicate 0000000600.

The A3 counter is pulsed as follows: (FIG. 28) C pulse, A1(C1–B2) (on 10-pushbar of A1), A2(B1–B2) (on 9-pushbar of A2), AC(B7–B8), A3(E-coil), 0 volts.

The A2 counter is pulsed as follows: (FIG. 28) C pulse, A1(C1–B2), AC(C7–C8), A2(E-coil), 0 volts.

The C pulse also conditions the IOB to be restored to zero indicating position, by energizing the IR relays as follows: (FIG. 27) C pulse, RC2(A5–A4), MC(B1–B2), IR1–IR6(A1–A2), IR1–IR6(E-coils), 0 volts.

The C pulse restores the AC relays to normal position (FIG. 29) C pulse, AC(A3–A2), AC(E-coil), 0 volts.

The C pulse also stops the emitter by restoring the ED relay as follows: (FIG. 26) C pulse, ED(A3–A2), ED(E-coil), 0 volts.

(14) The next G pulse restores the IOB relays to zero indicating position by the following circuit: (FIG. 32) G pulse, MS(C1–C2), the closed contacts of all of the IR1–IR6 relays to the B3 terminals of the normally closed contacts B2–B3 of each of the IOB relays. If any of these IOB relays are in operated position, the G pulse will pass through the now closed B2–B3 contacts thereof to energize the E-coils of the operated IOB relays to return their contacts to normal position. If the IOB relays had not been energized, the B2–B3 contacts will be open and the G pulse cannot get through to the E-coils of the relays. Thus, the G pulse will restore only those IOB relays which had been moved to operated position.

The G pulse also restores the IR1–IR6 relays to normal position as follows: (FIG. 27) G pulse, MS(C1–C2), IR1–IR6(A3–A2), IR(E-coils), 0 volts.

This completes the transfer from the IOB to the A register. If it had been desired to transfer the IOB contents to the B, C or D registers instead, the BI, CI or DI relays would have been energized in step A instead of the relay AI. The sequence of operations would then be precisely the same as above described. These registers have been illustrated in block form on the drawings for the purpose of simplicity, with the internal wiring thereof not shown, as such internal wiring is exactly the same as that shown in the A register.

The transfer from the IOB to the A register could have been in a nine-complement form if it had been desired to subtract the IOB into the A register. In this case, the ISI relay would have been energized in step A instead of the IAI relay. The effect of this would be, in the above described operation, to connect the emitter digit bus line 8 to the A register counter A3, the emitter digit bus line 7 to the A register counter A2 and the emitter digit bus line 1 to the A register counter A1. In addition, the emitter digit bus line 9 would be connected to all the A register counters A4 through A10. In the above operation, wherein the number 472 had originally been accumulated in the A register, the accumulation after step 11 would be as follows:

0000000472
9999999871
9999999243

In step 13, the C pulse would pulse all of the A register counters except A2, so that the following result would be achieved:

9999999243
1111111101
0000000344 which is the true subtraction of 128 from 472.

TRANSFER OF NUMERICAL INFORMATION FROM THE A REGISTER TO THE IOB

Having thus described the manner in which numerical information may be transferred from the IOB to the A register, it will now be described how the A register contents can be transferred back into the IOB. Such a transfer can be accomplished with or without restoring the A register to zero indicating position, as desired. Again, for purposes of illustration, let it be assumed that the number "128" is stored in the A register.

Table No. 4 illustrates the sequence of operations of a transfer from the A register to the IOB without the A register being restored to zero.

*Table No. 4*

TRANSFER OF NUMERICAL INFORMATION (e.g. "0000000128") FROM A REGISTER TO IOB, WITHOUT RESTORING A REGISTER TO ZERO-INDICATING POSITION

| Step | Pulse Generated | Relay Coil Energized to move contacts to operated position | Relay Coil Energized to restore contacts to normal position |
|---|---|---|---|
| A |  | ED, AO1, AO2, AO4, AO8 |  |
| 1 | G | I11, I12, I18, I21, I24, I34 |  |
| 2 | U |  | AO1, AO2, AO4, AO8. |
| 3–11 | 1–9 |  |  |
| 12 | T |  |  |
| 13 | C | IR1–IR6 | ED. |
| 14 | G |  | IOB, IR1–IR6. |

(A) This step is performed by the programmer in a manner to be hereinafter described, and energizes the A register output relays AO1, AO2, AO4 and AO8. In addition, the ED relay is energized to start an emitter cycle.

(1) The L pulse passes simultaneously through the static read-out brushes of all of the A register counters to transfer the A register contents to the IOB. For example, the A register counter A1 stands at "8," and the read-out brush 120 will connect the common ring 122, connected to terminal C7, to the read-out segments 1, 2 and 8, connected to terminals A7, A8 and D6, respectively.

The L pulse energizes the IOB relay I11 by the following circuit: (FIG. 29) L pulse, A1(C7–D5), AO1(D7–D8), IOB bus (position 1 line 1) (FIG. 36) IOB bus (position 1 line 1), I11(E-coil), 0 volts.

The IOB relay I12 is energized as follows: (FIG. 29) L pulse, A1(C7–A8), AO2(D7–D8), IOB bus (position 1 line 2) (FIG. 36) IOB bus (position 1 line 2), I12(E-coil), 0 volts.

The IOB relay I18 is energized as follows: (FIG. 29) L pulse, A1(C7–D6), AO8(D7–D8), IOB bus (position 1 line 8) (FIG. 36) IOB bus (position 1 line 8), I18(E-coil), 0 volts.

The IOB relays I21, I24 and I34 are similarly energized.

Thus, the contents of the A register counters are simultaneously transferred to the IOB positions by a single pulse.

(2) The U pulse restores the A register output relays AO1, AO2, AO4 and AO8. For example, the AO8 relay is restored as follows: (FIG. 29) U pulse, AO8(A3–A2), AO8(E-coil), 0 volts. The AO1, AO2 and AO4 relays are similarly restored.

(3–11) The emitter digit pulses are not used in the transfer from the A register to the IOB, but may be used at this time to transfer the IOB contents to any desired register, as described in the transfer of numerical information from the IOB to the A register, supra. Such transfer requires either the IAI or ISI relay to have been energized in step A as well as requiring one or more of the input relays AI, BI, CI or DI to have been energized in step A, depending upon the register or registers into which it is desired to transfer the IOB contents.

(12) The T pulse is not used in the present operation.

(13) The C pulse will restore the ED relay to discontinue the emitter operation as in the description of the transfer of the IOB to the A register.

The C pulse will also energize the IR1–IR6 relays to restore the IOB to zero indicating position, also as described in the transfer from the IOB to the A register.

As will be brought out later, the IR1–IR6 relays will not be energized by the C pulse if the computer is in a multiplication or read-out function.

(14) The G pulse will restore the IOB to zero indicating position and will restore the IR1–IR6 relays provided that the IR1–IR6 relays had been energized in step 13 to complete the function.

Table No. 5 illustrates the series of steps in a transfer function from the A register to the IOB in a case where the A register is to be cleared; i.e., returned to zero indicating position.

*Table No. 5*

TRANSFER OF NUMERICAL INFORMATION (e.g. "0000000128") FROM A REGISTER TO IOB, WITH A RESTORATION OF THE A REGISTER TO ZERO-INDICATING POSITION

| Step | Pulse Generated | Relay Coil Energized to move contacts to operated position | Relay Coil Energized to restore contacts to normal position |
|---|---|---|---|
| A | | AO1, AO2, AO4, AO8, AR, ED. | |
| 1 | L | I11, I12, I18, I21, I24, I34 | |
| 2 | U | | AO1, AO2, AO4, AO8. |
| 3–12 | Roll | A1 (2), A2 (8), A3 (9), A4–A10 (10). | |
| 12 | T | | AR. |
| 13 | C | IR1–IR6 | ED. |
| 14 | G | | IOB, IR1–IR6. |

(A) Step A is the same as above except that the A register restore relay AR is also energized by the programming unit.

(1 and 2) These steps are identical to those above, with the A register contents being transferred by the L pulse to the IOB, and with the U-coils of all of the A register counters A1–A10 being energized to unlatch the 10-pushbars for upward movement.

(3–12) The roll pulses, generated by the emitter, are now used to restore the A register counters. In general, a proper number of roll pulses is applied to each A register counter to move them to the "10" or "0" indicating position. Before the roll pulses are applied, the A register stands at 0000000128. Two pulses are applied to the counter A1, eight pulses are applied to counter A2, nine pulses are applied to counter A3, and ten pulses are applied to each of the counters A4 through A10.

The roll pulses are applied to the counter A1 as follows: (FIG. 28) Roll pulse line, <u>AR(D7–D8)</u>, A1(C2–C3), A1(E-coil), 0 volts. When the escapement wheel of the A1 counter has been pulsed two times, the 10-pushbar will be moved down and latched, to open the contacts A1(C2–C3) and prevent any further roll pulses from reaching the A1(E-coil).

Similarly, after 8 roll pulses have been applied to A2(E–coil) through the contacts A2(C2–C3), the A2(C2–C3) contacts will open, preventing any more roll pulses from reaching the A2(E–coil). Similarly, only nine roll pulses will reach the A3(E–coil).

The counters A4 through A10 all stand at "0" position, so the roll pulses will pulse the E–coils of these counters ten times, moving them a full revolution before the 10-pushbars are moved down and latched.

Thus, at the end of the twelfth step, all of the A register counters stand at "0" position.

Figure 29:
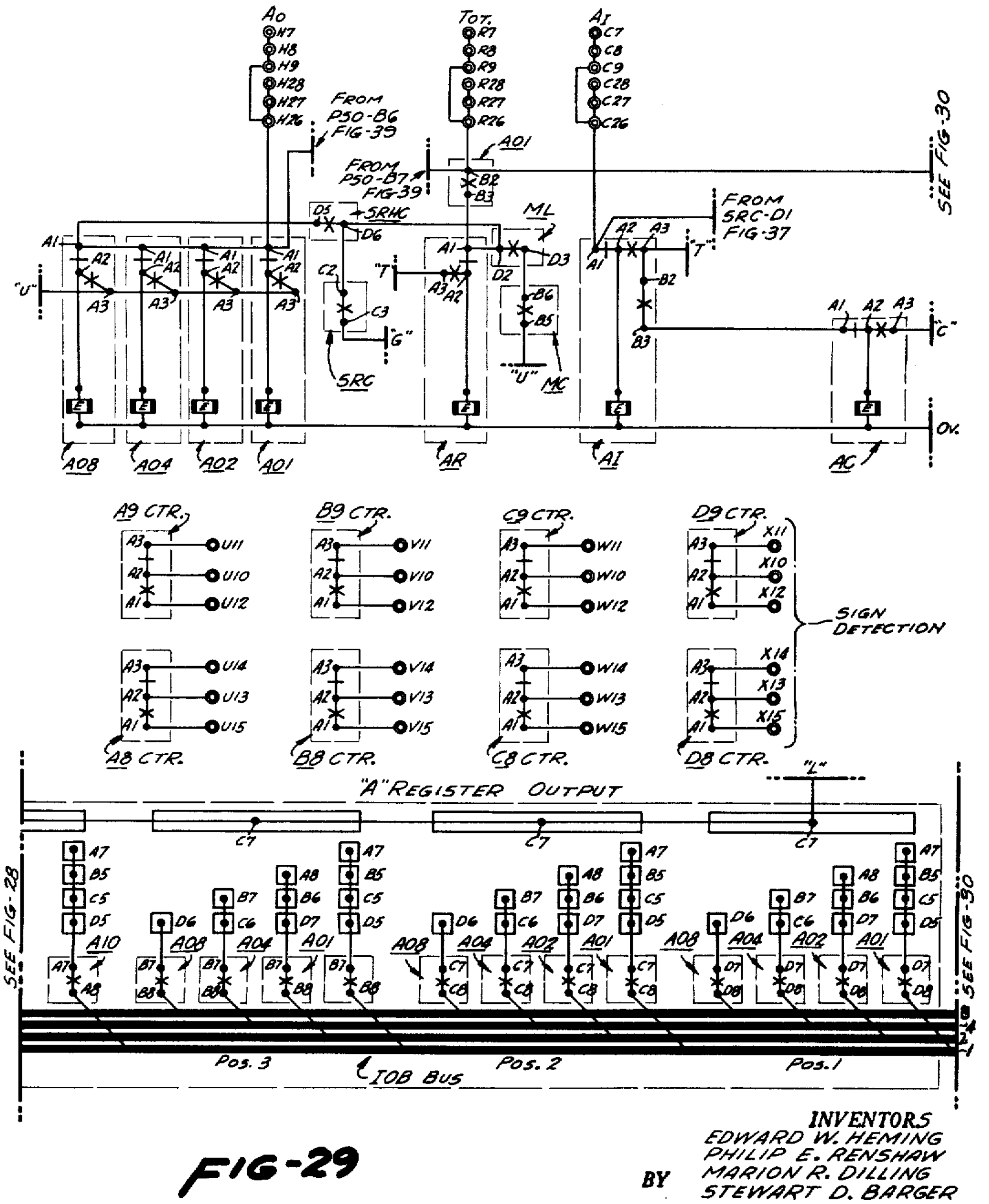
Figure 30:
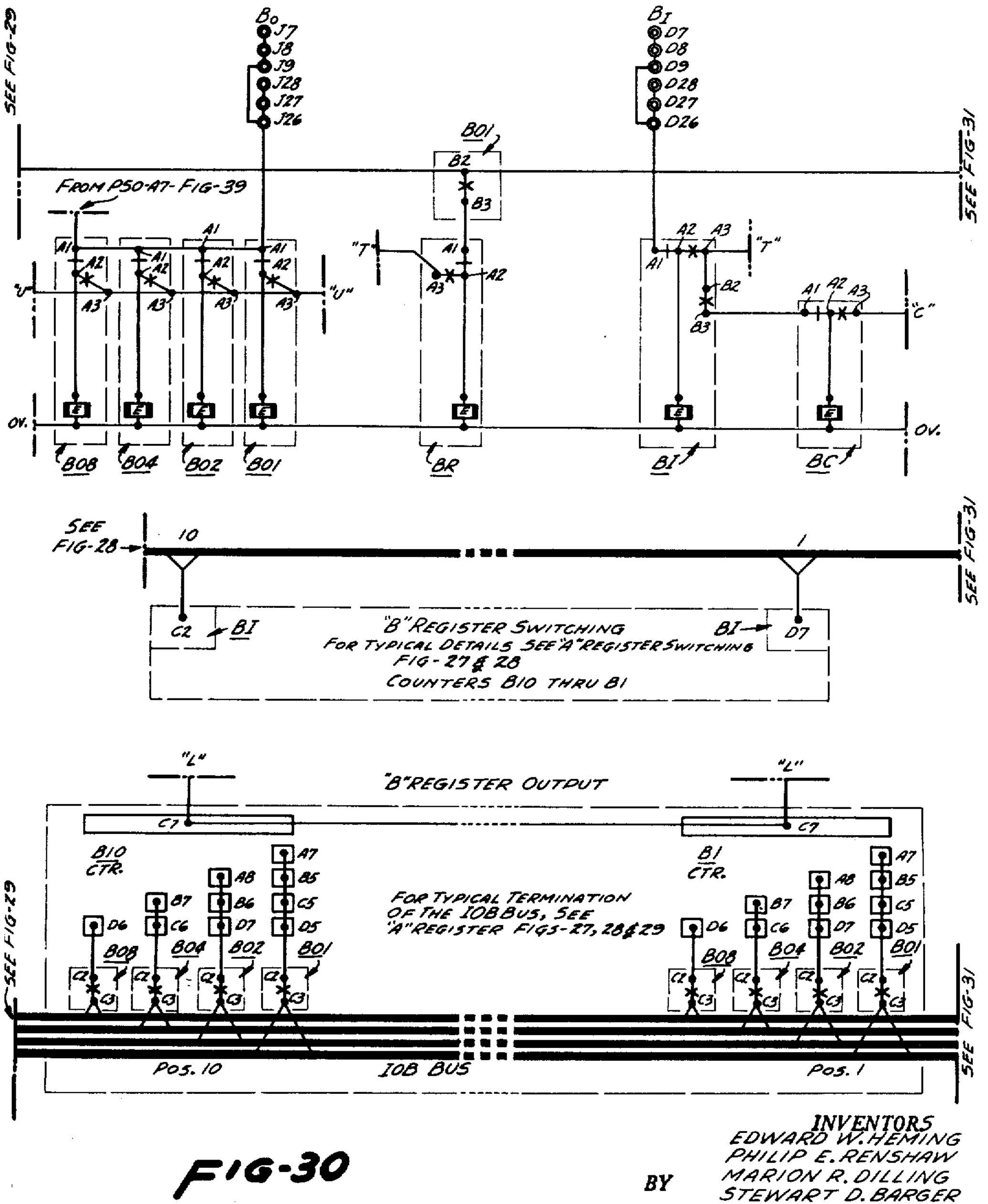
Figure 31:
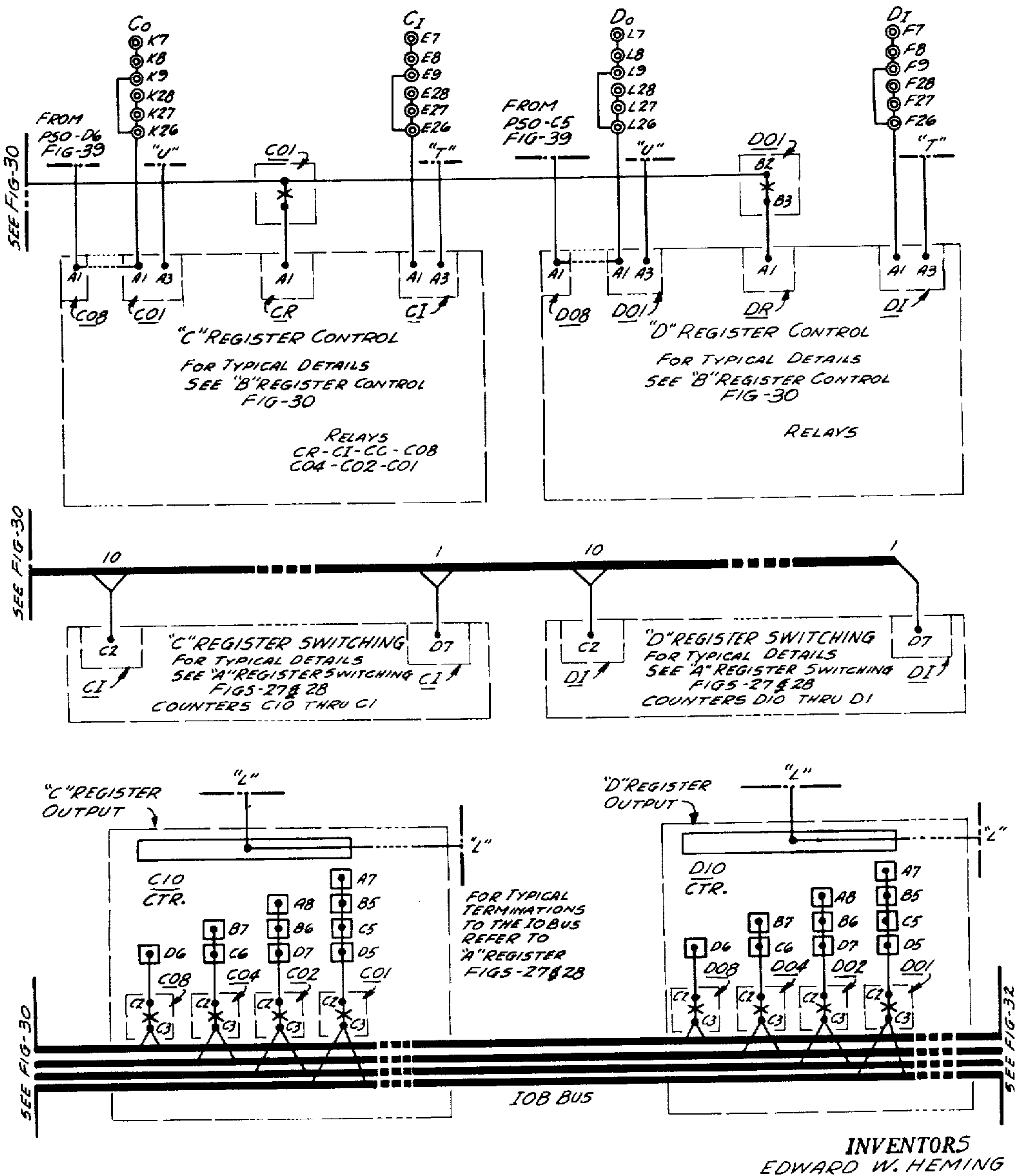

(12) The T pulse cannot energize the AC relay for a "carry" function, because the AI relay contacts (B2–B3) are open (FIG. 29).

The T pulse restores the AR relay as follows: (FIG. 29) T pulse, <u>AR(A3–A2)</u>, AR(E-coil), 0 volts.

(13 and 14) These steps are the same as described above, and complete the transfer and restore operation.

The contents of the B, C or D registers can be transferred into the IOB in the same manner as described above. Such operation will require that the output relays of the desired register be energized in step A.

MULTIPLICATION

A multiplication function is performed by the successive addition of the number to be multiplied to itself, with the number of such successive additions being determined by the multiplier number. In general, the multiplier is first entered into the IOB and transferred into a multiply unit. The number to be multiplied is then entered into the IOB. This last number is then sent into the A register to be accumulated thereby, with the number being retained in the IOB. The same number is sent again and again to the A register from the IOB, the number of such transfers being determined by the multiplier number stored in the multiply unit. At the end of the function, the true product will be accumulated within the A register, and the IOB will be reset to zero indicating condition.

It has been found with a ten digit size limitation in the A register, that the practical limit as to the size of the multiplier is six digits, for otherwise, if the multiplier were larger, the product might be more than ten digits, and the highest order digits would not be reproduced and the answer would be incorrect. Accordingly, the computer unit has been designed to handle a multiplier number of no more than six digits in length.

In addition to performing a simple multiplication function, the computer unit can also operate to multiply two numbers, shift the decimal point and round off the answer to the nearest half cent. As an illustration of this, in a simple multiplication, the function may be $$12 \times 218 = 2616$$

As will be described hereinafter, the computer unit will read out the answer in a dollars and cents arrangement such that a period will be provided between the second and third positions of the register being read out. Thus, the problem involved above might have been the total price determination of 12 units at a price of $2.18 each, with the answer being read out as $26.16. However, the problem might have been to find the total price of 12 units at a cost of $2.18 per ten units, or, that is, 21.8 cents each. The true total price for this would be $2.616, and this would be the numerical answer contained in the A register at the end of a normal multiplication involving 12×218. However, if this answer were to be read directly out, it would again take the form $26.16.

To overcome this, the computer unit may be commanded to "shift" the answer 2616 one place to the right in the A register so that at the end of the function the number 261 would be stored therein. This number, when read out, would then be in the form $2.61, with the last digit discarded. Modern accounting procedures call for correcting the product to the nearest half cent, and a "1" would be added to the above shifted product so that the number in the A register would be 262, which, when read out, would take the form $2.62, representing the corrected product of 12 times $.218.

To describe the components used in a multiplication function, it will again be advantageous to follow a sequential operation of a particular example. For the purpose of illustration, let it be assumed that it is desired to multiply the price "$.218" by the quantity "12." Table No. 6, similar to previous tables, has been prepared to illustrate the sequence of operations.

*Table No. 6*

MULTIPLICATION OF QUANTITY ("12") AND PRICE ("$.218")

| Step | Pulse Generated | Relay Coil Energized to move contacts to operated position | Relay Coil Energized to restore contacts to normal position | IOB Relay Indications | Multiplier Relay Indications | A Register Counter Indications |
|---|---|---|---|---|---|---|
| A | | K | | 0000000000 | 000000 | 0000000000 |
| B | | IOB | | 0000000012 | | |
| C | | ML, ED | K | | | |
| 1 | L | M1-M6 (U), ISI | | | | |
| 2 | U | | | | | |
| 3-11 | 1-9 | M1 (7), M2 (8), M3 (9), M4 (9), M5 (9), M6 (9). | | | 789999 | |
| 12 | T | | ISI | | | |
| 13 | C | MC, IR1-IR6 | MI, ED | | | |
| 14 | G | | IOB, IR1-IR6 | 0000000000 | | |
| D | | K | | | | |
| E | | IOB | | 0000000218 | | |
| F | | ML, ED | K | | | |
| 15 | L | | | | | |
| 16 | U | A1-A10 (U) | | | | |
| 17-26 | Roll | A1-A10 (10) | | 0000000218 | 789999 | 0000000000 |
| 26 | T | | AR | | | |
| 27 | C | MS | ML, ED | | | |
| 28 | G | ED | | 0000000218 | 789999 | 0000000000 |
| 29 | L | IAI, AI | | | | |
| 30 | U | A1-A10 (U) | | | | |
| 31-39 | 1-9 | A1 (8), A2 (1), A3 (2) | | | | 0000000218 |
| 40 | T | AC | IAI, AI | | | |
| 41 | C | M1 (1) | AC, ED | | 889999 | |
| 42 | G | ED | | | | |
| 43 | L | IAI, AI | | | | |
| 44 | U | A1-A10 (U) | | | | |
| 45-53 | 1-9 | A1 (8), A2 (1), A3 (2) | | | | 0000000426 |
| 54 | T | AC | IAI, AI | | | |
| 55 | C | A2 (1), M1 (1) | AC, ED | | 989999 | 0000000436 |
| 56 | G | IOB, M1 (1) | | 0000002180 | 089999 | |
| 57 | G | ED | | | | |
| 58 | L | IAI, AI | | | | |
| 59 | U | A1-A10 (U) | | | | |
| 60-68 | 1-9 | A2 (8), A3 (1), A4 (2) | | | | 0000002516 |
| 69 | T | AC | IAI, AI | 0000002180 | 089999 | 0000002516 |
| 70 | C | A3 (1), M2 (1) | AC, ED | | 099999 | 0000002616 |
| 71 | G | IOB, M2 (1) | | 0000021800 | 009999 | |
| 72 | G | IOB, M3 (1) | | 0000218000 | 000999 | |
| 73 | G | IOB, M4 (1) | | 0002180000 | 000099 | |
| 74 | G | IOB, M5 (1) | | 0021800000 | 000009 | |
| 75 | G | IOB, M6 (1), IR1-IR6 | | 0218000000 | 000000 | |
| 76 | G | SRHC | | | | |
| 77 | G | ED | IOB, IR1-IR6 | 0000000000 | | |
| 78 | L | AI | | | | |
| 79 | U | A1-A10 (U) | | | | |
| 80-88 | 1-9 | A1 (5) | | | | 0000002611 |
| 89 | T | AC | AI | | | |
| 90 | C | A2 (1), SRC | AC, ED | | | 0000002621 |
| 91 | G | ED, AR, AO1, AO2, AO4, AO8. | | | | |
| 92 | L | IOB | | 0000002621 | | 0000002621 |
| 93 | U | A1-A10 (U) | | | | |
| 94-102 | 1-9 | IOB (9) | | 1000000262 | | |
| 94-103 | Roll | A1-A10 | | | | 0000000000 |
| 103 | T | | AR | | | |
| 104 | C | SRG | SRC, ED | | | |
| 105 | G | ED | | | | |
| 106 | L | IAI, AI | | 1000000262 | 000000 | 0000000000 |
| 107 | U | A1-A10 (U) | | | | |
| 108-116 | 1-9 | A1 (2), A2 (6), A3 (2) | | | | 0000000262 |
| 117 | T | | IAI, AI, MC, MS, SRG, SRI, SRHC. | | | |
| 118 | C | IR1-IR6 | | | | |
| 119 | G | | IOB, IR1-IR6 | 0000000000 | 000000 | 0000000262 |

(A) The K relay is energized by the programmer to provide communication between the typewriter and IOB.

(B) The typist types the number "12" into the IOB, as described previously.

(C) The programmer unit restores the K relay to disrupt communication between the typewriter and IOB, and energize the ML relay. The ED relay is also energized to start an emitter cycle.

(1) The L pulse energizes the U-coils of the M1–M6 relays to unlatch the normally latched 10-pushbars of these relays for upward movement by the following circuit: (FIG. 37) L pulse, ML(C3–C2) to M1–M6(U-coils), 0 volts.

Figure 37:
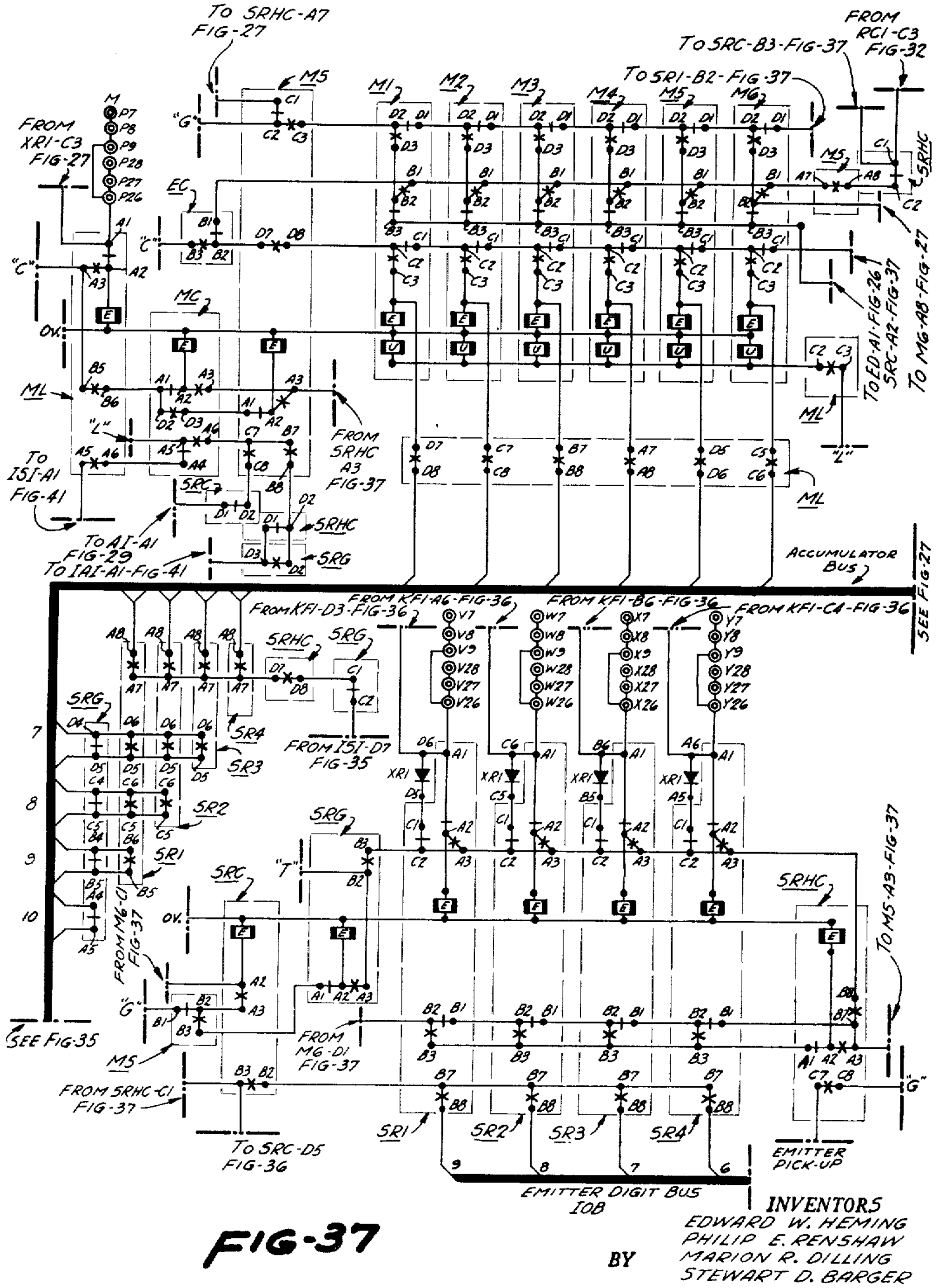

The M1–M6 relays are accumulating-type relays, as illustrated in FIGS. 7 and 8, but are not provided with static read-out plates or brushes. Each of these relays has a 9-pushbar which operates the (B1–B2) and (B2–B3) switches thereof, and has a 10-pushbar which operates the (C1–C2), (C2–C3), (D1–D2) and (D2–D3) switches thereof. The M1–M6 relays are shown in FIG. 37, with their escapement wheel in the 10th position; i.e., with the 10-pushbars latched down and with the 9-pushbars in their normal upper position. Thus, the 9-pushbar operated switches (B1–B2) and (B2–B3) will be in the position shown for all rotative positions of the escapement wheel except for the ninth position thereof when these contacts are moved to their operated position. The 10-pushbar operated switch (C1–C2), (C2–C3), (D1–D2) and (D2–D3) will be in their illustrated position only when the 10-pushbar has been moved down and latched.

The L pulse also energizes the ISI relay by the following circuit: (FIG. 37) L pulse, MC(A5–A4), ML(A6–A5) (FIG. 41) ISI(A1–A2), ISI(E-coil), 0 volts.

(2) The U pulse is not used in this step.

(3–11) The IOB contents are now subtracted into the M1–M6 accumulating relays, so that the number "12" is represented in the M1–M6 relays as "789999".

The M1 relay is pulsed seven times by the emitter digit pulses through the following circuit: (FIG. 35) Emitter digit bus line 7, ISI(B7–B8), I18(C4–C5), I12(D4–D5), I11(D3–D2)—accumulator bus line 1 (FIG. 37) accumulator bus line 1, ML(D8–D7), M1(E-coil), 0 volts.

The M2 relay is pulsed 8 times and the M3–M6 relays are pulsed 9 times by circuits similar to that above.

(12) The T pulse (FIG. 41) passes through ISI (A3–A2) to energize the ISI(E-coil) to restore this relay.

(13) The C pulse energizes the MC relay by the following circuit: (FIG. 37) C pulse ML(B5-B6), MC (A1-A2), MC(E-coil), 0 volts.

The C pulse also energizes the IR1-IR6 relays to restore the IOB relays as follows: (FIG. 27) C pulse, RC2(A5-A4), MC(B1-B2), IR1-IR6(A1-A2), IR1-IR6(E-coils), 0 volts.

The ML relay is restored: (FIG. 37) C pulse, ML (A3-A2), ML(E-coil), 0 volts.

The ED relay (FIG. 26) is restored by a C pulse through ED(A3-A2) to the ED(E-coil) to stop the emitter.

(14) The G pulse restores the IOB relays and the IR1-IR6 relays as described in the transfer from the IOB to the A register.

(D) The programmer unit again energizes the K relay to provide communication between the typewriter and the IOB.

(E) The typist now types the number "218" into the IOB.

(F) The programmer unit restores the K relay, disrupting communication from the typewriter to the IOB, and energizes the ML and SR1 relays. The ED relay is also energized to begin another emitter cycle.

(15) The L pulse again pulses the U-coils of the M1-M6 relays, but since none of the 10-pushbars of these relays has been latched since step 1, nothing happens.

(16) The U pulse is applied to the U-coils of all of the A register counters A1-A10 (FIG. 28) to unlatch any latched down 10-pushbars.

(17-26) The roll pulses are applied through the now closed AR contacts (FIG. 28) to clear the A register as described previously, and the T pulse restores the AR relay (FIG. 29).

(27) The C pulse energizes the MS relay as follows: (FIG. 37) C pulse, ML(B5-B6), MC(D2-D3), MS (A1-A2), MS(E-coil), 0 volts.

The C pulse restores the ML relay as follows: (FIG. 37) C pulse, ML(A3-A2), ML(E-coil), 0 volts.

The C pulse stops the emitter: (FIG. 26) C pulse, ED(A3-A2), ED(E-coil), 0 volts.

(28) The next G pulse starts the emitter into operation again by the following circuit: (FIG. 37) MS(C2-C3), M1(D2-D3), M1(B2-B3) (FIG. 26) ED(A1-A2), ED (E-coil), 0 volts.

(29) The L pulse energizes the IAI relay as follows: (FIG. 37) L pulse, MC(A5-A6), MS(B7-B8), SRHC (D2-D1) (FIG. 41) IAI(A1-A2), IAI(E-coil), 0 volts.

The L pulse also energizes the AI relay as follows: (FIG. 37) L pulse, MC(A5-A6), MS(C7-C8), SRC(D2-D1) (FIG. 29) AI(A1-A2), AI(E-coil), 0 volts.

The computer is now conditioned to transfer the IOB contents in plus form to the A register which stands in zero indicating position.

(30) The U pulse again energizes the U-coils of the A register counters A1-A10 which unlatches the 10-pushbars thereof which had become latched during steps 17-26 above.

(31-39) Since the IAI and AI relays have been energized, the emitter digit pulses transfer the contents of the IOB to the A register, as previously described in the transfer of numerical information from the IOB to the A register.

The A register now stands at 0000000218.

(40) The T pulse energizes the AC relay for a carry function and restores the IAI and AI relays again as described in connection with the previously described transfer from the IOB to the A register.

(41) The C pulse restores the AC and ED relays, as previously described in connection with the transfer from the IOB to the A register.

Since it is desired to repeat the above transfer, the IOB must not be cleared, as in the previously described transfer from the IOB to the A register. It will be noted that the C pulse previously energized the IOB restore relays IR1-IR6 by passing through the normally closed contacts MS(C1-C2) (FIG. 32). Since the MS relay is now energized, the C pulse cannot energize the IR1-IR6 relays, and thus the IOB relays will not be restored by the next G pulse.

The C pulse also pulses the M1 relay to move it one step by the following circuit: (FIG. 37) C pulse, EC(B3-B2), MS(D7-D8), M1(C2-C3), M1(E-coil), 0 volts. This pulse causes the M1-M6 relays to now stand at 889999.

(42) The G pulse energizes the ED relay, as in step 28, to cause another emitter cycle.

(43) The L pulse again energizes the IAI and AI relays, as in step 29.

(44) The U pulse energizes the U-coils of the A register counters A1 through A10, as in step 30.

(45-53) With the IAI and AI relays again energized, the emitter digit pulses transfer the IOB contents to the A register, to add on to the number entered in steps 31-39. The A register now stands at 000000426.

(54) The T pulse energizes the AC relay and restores the IAI and AI relays, as in step 40.

(55) The C pulse pulses the A2 relay to perform a carry function as previously described in the transfer from the IOB to the A register, so that the A register now indicates 0000000436. The C pulse also restores the AC and ED relays.

The C pulse again pulses the M1 relay, as in step 41, to move this relay to its ninth position, and move its 9-pushbar down. The M1-M6 relays now stand at 989999.

(56) The G pulse is applied to the IOB advance line to shift the contents of each IOB position to the next highest position, by the following circuit: (FIG. 37) G pulse, MS(C2-C3), M1(D2-D3), M1(B2-B1), MS(A7-A8), SRHC(C2-C1) (FIG. 36) IOB advance line to shift the IOB positions as previously described in the entry of numerical information into the IOB from the typewriter.

The G pulse again pulses the M1 relay to move it to its tenth position by the following circuit: (FIG. 37) G pulse, MS(C2-C3), M1(D2-D3), M1(B2-B1), EC(B1-B2), MS(D7-D8), M1(C2-C3), M1(E-coil), 0 volts. The 10-pushbar of the M1 relay now moves down and is latched, returning the (C1-C2), (C2-C3), (D1-D2) and (D2-D3) contacts to their normal positions illustrated in the drawings.

The M1-M6 relays now stand at 089999.

(57) The G pulse energizes the ED relay to start another emitter cycle by the following circuit: (FIG. 37) G pulse, MS(C2-C3), M1(D2-D1), M2(D2-D3), M2(B2-B3) (FIG. 26), ED(A1-A2), ED(E-coil), 0 volts.

(58) The L pulse again energizes the IAI and AI relays, as in step 29.

(59) The U pulse energizes the U-coils of the A register counters A1 through A10, as in step 30.

(60-68) The emitter digit pulses again transfer the IOB contents (0000002180) to the A register, as in steps 31-39. The A register now stands at 0000002516.

(69) The T pulse energizes the AC relay and restores the IAI and AI relays, as in step 40.

(70) The C pulse energizes the A3 relay, for a carry function, so that the A register will now stand at 0000002616. The C pulse also restores the AC and ED relays as in step 41.

The C pulse also energies the M2 relay to move it to its ninth position, by the following circuit: (FIG. 37) C pulse, EC(B3-B2), MS(D7-D8), M1(C2-C1), M2 (C2-C3), M2(E-coil), 0 volts. The M1-M6 relays will now stand at 099999.

(71) The G pulse advances the IOB positions one step to the left, in a similar manner to step 56, so that the IOB will stand at 0000021800.

The G pulse also energizes the M2 relay to move it to its tenth position, also in a similar manner to step 56, so that the M1–M6 relays will stand at 009999.

(72) The next G pulse again advances the IOB so that it will stand at 0000218000, and energizes the M3 relay so that it moves to the tenth position, so that the M1–M6 relays will stand at 000999, as in step 56.

Figure 36:
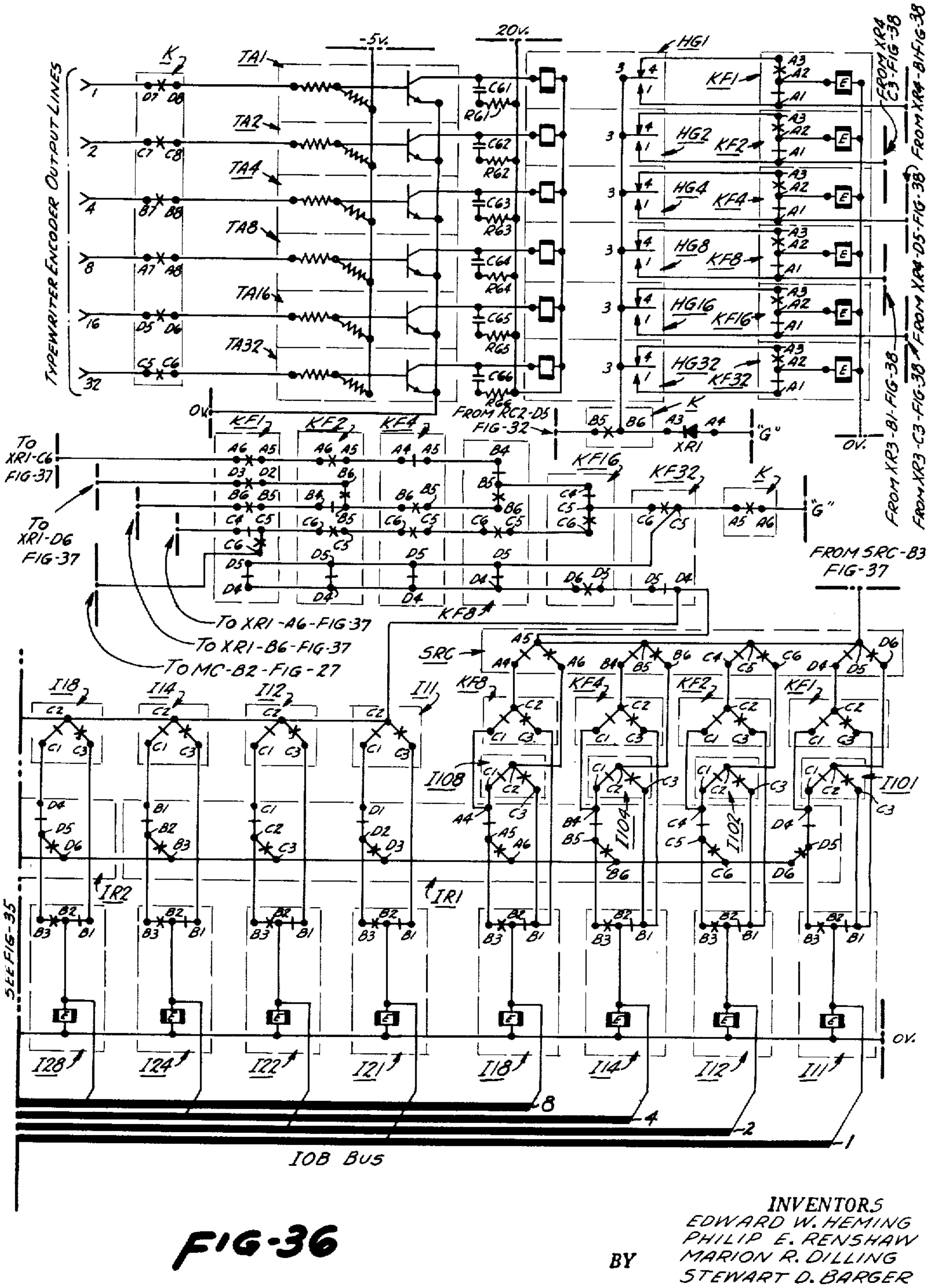

(73) The next G pulse again advances the IOB so that it will stand at 0002180000, in a manner similar to step 56; i.e. (FIG. 37) G pulse, MS(C2–C3), M1(D2–D1), M2(D2–D1), M3(D2–D1), M4(D2–D3), M4(B2–B1), MS(A7–A8), SRHC(C1–C2), to the IOB advance line (FIG. 36).

The same G pulse also energizes the M4 relay so that it will move to its tenth position, returning its 10-pushbar to its normal downwardly latched position, in a manner similar to step 56; i.e. (FIG. 37) G pulse, MS (C2–C3), M1(D2–D1), M2(D2–D1), M3(D2–D1), M4 (D2–D3), M4(B2–B1), EC(B1–B2), MS(D7–D8), M1 (C2–C1), M2(C2–C1), M3(C2–C1), M4(C2–C3), M4 (E-coil), 0 volts.

(74) The next G pulse again advances the IOB so that it will stand at 0021800000, and energize the M5 relay so that the M1–M6 relays will stand at 000009, in a manner similar to step 73.

(75) The next G pulse again advances the IOB so that it will stand at 0218000000, and energizes the M6 relay so that the M1 through M6 relays will be all cleared; i.e., stand at 000000, in a manner similar to step 73.

This G pulse also energizes the IOB restore relays IR1 through IR6, as follows: (FIG. 37) G pulse, MS (C2–C3), M1(D2–D1), M2(D2–D1), M3(D2–D1), M4 (D2–D1), M5(D2–D1), M6(D2–D3), from M6(B2) to (FIG. 27) M6(A1–A2), MC(B3–B2), IR1–IR6(A1–A2), IR1–IR6(E-coils), 0 volts.

(76) The G pulse energizes the SRHC relay, as follows: (FIG. 37) G pulse, MS(C2–C3), M1(D2–D1), M2(D2–D1), M3(D2–D1), M4(D2–D1), M5(D2–D1), M6(D2–D1), SR1(B2–B3), SRHC(A1–A2), SRHC(E-coil), 0 volts.

Figure 27:
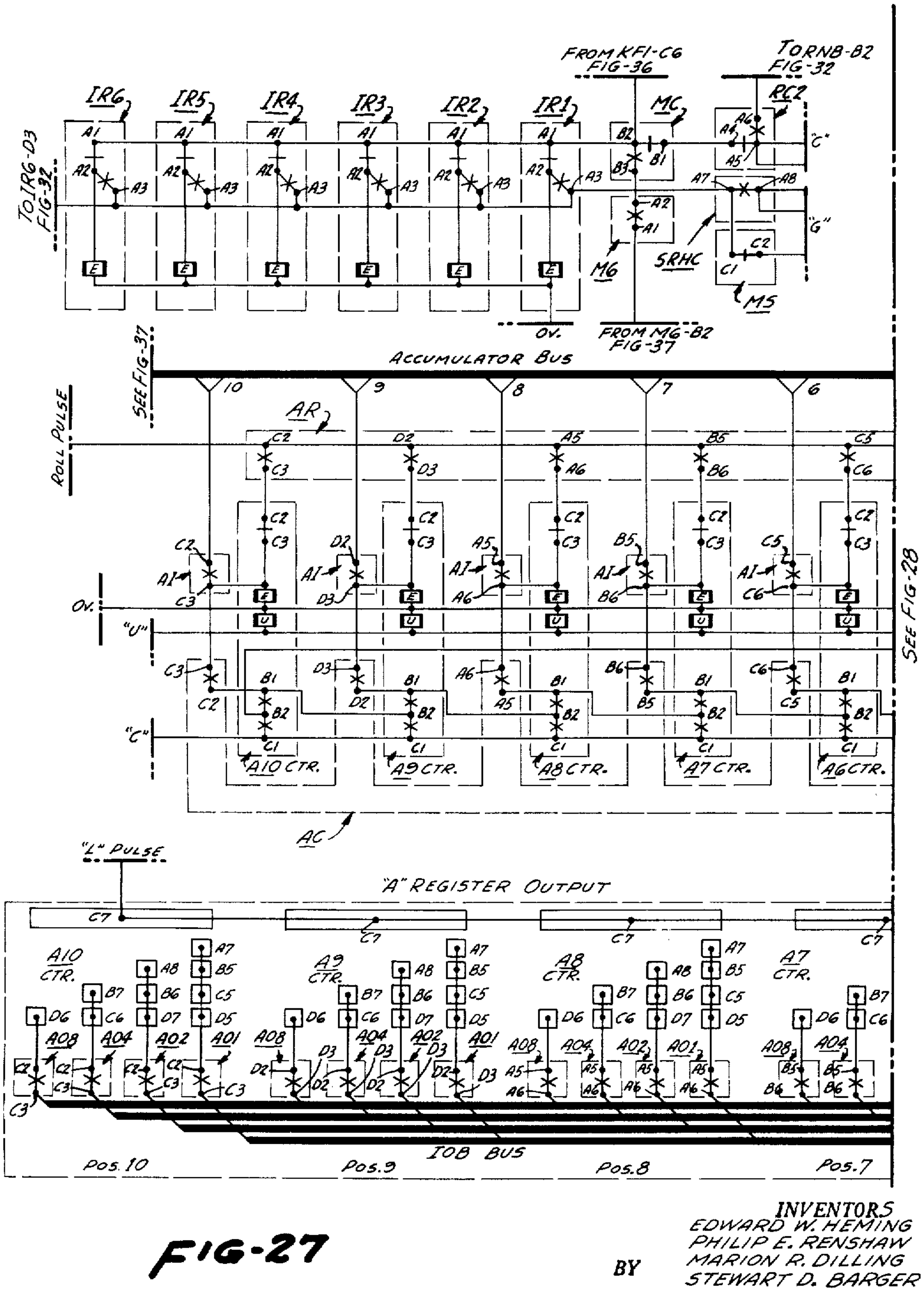

(77) The G pulse restores the IOB relays to zero indicating position in a manner similar to step 14, since the SRHC contacts A7 and A8 are now closed (FIG. 27).

The G pulse restores the IR1–IR6 relays as follows: (FIG. 27) G pulse, SHRC(A8–A7), IR1–IR6(A3–A2), IR1–IR6(E-coils), 0 volts.

The G pulse energizes the ED relay to start on emitter cycle, by the following circuit: (FIG. 37) G pulse, SRHC(C8–C7), (FIG. 26) ED(A1–A2), ED(E-coil), 0 volts.

(78) The L pulse energizes the AI relay, as in step 29. The IAI relay is not energized, because the SRHC contacts D1–42 are now open (FIG. 37).

(79) The U pulse energizes the U-coils of the A register counters A1–A10, as in step 30.

(80–88) Since the total accumulated in the A register is going to be shifted one place to the right, in order to keep the decimal in its proper place between the A register counters A2 and A3, it is necessary to discard the present number stored in the A register counter A1. However, accounting principles require that the final total be increased one unit if the number discarded is 5 or over. This half cent correction can be accomplished by adding a "5" to the A1 counter, which will cause a carry function if the number in the A1 counter is 5 or over. If the number in the A1 counter is below 5, no carry function will be required. After the "5" has been added, the number in the A register can be discarded.

The A1 counter is pulsed five times as follows: (FIG. 37) Emitter digit bus line 5, SRG(C2–C1), SRHC(D8–D7), SR1(A7–A8), accumulator bus line 1 (FIG. 28), accumulator bus line 1, AI(D7–D8), A1(E-coil), 0 volts. The A register counters now stand at 0000002611.

(89) The T pulse energizes the AC relay and restores the AI relay, as in step 40.

(90) The C pulse energizes the A2 counter in a carry function, so that the A register now stands at 0000002621.

The C pulse also restores the AC and ED relays, as in step 41.

The C pulse also energizes the SRC relay as follows: (FIG. 37) C pulse, EC(B3–B2), M1–M6(C2–C1), SRC(E-coil), 0 volts.

(91) The G pulse energizes the ED relay to start another emitter cycle, as in step 77.

The AR relay is energized as follows: (FIG. 29) G pulse, SRC(C3–C2), AR(A1–A2), AR(E-coil) 0 volts.

The A register output relays AO1, AO2, AO4 and AO8 are energized as follows: (FIG. 29) G pulse,

SRC(C3–C2), SRHC(D6–D5), AO1-2-4-8(A1–A2)

AO1-2-4-8(E-coils), 0 volts.

(92) The L pulse transfers the A register contents to the IOB, as in the previously described transfer from the A register to the IOB, so that the IOB now stands at 0000002621.

(93) The U pulse again energizes the U-coils of the A register counters so that the 10-pushbars will all be unlatched.

(94–102) The nine emitter digits are applied to the IOB advance line so that the IOB contents will be shifted nine times to the left, which will give the same result as if the IOB contents had been shifted one position to the right.

The nine emitter digits are applied to the IOB advance line as follows: (FIG. 37) Emitter digit bus line 9, SR1(B8–B7), SRC(B2–B3) to the IOB advance line, FIG. 36. In the shifting of the IOB position, the emitter digits go through the now closed contacts of the SRC relay to the I101, I102, I104 and I108 contacts to the I11, I12, I14 and I18 relays so that the tenth position of the IOB is transferred back into the first position of the IOB.

The positions of the IOB after each step 92–102 are as follows:

| | | | |
|---|---|---|---|
| (92) | 0000002621 | (98) | 0262100000 |
| (93) | 0000002621 | (99) | 2621000000 |
| (94) | 0000026210 | (100) | 6210000002 |
| (95) | 0000262100 | (101) | 2100000026 |
| (96) | 0002621000 | (102) | 1000000262 |
| (97) | 0026210000 | | |

(94–103) The roll pulses clear the A register counters A1–A10, as in steps 17–26, so that these counters now stand at 0000000000.

(103) The T pulse restores the AR relay as follows: (FIG. 29) T pulse, AR(A3–A2), AR(E-coil), 0 volts.

(104) The C pulse energizes the SRG relay as follows: (FIG. 37) C pulse, EC(B3–B2), MS(D7–D8), M1–M6(C2–C1), SRC(A2–A3), MS(B2–B3), SRG(A1–A2), SRG(E-coil), 0 volts.

The C pulse restores the SRC relay as follows: (FIG. 37) C pulse, EC(B3–B2), MS(D7–D8), M1–M6(C2–C1), SRC(E-coil), 0 volts.

The C pulse also restores the ED relay in the emitter, as in step 13.

(105) The G pulse energizes the ED relay, as in step 77, to start another emitter cycle.

(106) The L pulse energizes the IAI relay as follows: (FIG. 37) L pulse, MC(A5–A6), MS(B7–B8), SRG (D2–D3) (FIG. 41), IAI(A1–A2), IAI(E-coil), 0 volts. The AI relay is energized by the L pulse as in step 29.

(107) The U pulse energizes the U-coils of the A register counters A1–A10 to unlatch the 10-pushbars thereof.

(108–116) Since the IAI and AI relays are again actuated, the emitter digit pulses transfer the IOB contents back into the A register. As will be noted in FIG. 37, the accumulator bus line 10 includes the normally closed contacts SRG(A4–A5). Since these contacts are now open, the "1" stored in the tenth position of the IOB cannot get to the tenth A register counter A10, which then receives no pulses. Thus, after this transfer, the A register will stand at 0000000262, which is the half-cent corrected product of 12×$.218.

The accumulator bus lines 7, 8 and 9 are also interrupted by the energized SRG relay but parallel paths for these lines are provided by the now closed SR1 relay contacts. If the IOB contents were to be shifted to the right two places, then it would be desired to interrupt the accumulator bus lines 9 and 10, which would be accomplished by energizing the SRG relay to interrupt lines 7, 8, 9 and 10 and by energizing the SR2 relay to provide parallel paths for lines 7 and 8. Similarly, the energization of the SR3 relay would prevent the 8th, 9th and 10th positions of the IOB from being transferred to the A register, or the energization of the SR4 relay would allow only the first six IOB positions to be transferred to the A register.

(117) The multiplication function is now completed, and the T pulse restores the following relays to their normal positions: IAI, AI, MC, MS, SRG, SR1 and SRHC.

The IAI and AI relays are restored as in step 40.

The MC relay is restored as follows: (FIG. 37) T pulse, SRG(B2–B3), SRHC(B8–B7), MC(A3–A2), MC(E-coil), 0 volts.

The MS relay is restored as follows: (FIG. 37) T pulse, SRG(B2–B3), SRHC(B8–B7), MS(A3–A2), MS(E-coil), 0 volts.

The SRG relay is restored as follows: (FIG. 37) T pulse, SRG(A3–A2), SRG(E-coil), 0 volts.

The SR1 relay is restored as follows: (FIG. 37) T pulse, SRG(B2–B3), SR1(A3–A2), SR1(E-coil), 0 volts.

The SRHC relay is restored as follows: (FIG. 37) T pulse, SRG(B2–B3), SRHC(B8–B7), SRHC(A3–A2), SRHC(E-coil), 0 volts.

(118) The C pulse energizes the IOB restore relays IR1–IR6 as follows: (FIG. 27) C pulse, RC2(A5–A4), MC(B1–B2), IR1–IR6(A1–A2), IR1–IR6(E-coils), 0 volts.

The C pulse also restores the ED coil to stop the emitter operation, as in step 13.

(119) The G pulse restores the IOB to zero indicating position, and restores the IR1–IR6 relays, as in step 14.

At the end of the above operations, the IOB will stand at 0000000000, the M1–M6 relays will stand at 000000, and the A register will stand at 0000000262.

If the multiplication process does not include a shift right function, none of the shift right relays SR1, SR2, SR3 or SR4 will have been energized. At step 76 above, the SRHC relay will not be energized, since the energizing circuit for the relay includes the operated contacts SR1(B2–B3). Instead, the G pulse will restore the MC and MS relays by the following route. (FIG. 37) G pulse, MS(C2–C3), M1–M6(D2–D1), SR1–4(B2–B1), MS–MC(A3–A2)-MS–MC(E-coils), 0 volts.

At step 77, the G pulse will restore the IOB relays and the IR1–IR6 relays, as in step 14, since the contacts MS(C1–C2) (FIG. 27) are again normally closed.

Thus, without any shift right function, the multiplication function will be completed by the end of the last described step 77.

READ-OUT FUNCTION

Having now described the manner in which numerical information may be entered from the typewriter into the computer unit, and the manner in which such information is added, subtracted or multiplied, the only other computer function remaining is the manner in which the information contained in any register is read out of the computer unit to the typewriter, to be automatically typed out thereby.

As before described, the information from a chosen register is delivered from the register, in parallel, to the IOB, from where the information is sent in serial form to the typewriter, with the highest position IOB set of relays being read out first, so that as the number is typed from left to right by the typewriter, the typed answer will correspond to the information in the chosen register.

As has been mentioned previously, the typewriter computer unit has been designed to handle dollars and cents calculations, and, accordingly, the read-out unit unit has been designed to transmit the numerical information therein to the typewriter in dollars and cents form such that the highest eight positions of any register represent dollars values and the lowest two positions indicate cents values. Furthermore, the numerical information is printed out on the typewriter so that spaces will be provided between the millions, thousands and hundreds dollars values and a period is inserted between the dollars and cents values to indicate the normal commas and decimal points in the answer. Thus, if a register of the computer unit had the number 1000000000 stored therein (corresponding to $10,000,000.00), this would be typed out by the typewriter as 10 000 000.00.

To illustrate the operation of the elements utilized in a read-out operation, it is again proposed to follow the sequential operation of the elements involved in a typical read-out function. For this purpose, let it be assumed that the A register has stored therewithin the number 0908000402, and that it is desired to type out this figure on the typewriter. Table No. 7, similar to previous tables, has been prepared to set forth the sequence of operations.

*Table No. 7*

READ-OUT OF NUMERICAL INFORMATION (e.g. "0908000404") FROM IOB TO TYPEWRITER

| Step | Pulse Generated | Relay Coil Energized to move contacts to operated position | Relay Coil Energized to restore contacts to normal position | Typewriter Key operated | IOB Relay Indications |
|---|---|---|---|---|---|
| A | | AO1, AO2, AO4, AO8, AR, ED. | | | 0000000000 |
| 1 | L | IOB | | | 0908000404 |
| 2 | U | RNN, RC1 (U), RC2 | AO1, AO2, AO4, AO8 | | |
| 3-12 | Roll | A1-A10 | | | |
| 12 | T | | AR | | |
| 13 | C | PT1-PT5 | ED | | |
| 14 | G | PJG | | | |
| 15 | J | | | Space bar | |
| 16 | K | IOB, RC1, RZS | | | 9080004040 |
| 17 | J | | | 9 | |
| 18 | K | IOB, RC1, RS | | | 0800040400 |
| 19 | J | | | Space bar | |
| 20 | K | | RS | | |
| 21 | J | | | 0 | |
| 22 | K | IOB, RC1 | | | 8000404000 |
| 23 | J | | | 8 | |
| 24 | K | IOB, RC1 | | | 0004040000 |
| 25 | J | | | 0 | |
| 26 | K | IOB, RC1, RS | | | 0040400000 |
| 27 | J | | | Space bar | |
| 28 | K | | RS | | |
| 29 | J | | | 0 | |
| 30 | K | IOB, RC1 | | | 0404000000 |
| 31 | J | | | 0 | |

*Table No. 7*—Continued

READ-OUT OF NUMERICAL INFORMATION (e.g. "0908000404") FROM IOB TO TYPEWRITER

| Step | Pulse Generated | Relay Coil Energized to move contacts to operated position | Relay Coil Energized to restore contacts to normal position | Type-writer Key oper-ated | IOB Relay Indi-cations |
|---|---|---|---|---|---|
| 32 | K | IOB, RC1 | | | 4040000000 |
| 33 | J | | | 4 | |
| 34 | K | IOB, RC1, RS | | | 0400000000 |
| 35 | J | | | Period | |
| 36 | K | | RS | | |
| 37 | J | | | 0 | |
| 38 | K | IOB, RC1 | | | 4000000000 |
| 39 | J | | | 4 | |
| 40 | K | IOB, RC1 | RC2 | | 0000000000 |
| 41 | J | | | Space bar | |
| 42 | K | | PJG, PT1–PT5 | | |
| 43 | G | | RZS, RNN | | 0000000000 |

(A) To condition the computer unit to perform a read-out function from the A register, the programmer will cause the A register output relays A01, A02, A04, A08 to be energized. The programmer will also cause the A register restore relay AR to be energized, and will energize the ED relay to start an emitter cycle.

(1) The L pulse transfers the information stored within the A register counters to the IOB relays, in the same manner as discussed in connection with step 4 of Table No. 5. In order to simplify the present table, the specific IOB relays energized by the L pulse have not been indicated on the table, but rather, these relays have been indicated generally by referring to them as IOB relays. In the present operation, the specific IOB relays energized in this step are the following: I11, I14, I21, I22, I31, I32, I34, I41, I42, I51, I52, I61, I62, I71, I72, I78, I81, I82, I94, I98, I101 and I102.

(2) Referring to FIG. 32, the U pulse passes through the normally closed contacts C1–C2 of the IAI relay, C1–C2 of the ISI relay, C1–C2 of the MC relay, and the now closed contacts B2–B3 of the AO8 relay to the A2 terminal of the A10 counter. The A1–A2–A3 switches of the A10 counter are actuated by the 9-pushbar of that counter, and are here used to test the A register to see if the number stored therewithin is in normal or complementary form. If the number were in complementary form; i.e., a negative number, the A10 counter would have a "9" stored therewithin, and the A2–A3 contacts would be open and the A2–A1 contacts would be closed. In the present example, the A10 counter stands in zero indicating position, and the A2–A3 contacts are closed. The U pulse then passes through these contacts and then through the normally closed contacts A1–A2 of the RNN relay to energize the E-coil thereof. It will be noted that neither the RNN nor the RNB relays could be energized if the computer unit is performing a transfer within itself from one register to another, or a multiplication function, for then the U pulse would not be able to pass through the above mentioned contacts of the IAI, ISI or MC relays.

The same U pulse passes through the now closed contacts B2–B3 of the AO4 relay to the U-coil of the RC1 relay to energize that coil, and through RC2(A1–A2) to energize the E-coil of the RC2 relay.

Figure 14:
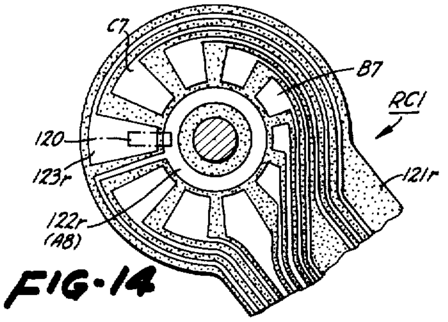
FIG. 14 illustrates a modification of the static read-out plate of FIG. 9, as used with a pulse counter read in the computer unit.

The RC1 relay is a counter type relay, as illustrated in FIGS. 7 and 8, and has a single pushbar actuated by a single cam on the escapement wheel in the same manner as discussed in connection with the 10-pushbar 111 and cam 113 of pulse counter 100. Thus, when the U-coil of the RC1 relay is energized, the pushbar will be released for upward movement, and the pushbar will remain in that position until the E-coil of the RC1 relay has been pulsed ten times, at which time the pushbar will be cammed downwardly and latched. The RC1 relay has a static read-out plate **121*r*, illustrated in FIG. 14, provided with a central common ring contact 111y connected to terminal A8 and ten separate contact segments 123*r* corresponding to the ten rotative positions of the escapement wheel. The read-out brush will be bridging the common ring contact A8, and the "0" position read-out segment contact B5** when the RC1 relay is in "0" position, regardless of whether the 10-pushbar is latched or unlatched.

The U pulse further appears on the U-coils of the A register counters A1 through A10 to unlatch any of the 10-pushbars thereof which might have been latched in a previous operation.

The U pulse also restores the AO1, AO2, AO4 and AO8 relays (FIG. 29), as in step 2 of Table No. 5.

(3–12) The next ten steps involve the ten roll pulses generated by the emitter and appearing on the roll pulse line therefrom, and are used to reset the A register to a zero state, as in steps 3–12 of Table No. 5.

(12) The tenth roll pulse is the same pulse as the T pulse, and appears on the T pulse line, as well as the roll pulse line. This T pulse passes through the now closed contacts A3–A2 of the AR relay (FIG. 29) to energize the E-coil thereof, and restores the AR relay contacts to their normal open positions.

(13) The C pulse also interrogates the tenth position IOB relays to see if there is a significant figure; i.e., 1 through 9, stored therewithin. One feature of the "binary code-excess three" is that for any significant figure, either or both of the I104 and I108 relays will have been energized.

Therefore, the C pulse is applied through <u>RC2(A5–A6)</u> and RNB(B2–B1) (FIG. 32) to the normally open contacts A3–A2 of the I104 and I108 relays. If either of these relays had been energized by the presence of a significant figure to the tenth IOB position, the A3–A2 contacts of the I104 and/or I108 relays would be closed, allowing the C pulse to pass therethrough and then through the normally closed contacts A1–A2 of the RZS relay to energize the E-coil thereof. However, in the present example, a zero is stored within the tenth position of the IOB, and the C pulse is prevented from energizing the RZS relay, since both I108(A3–A2) and I104(A3–A2) are open.

The C pulse restores the ED relay (FIG. 26) as in previous functions.

The C pulse is prevented from energizing the IOB restore relays IR1–IR6 relays (FIG. 27) because it is blocked therefrom by the now open contacts A5–A4 of the RC2 relay.

The C pulse also energizes the PT1–PT5 relays to connect the typewriter to the IOB and read-out relays by the following circuit: (FIG. 32) C pulse, <u>RC2(A5–A6)</u>, <u>EC(D3–D2)</u>, (FIG. 38) PT5(A5–A6), (FIG. 39) PT1–PT5(A3–A2), PT1–PT5(E-coils), 0 volts.

(14) The next G pulse energizes the PJG relay as follows: (FIG. 40) MS(D2–D1), <u>PSS(D5–D6)</u>, PR (B2–B1, <u>PT5(D2–D1)</u>, <u>PT5(C2–C1)</u>, (FIG. 25) PJG(A1–A2), PJG(E-coil), 0 volts.

(15) As has been previously described, the operation of the PJG relay will cause a 100 volt, 15 millisecond J pulse to be generated. This J pulse appears at the J pulse terminal, FIG. 25, because the PJG contacts C2–C3 are closed.

The J pulse is used in this step to cause the typewriter carriage to be spaced one column position by the typewriter space bar by the following circuit: (FIG. 33) J pulse, PT5(B1–B2), RC2(B5–B6), RS(D2–D1, RZS-(D2–D1), RPS(D2–D1), REV(C4–D6), FIG. 38) PT2(D7), "Space bar" Puller Coil 251, PJG(A6–A5), 0 volts.

(16) As previously described, the typewriter operation causes a K pulse to be generated in response to the operation.

This K pulse is used to interrogate the ninth position of the IOB to see if a significant figure is stored therein. If there is not, the I98 and I94 relays will both be in normal position, and it will again be desired to merely space the typewriter carriage, rather than print the zero stored therein. However, as in the present case, a significant figure "9" is in the ninth IOB position, so it is desired to energize the RZS relay to prevent further zero suppression in typing out the IOB contents to the typewriter.

The RZS relay is energized as follows: (FIG. 32) K pulse, RC2(D5–D6), RS(B2–B1), RNN(B2–B3), I98 (A1–A2), RZS(A1–A2), RZS(E-coil), 0 volts.

Since the read-out occurs only of the tenth position of the IOB, it is necessary to shift all of the IOB positions one position to the left by applying a pulse to the IOB advance line. This is accomplished by the K pulse as follows: (FIG. 32) K pulse, RC2(D5–D6), RS(B2–B1), ED(C1–C2), RC1(D2–D3), RC1(C2–C3) to the IOB advance line. The IOB will now stand at 9080004040.

The K pulse also energizes the RC1 relay to advance its escapement wheel one step, as follows: (FIG. 32) K pulse, RC2(D5–D6), RS(B2–B1), ED(C1–C2), RC1 (D2–D3), RC1(E-coil), 0 volts. This will cause the RC1 read-out contacts A8 and B6 to be bridged.

(17) The next J pulse generated by the J pulse generator is used to interrogate the tenth position of the IOB and type out the number "9" therein, as follows: (FIG. 33) J pulse, PT5(B1–B2), RC2(B5–B6), RS(D2–D1), RZS(D2–D3), I108(D2–D3), I104(A5–A6), RNN(D6–D5), PT1(D2) (FIG. 38), PT1(D2), "9" key puller coil, PJG(A6–A5), 0 volts.

(18) The K pulse again advances the IOB and the RC1 relay, as in step 16, so that the IOB will stand at 0800040400 and the RC1(A8–B7) read-out contacts will be closed.

In shifting the contents of the IOB, the K pulse on the IOB advance line will not energize the first position IOB relays to transfer the tenth position contents thereinto, because the SRC relay contacts (A5–A6), (B5–B6), (C5–C6) and (D5–D6) (FIG. 37) are open. As a consequence, the digit in the tenth IOB position is discarded on each shift of the IOB.

The K pulse also energizes the RS relay so that the typewriter can be spaced to provide a space between the ninth and eighth IOB positions without the K pulse resulting therefrom being applied to the RC1 relay. The RS relay is energized as follows: (FIG. 32) K pulse, RC2 (D5–D6), RS(C2–C1), RC1(A6–B6), RS(A1–A2), RS (E-coil), 0 volts.

(19) The next J pulse again actuates the space bar of the typewriter to provide a space between the ninth and eighth position IOB positions as follows: (FIG. 33) J pulse, PT5(B1–B2), RC2(B5–B6), RS(D3–D2) (FIG. 32), RS(C1), RC1(A8–B6) (FIG. 33), RZS(C2–C3), RPS(C2–C1), REV(C4–D6) (FIG. 38), PT2 D7, "Space bar" puller coil, PJG(A6–A5), 0 volts.

(20) The K pulse, resulting from the spacing operation of the typewriter, restores the RS relay as follows: (FIG. 32) K pulse, RC2(D5–D6), RS(A3–A2) RS(E-coil), 0 volts.

The K pulse cannot advance the IOB or the RC1 relay as in step 16 because the RS(B2–B1) contacts are open, so the IOB remains at 0800040400 and the RC1(A8–B6) contacts remain closed.

(21) The next J pulse is used to type the "0" which had been shifted into the tenth IOB position in step 18, as follows: (FIG. 33) J pulse, PT5(B1–B2), RC2(B5–B6), RS(D2–D1), RZS(D2–D3), I108(D2–D1), I04(D2–D1), RNN(D8–D7), PT1(C2), (Sheet 17) PT1(C2), "0" key puller coil, PJG(A6–A5), 0 volts.

(22) The K pulse, again generated by the typewriter operation, advances the IOB and the RS1 relays, as in step 16, so that the IOB will stand at 8000404000 and the RC1 contacts A8 and A7 will be bridged.

(23) The J pulse interrogates the tenth position of the IOB, as in step 21, and since the I108 and I102 and I104 relays have been energized because of the "8" which had been transferred thereinto by step 22, the "8" key puller coil on the typewriter is operated to type out the number "8."

(24) The K pulse again advances the IOB and the RC1 relays, as in step 16, so that the IOB will stand at 0004040040, and the RC1 contacts Z8 and D5 will be bridged.

(25) The tenth position IOB relays I108 and I104 have not been energized by step 24, and the J pulse will cause a "0" to be printed out on the typewriter, exactly as in step 21.

(26) The K pulse will again advance the IOB and RC1 relays, as in step 16, so that the IOB will stand at 0040400000, and the RC1 contacts A8 and D6 will be closed.

It is again desired to space the typewriter to represent the comma between the sixth and fifth IOB positions, so the RS relay is again energized as follows: (FIG. 32) K pulse, RC2(D5–D6), RS(C2–C1), RC1(A8–D5), RS(A1–A2), RS(E-coil), 0 volts.

(27) The J pulse energizes the space bar puller coil on the typewriter, as in step 19, to move the typewriter carriage one column position.

(28) The K pulse restores the RS relay, but does not advance the IOB or the RC1 relays, as in step 20. Thus, the IOB continues to stand at 0040400000.

(29) The J pulse again interrogates the tenth position of the IOB and causes the "0" therein to be typed out on the typewriter, as in step 21.

(30) The K pulse again shifts the IOB relays and advances the RC1 relay, as in step 16, so that the IOB will stand at 0404000000, and the RC1 contacts A8 and D7 will be bridged.

(31) The J pulse again causes the typewriter to print out the number "0," as in step 21.

(32) The K pulse advances the IOB and the RC1 relays so that the IOB will stand at 4040000000, and the RC1 contacts A8 and C5 will be bridged.

(33) With a "4" now stored in the tenth position of the IOB, the I104, I102 and I101 relays will have been energized, and the J pulse will cause the number "4" to be typed out on the typewriter, in a manner similar to step 21.

(34) The K pulse again advances the IOB and the RC1 relays so that the IOB will stand at 0400000000 and the RC1 contacts A8 and C6 will be bridged.

At this time, it is again desired to energize the RS relay, because a period should be inserted between the third and second IOB positions to represent the decimal point, and the RS relay will stop the read out of the IOB to allow the decimal point to be inserted. The RS relay is energized as follows: (FIG. 33) K pulse, RCZ(D5–D6), RS (C2–C1), RC1(A8–C5), diode SR1(D8–D7), RS(A1–A2), RS(E-coil), 0 volts.

It will be noted that this same K pulse can pass from the RC1(A8–C5) contacts through diode XR1(C8–C7) to the A1 contact on the RZS relay. If there had been no significant figures in any of the IOB positions three through ten, the RZS relay would never have been energized, and all of the zeros in these IOB positions would have been suppressed in the read-out, with the space bar of the typewriter being operated each time. The present K pulse would then pass through RZS(A1–A2) to energize the RZS relay to prevent further zero suppression, so that the typewriter will then print out the decimal point and could then print out a zero in the second and first IOB positions. For example, the initial IOB indication could be 0000000005. This would be printed out as .05.

(35) The J pulse now causes the period to be printed by the following circuits: (FIG. 33) J pulse, PT5(B1–B2), RC2(B5–B6), RS(D2–D3) (FIG. 32), RS(C1), RC1(A8–C6) (FIG. 38), PT2(C7), "Period" key puller coil, PJG(A6–A5) 0 volts.

(36) The K pulse again restores the RS relay but cannot advance the IOB or the RC1 relays, as in step 20. The IOB continues to stand at 0400000000.

(37) The next J pulse again interrogates the tenth IOB position and causes the "0" therein to be typed out on the typewriter, as in step 21,

(38) The K pulse again advances the IOB and the RC1 relays, so that the IOB will stand at 4000000000, and the RC1 readout contacts A8 and C7 will be bridged.

(39) The J pulse causes the typewriter to type the number "4,'" which is in the tenth IOB position, as in step 33.

(40) The K pulse again advances the IOB relays so that they will stand at zero, or cleared, position; i.e., 0000000000.

The K pulse will also energize the RC1 relay, which will move the escapement wheel thereof back to its original position and will return its 10-pushbar back to its downwardly latched position.

The K pulse also restores the RC2 relay to its normal position by the following circuit: (FIG. 32) K pulse, RC2(D5–D6), RS(B2–B1), ED(C1–C2), RC1(D2–D3) (controlled by the 10-pushbar), RC1(A1–A2) (controlled by the 9-pushbar which is presently cammed down), RC2(A3–A2), RC2(E-coil), 0 volts.

(41) The number originally in the A register was positive, and it is desired to operate the space bar of the typewriter, to indicate that the number typed out is positive. The J pulse operates the typewriter space bar as follows: (FIG. 33) J pulse, PT5(B1–B2), RC2(B5–B4), RNN(C2–C3), REV(C5–C4) (FIG. 38), PT2(D7), "Spare bar" puller coil, PJG(A6–A5), 0 volts.

(42) The typewriter operations have been concluded, and all that is necessary now is to restore the relays which have been operated in the above steps.

The K pulse restores the PJG relay as follows: (FIG. 25) K pulse, RC2(D5–D4), PJG(A3–A2), PJG(E-coil), 0 volts.

The PT1–PT5 relays are restored as follows: (FIG. 39) K pulse, RC2(D5–D4), PT1–PT5(A1–A2), PT1–PT5-(E-coils), 0 volts.

(43) The next G pulse restores the RZS and RNN relays as follows: (FIG. 32) G pulse, RC2(C4–C5), RZS(D6–D5), RZS-RNN(A3–A2), RZS-RNN(E-coils), 0 volts.

With the last step, the read-out function is complete.

Read-Out of a Negative Number

The computer is designed so that the numbers stored in the registers will be in 9-complementary form if the number is in a negative form. Thus, the example "0908000402" discussed in the operation of the read-out circuitry would be indicated by a register as "9091999597" if the example were a negative value.

To illustrate the operation of the read-out function of a negative number, let it be assumed that the A register counters indicate the number 9091999597. The steps in the read-out function will be substantially the same as that described above; however, with the following differences in the previously described steps.

(2) Since the A10 counter stands at "9," the 9-pushbar will have closed the contacts (A2–A1) thereof, FIG. 32, so that the U pulse will energize the RNB relay, instead of the RNN relay.

(13) The C pulse (FIG. 32) passes through RNB(B2–B3) but since I108(A1–A2) and I104(A1–A2) are both open since a "9" is indicated by the tenth IOB position, the C pulse cannot get through to energize the RZS relay, and zeros will be suppressed.

(15) This step is identical to that previously described, and the J pulse operates the space bar on the typewriter.

(16) The K pulse, on FIG. 32, passes through RC2(D5–D6), RS(B2–B1), RNN(B2–B1), either of I98(A1–A2) or I94(A1–A2) (both are closed since the ninth IOB position stands at "0" and through RZS(A1–A2) to energize the RZS relay.

Figure 33:
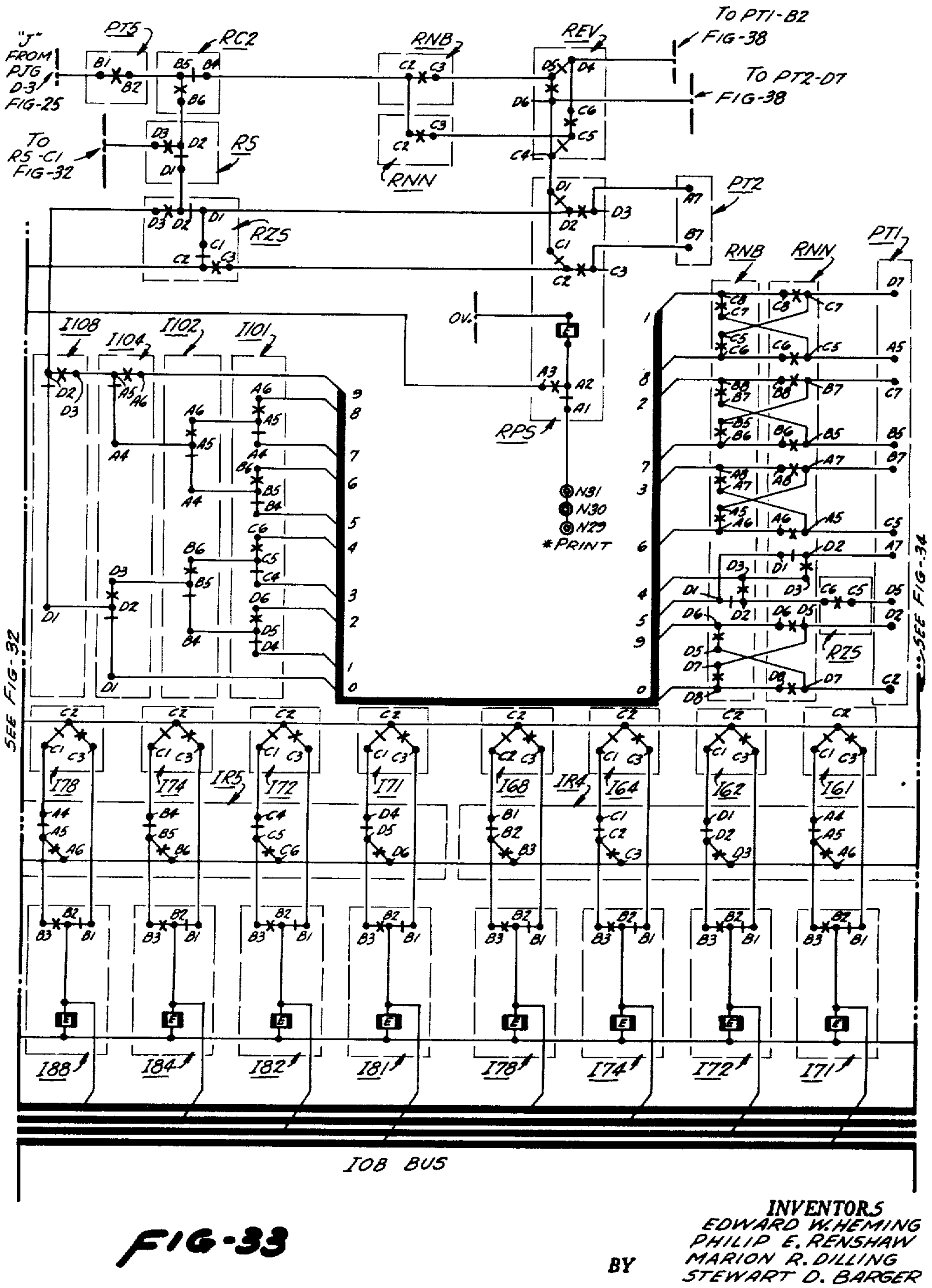
Figure 34:
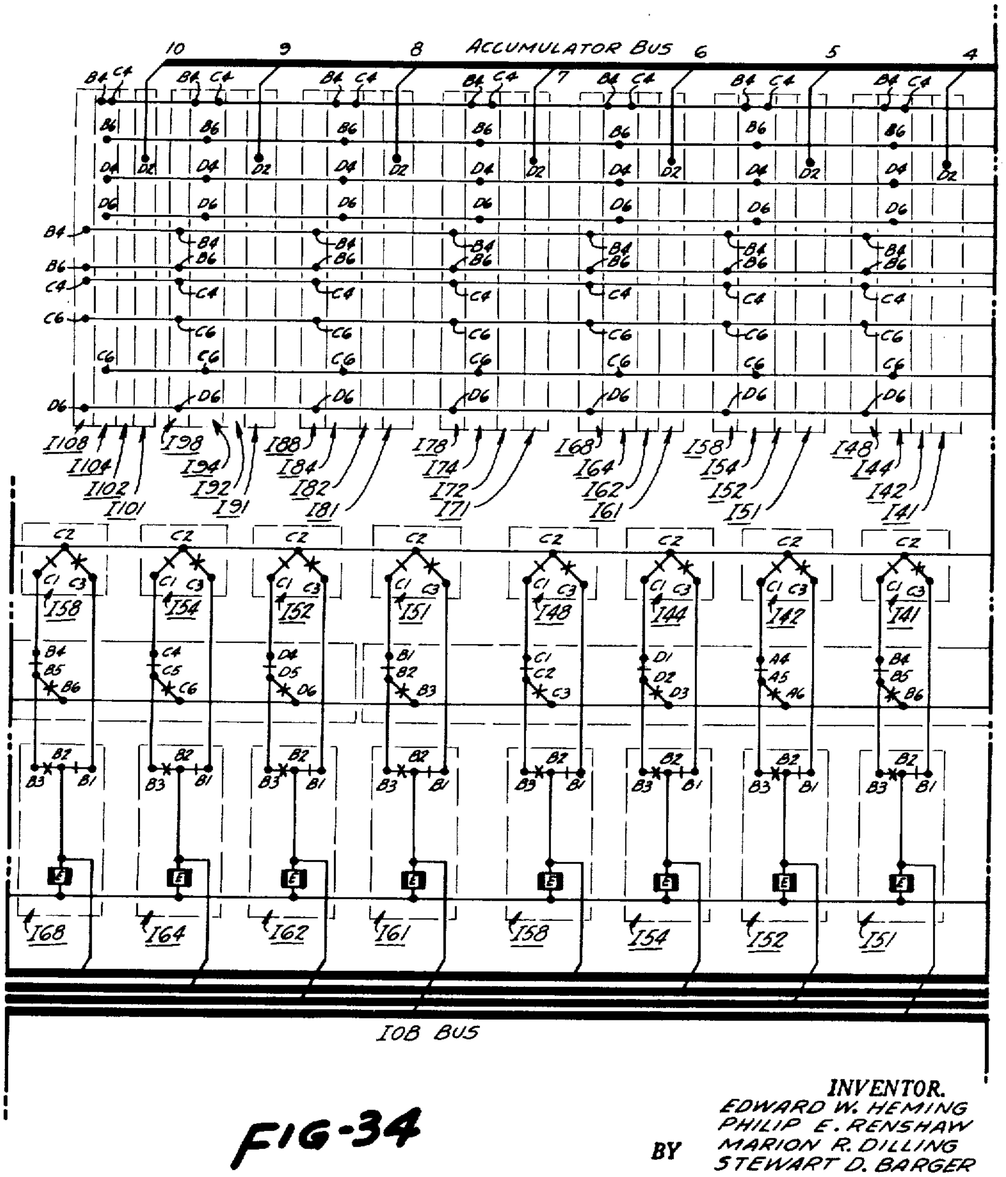

(17) The J pulse is generated as before and travels through the same path above described until it passes through RZS(D2–D3), FIG. 33. The J pulse then passes through I108(D2–D1), I04(D2–D1), and RNB(D8–D7) to PT1(D2). The J pulse then passes to FIG. 38 to energize the "9" key puller coil on the typewriter. Thus, the RNB relay is used to convert the "0" presently in the tenth position to a "9" on the typewriter.

The steps 21, 23, 25, 29, 31, 33, 37 and 39 are all similar to those previously described, with the J pulse being directed by the RNB relay to energize the typewrite keys in accordance with the 9-complement value of the number in the tenth IOB position each time.

(41) The J pulse in this step passes through RNB(C2–C3), FIG. 33, instead of RNN(C2–C3) as before, to cause the CR key on the typewriter to operate in order to indicate a minus, or credit value.

(43) The G pulse restores the RNB relay instead of the RNN relay by the same path as above described.

In the operation thus described, the number 9091999597 stored in the A register has been now typed out as: "9 080 004.04CR."

Shortened Word Length Read-Out

Another feature of the present computer is that the number of the IOB positions that are read out may be varied as desired. For example, the numbers operated upon by the computer unit in a given program may be of small magnitude such that the higher order positions of the register and the IOB will not be used but will remain in zero indicating position. If the space reserved for the answer on the paper carried in the typewriter is limited in column width, it would be desirable to simply discard the higher order positions of the IOB in a read-out function, since these positions will not have any significant figures therein, and delay the typing operation of the typewriter so that only a desired number of IOB positions is read out.

More specifically, it might be that in a normal program the largest figure to be encountered as a total will be only seven digits long. A complete read-out operation, as above described, will require a total of fourteen columns on the typewriter. However, the computer unit can be set so that only the seven lowest order positions of the IOB will be read out, requiring only a total of ten columns; i.e., the seven spaces for the seven digits, a space between the second and third highest order digits, a period between the fifth and sixth highest order digits, and a space after the last digit for the indication of a plus or minus figure.

On the plugboard 22, a jumper wire is connected between hubs M29 and M32 (FIG. 32).

Referring back to the steps described in connection with the read-out function, the steps A, 1 and 2 are identical.

During the steps 3–12 when the roll pulses are being generated by the emitter, the emitter digit bus will also be impressed with a different number of pulses on each line thereof. The three pulses on emitter digit bus line 3 will appear at hub M32 (FIG. 32) and be jumpered to hub M29 to pass through ED(C3–C2) and RC1(D2–D3) to energize the E-coil of the RC1 relay three times. In addition, the three pulses will pass through RC1(C2–C3) to the IOB advance line, to advance the information in the IOB positions to the next highest order positions three times.

Thus, by the end of step 12, the IOB will have been advanced three times to the left, and the RC1 relay will have advanced three steps so that the read-out contacts A8 and A7 will be bridged.

Steps 12–14 are identical to those described above.

Since the relay RC1 has already been advanced three times, the steps 15–22 are eliminated, and the next step corresponds to step 23 above. The remaining steps above are carried out identically.

Thus, by jumper wiring the hubs M32 and M29, the example given above will be printed out as "80 004.02" instead of "9 080 004.04."

The RZS relay will operate in a shortened word length read-out to suppress zeros before the first significant figure in the same manner as in the regular length read-out function.

Depending on which hub M30, M31, M32, M33 or M34 is connected to hub M29, 5, 6, 7, 8 or 9 of the lowest order IOB positions may be read out, with the higher order positions being discarded.

THE PROGRAM UNIT

Having now described the operations involved in the various transfers of numerical information between the typewriter and computer unit and internally of the computer unit, the operation of the program unit may now be described.

The program unit is used to control the different functions of the computer unit, and, more particularly, is used to instruct the computer to automatically carry out a desired sequence of functions.

The program unit itself operates to impress a series of G pulses sequentially upon different output hubs of the plugboard. Jumper wires are connected between these output hubs and input hubs which are connected to specific portions of the computer unit. Thus, the G pulses can be used sequentially to instruct different portions of the computer unit to function. The program unit will pause, while a function is being carried out, and will start up again when the function is through, to instruct the computer to perform another function. The program unit will finally shut itself off when all of the functions have been carried out.

To illustrate the manner in which the G pulses are directed to the different plugboard hubs by the program unit, Table No. 8 has been prepared, which table is similar to previous tables. The last two columns of Table No. 8 indicate the program steps available and the plugboard hubs that are energized. To carry out a program, it is necessary to connect these hubs to preselected computer unit sections, as will be described hereinafter.

*Table No. 8*

OPERATION OF THE PROGRAM UNIT UTILIZING ONE PROGRAM STEPPER RELAY

| Step | Pulse Generated | Relay Coil Energized to move contacts to operated position | Relay Coil Energized to restore contacts to normal position | Program Steps of PS1 relay | Plugboard Hubs Energized |
|---|---|---|---|---|---|
| A | | SHG | | | |
| 1 | S | PSS, PS1 (U) | | | L10–K10. |
| 2 | | GHG | | | |
| 3 | G | PSC, PR | | | |
| 4 | G | PS1 | PR, PSC | | |
| 5 | G | PSC | | 1 | A10. |
| 6 | G | PS1 | PSC | | |
| 7 | G | PSC | | 2 | B10. |
| 8 | G | PS1 | PSC | | |
| 9 | G | PSC | | 3 | C10. |
| 10 | G | PS1 | PSC | | |
| 11 | G | PSC | | 4 | D10. |
| 12 | G | PS1 | PSC | | |
| 13 | G | PSC | | 5 | E10. |
| 14 | G | PS1 | PSC | | |
| 15 | G | PSC | | 6 | F10. |
| 16 | G | PS1 | PSC | | |
| 17 | G | PSC | | 7 | G10. |

*Table No. 8*—Continued

OPERATION OF THE PROGRAM UNIT UTILIZING ONEh PROGRAM STEPPER RELAY

| Step | Pulse Generated | Relay Coil Energized to move contacts to operated position | Relay Coil Energized to restore contacts to normal position | Program Steps of PS1 relay | Plugboard Hubs Energized |
|---|---|---|---|---|---|
| 18 | G | PS1 | PSC | | |
| 19 | G | PSC | | 8 | H10. |
| 20 | G | PS1 | PSC | | |
| 21 | G | PSC | | Out | J10. |
| 22 | G | PS1 | PSC | | |
| 23 | G | PSC, PR | | | |
| 24 | G | | PSC, PR, PSS. | | |
| 25 | | | GHG | | |

(A) To start the programmer into operation, the typist presses one of the selector switches 17 on the control panel 16. In the present example, the typist presses the "1" selector switch. As has been previously described in connection with S-pulse generation, the closing of the "1" Sel. Sw. energizes the SHG relay (FIG. 24) to produce an S pulse.

(1) The S pulse energizes the program start-stop relay PSS, as follows: (FIG. 24) 40 volts, SHG(3–1), PSS(C1–C2), MC(C4–C5) (FIG. 41), "1" Sel. Sw. (4–3)

(FIG. 40) PSS(B2–B1), PSS(A1–A2), PSS(E-coil), 0 volts.

The S pulse also energizes the unlatch coil of the selected program stepper relay, PS1, as follows: (FIG. 24) 40 volts SHG(3–1), PSS(C1–C2), MC(C4–C5) (FIG. 41), "1" Sel. Sw. (6–5), plugboard hub L10 by jumper wire to plugboard hub K10 (FIG. 40),

PS1(U-coil)

0 volts.

The program stepper relays PS0–PS12 are pulse counting relays, as illustrated in FIGS. 7 and 8, each relay having a 9-pushbar actuated when the escapement wheel has been moved to its ninth position, and a 10-pushbar which is cammed downwardly and latched when the escapement wheel has been moved to its tenth, or zero, position.

The ninth position of the program stepper relays PS0–PS12 is used in the program unit for their normal, or "home," position. As a consequence, the 9-pushbar operated contacts (designated by the letters A and B) are illustrated in their normal position, with the 9-pushbar cammed downwardly. For all other rotative positions of the program stepper relays, the A and B contacts thereof will be actuated from the positions shown in the drawings.

The normal positions of the C and D designated contacts of these relays (controlled by the 10-pushbars) are likewise shown with the relays in their ninth position, and with the 10-pushbars in latched down position. If the U-coil is energized, the C and D contacts will move to operated positions, but will be restored to their illustrated positions after the first time the E-coil is energized, since this energization will cause the escapement wheel to move from its ninth to its tenth position.

The program stepper relays PS0–PS12 are each provided with a digital static read-out plate, as illustrated in FIG. 14, so that a separate and distinct circuit is completed through the static read-out plate for each rotative position of the escapement wheel.

The energization of the PS1(U-coil) in this step by the S pulse releases the 10-pushbar for upward movement and moves the C and D designated switch contacts to actuated positions.

(2) Referring now to FIG. 23, since the PSS relay has been energized, the now closed contacts PSS(B2–B3) will allow the GHG relay to be energized, to start the G-pulse generator into operation. These G pulses will be produced periodically until the PSS hold contacts (B2–B3) are again opened.

(3) The G pulse will energize the program stepper control relay PSC, as follows: (FIG. 40) G pulse, MS(D2–D1), PSS(D5–D6), PR(B2–B1), PT5(D2–D3), PSC(A1–A2), PSC(E-coil), 0 volts.

The G pulse also energizes the program reset relay, PR, as follows: (FIG. 40) G pulse, MS(D2–D1), PSS(D5–D6), PR(B2–B1), PT5(D2–D3), PSC(B2–B1), PT5(B3–B2), RC2(D2–D1), RZS(B2–B1) (FIG. 39), PS0(A8–C7), PS1–PS12(A8–C7) (FIG. 40), diode XR1(B4–B3), PR(A1–A2), PR(E-coil), 0 volts.

(4) The next G pulse energizes the E-coil of the PS1 relay as follows: (FIG. 40) G pulse, MS(D2–D1), PSS(D5–D6), PR(C3–C2), PS12–PS0(A2–A1), PR(B5–B6), PS12–PS2(C2–C1), PS1(C2–C3), PS1(B1–B2), PS1(E-coil), 0 volts. This energization of the PS1 relay will cause the escapement wheel to move from the home "9" position to the "0" position, and will cause all of the A and B contacts operated by the 9-pushbar to move to their actuated position. These A and B contacts will be restored to their normal position illustrated when the escapement wheel again moves home to the ninth position thereof.

As mentioned above, the energization of the E-coil of the PS1 relay will cause the 10-pushbar to be moved down and latched, so that the C and D contacts thereof return to their illustrated normal positions.

The energization of the E-coil of the PS1 relay also will cause the escapement wheel thereof to rotate one step so that the read-out brush will bridge the contacts A8 and B5.

The G pulse also restores the PR relay as follows: (FIG. 40) G pulse, MS(D2–D1), PSS(D5–D6), PR(C3–C2), PS12–PS0(A2–A1), PR(A3–A2), PR(E-coil), 0 volts.

The PSC relay is also restored, as follows: (FIG. 40) G pulse, MS(D2–D1), PSS(D5–D6), PR(B2–B3), PSC(A3–A2), PSC(E-coil), 0 volts.

As soon as the PR relay contacts are restored and the PS1 9-pushbar operated contacts are actuated, the pilot light for the first selector switch is lit, as follows: (FIG. 40) 20 volts, PR(C1–C2), PS12–PS2(A2–A1), PS1(A2–A3), plugboard hub S30 by jumper wire to plugboard hub R34 (FIG. 41), "1" pilot light, 0 volts.

(5) The G pulse again energizes the PSC relay, as in step 3.

The G pulse also appears on the first step output hub A10 on the plugboard, by the following circuit: (FIG. 40) G pulse, MS(D2–D1), PSS(D5–D6), PR(B2–B1), PT5(D2–D3), PSC(B2–B1), PT5(B3–B2), RC2(D2–D1), RZS(B2–B1) (FIG. 39), PS0(A8–C7), PS1(A8–B5) to plugboard hub A10.

As will be described, the G pulse on plugboard hub A10 can be used as a command signal in the various portions of the computer to instruct the computer to perform various functions. As, for example, in the description of the transfer of numerical information from the IOB to the A register, Step A indicated that the programmer had energized the AI relay. This could be done by connecting a jumper wire from the plugboard hub A10 (FIG. 39) to plugboard hub C7 (FIG. 29). The G pulse on hub A10 would then pass to hub C7 through AI(A1–A2) to energize the E-coil of relay AI.

(6) The next G pulse again energizes the PS1 relay to move it another step by the following circuit: (FIG. 40) G pulse, MS(D2–D1), PSS(D5–D6), PR(B2–B1), PT5(D2–D3), PSC(B2–B3), PT5(C2–C3), PS1(B3–B2), PS1(E-coil), 0 volts. This will cause the read-out contacts A8 and B6 to become bridged.

The PSC relay is also restored by this G pulse, as follows: (FIG. 40) G pulse, MS(D2–D1), PSS(D5–D6), PR(B2–B1), PT5(D2–D3), PSC(B2–B3), PT5(C2–C3), PSC(A3–A2), PSC(E-coil), 0 volts.

(7) The PSC relay is again energized as in step 3, and a G pulse appears on plugboard hub B10, as in step 5, since the PS1 read-out contacts A8 and B6 are now closed.

(8) The PS1 relay is pulsed to advance it one step, and the PSC relay is restored, as in step 6.

(9) The PSC relay is energized, as in step 3.

A G pulse appears on the third output plugboard hub C10, as in step 5, since the PS1 read-out contacts A8 and B7 are now closed.

(10–21) The alternate energization of the PS1 output hubs continues, as above, with the PS1 relay being energized and the PSC relay being restored on each even number step, and with the PSC relay being energized and the PS1 output hubs being energized on every odd numbered step.

(22) The PSC relay is again restored, and the PS1 relay is again pulsed as in step 6. This is the tenth time that the E-coil of the PS1 relay has been pulsed, and will cause it to return home to its ninth position, to actuate the 9-pushbar and return the A and B contacts to their normal illustrated position. The read-out contacts A8 and C7 of the PS1 relay will again be bridged by the read-out brush.

The "1" pilot light will go out as soon as the PS1 (A2–A3) contacts return to normal open position.

(23) The PSC and the PR relays are again energized, both by the same circuits as step 3.

(24) The PSC and PR relays are restored, as in step 4.

The G pulse also restores the PSS relay as follows: (FIG. 40) G pulse, MS(D2–D1), PSS(D5–D6),

PR(C3–C2)

PS12–PS0(A2–A1), PR(B5–B6), PS12–PS0(C2–C1), PSM(C1–C2), PSS(A3–A2), PSS(E-coil), 0 volts.

(25) With the PSS relay restored, the G-pulse generator hold contacts PSS(B2–B3) (FIG. 23) will open, causing the GHG relay to deenergize. The generation of G pulses will now cease.

With the PR relay restored, the "T-only" pilot light 25 on the control panel 16 will become lit by the following circuit: (FIG. 40) 20 volts, PR(C1–C2),

PS12–PS0(A2–A1)

PR(B5–B4), "T-only" pilot light, 0 volts. Since this last circuit includes all of the (A1–A2) contacts of the PS0–PS12 stepper relays, the "T-only" light cannot be lit if any of these contacts are open, which will be the case if a program is in operation.

At the end of the 25th step, the PSS, PR and PSC relays will have been restored, the PS1 relay will be back in "home" position, the G pulses will have ended, and the typewriter will again be under full manual control of the typist.

As described above, a complete operation of one program stepper relay will direct G pulses to nine different plugboard hubs. As will be described in greater detail hereinafter, these pulses can be used to perform nine steps in a desired program. Most programs, however, will require more than nine steps, and thus it is necessary to provide some manner of increasing the number of program steps available in response to the single operation of a program selector switch 17 by the typist.

In the present programmer, this is made possible by using the last program step, the "Out" step, to start another program stepper relay into operation. To illustrate this operation, let it be assumed that the "1" selector switch is again connected to the PS1 relay by a jumper wire from plugboard hub L10 to the "In" hub K10 of the PS1 relay, as above. To connect another program stepper relay into the program, a jumper wire is connected from the "Out" hub J10 of the PS1 relay to the "In" hub K11 of the PS2 relay.

Table No. 9, similar to Table No. 8, has been prepared to illustrate the sequence of operations.

*Table No. 9*

OPERATION OF THE PROGRAM UNIT UTILIZING TWO PROGRAM STEPPER RELAYS IN SERIES

| Step | Pulse Generated | Relay Coil Energized to move contacts to operated position | Relay Coil Energized to restore contacts to normal position | Program Steps | | Plugboard Hubs Energized |
|---|---|---|---|---|---|---|
| | | | | PS1 Relay | PS2 Relay | |
| A-20 | (Identical to steps A-20 of Table No. 8) | | | | | |
| 21 | G | PSC, PS2 (U) | | Out | | J10-K11. |
| 22 | G | PS1 | PSC | | | |
| 23 | G | PSC, PR | | | | |
| 24 | G | PS2 | PSC, PR | | | |
| 25 | G | PSC | | | 1 | A11. |
| 26 | G | PS2 | PSC | | | |
| 27 | G | PSC | | | 2 | B11. |
| 28 | G | PS2 | PSC | | | |
| 29 | G | PSC | | | 3 | C11. |
| 30 | G | PS2 | PSC | | | |
| 31 | G | PSC | | | 4 | D11. |
| 32 | G | PS2 | PSC | | | |
| 33 | G | PSC | | | 5 | E11. |
| 34 | G | PS2 | PSC | | | |
| 35 | G | PSC | | | 6 | F11. |
| 36 | G | PS2 | PSC | | | |
| 37 | G | PSC | | | 7 | G11. |
| 38 | G | PS2 | PSC | | | |
| 39 | G | PSC | | | 8 | H11. |
| 40 | G | PS2 | PSC | | | |
| 41 | G | PSC | | | Out | J11. |
| 42 | G | PS2 | PSC | | | |
| 43 | G | PSC, PR | | | | |
| 44 | G | | PSC, PR, PSS | | | |
| 45 | | | GHG | | | |

(A–20) These steps are identical to the same steps described in Table No. 8, with alternate G pulses being imposed upon the plugboard output hubs A10–H10.

(21) The PSC relay is again energized as in step 21 of Table No. 8.

The G pulse on PS1 "out" hub J10 is connected by a jumper wire to the PS2 "In" hub K11 (FIG. 40) and energizes the U-coil of the PS2 relay, to unlatch the 10-pushbar thereof.

(22) The PS1 relay is energized for the tenth time, causing it to return home to its ninth position, and the PSC relay is restored, as in step 22 of Table No. 8.

(23) The PSC and PR relays are both energized, as in step 23 of Table No. 8.

(24) The PSC and PR relays are both restored, as in step 23 of Table No. 8.

The PSS relay is not restored as in step 24 of Table No. 8, since the circuit for such restoration included the PS2(C2–C1) contacts, which are now open. Since the PSS relay is not restored, G pulses continue to be generated.

The G pulse in this step also energizes the E-coil of the PS2 relay, in a manner similar to step 4 of Table No. 8, causing the PS2 10-pushbar contacts to return to normal position, and the PS2 9-pushbar contacts to move to operated position.

The "1" pilot light is again lit, as in step 4 of Table No. 8, a jumper wire having been previously connected between hubs S31 and R30 for this purpose.

(25–41) These steps are identical to steps 5–21 described in Table No. 8, with the only difference being that the PS2 relay is now involved instead of the PS1 relay previously described. Alternate G pulses will appear on the PS2 output hubs A11 through H11 on the plugboard.

(42–45) These steps are identical to steps 22–25 of Table No. 8, in which the programmer and the G-pulse generator shut down.

If desired, the "Out" hub J11 of the PS2 relay could be connected to the "In" hub of any of the other program stepper relays, if it is desired to increase the number of program steps. In addition, the "Out" hub of a program stepper relay can be connected to its own "In" hub and the programmer will continually repeat its operations until the typist stops such cycling operation in a manner to be described hereinafter.

As mentioned above, the program unit is designed to suspend program operations involving communication between the typewriter and IOB, or involving numerical transfers between different sections of the computer unit.

In regards to the transfer of numerical information from the typewriter to the IOB, Table No. 2, it will be noted that the K relay was energized in step A. As will be brought out hereinafter, the PSS relay is restored at the same time as the K relay is energized, so the normally open PSS(D5–D6) contacts will prevent G pulses from reaching the PSC or PS1 relays. The program will then be suspended until the PSS relay is again energized.

In regards to the transfer from the IOB to the A register, Table No. 3, or from the transfer from the A register to the IOB, Tables Nos. 4 and 5, it will be noted that such transfers required a single emitter cycle. Since G pulses on the G-pulse line alone are used to actuate the PSC and PS1 relays, and since there are no pulses on the G-pulse line during an emitter cycle, then it is obvious that no pulses can reach the PSC or PS1 relays until an emitter cycle is completed.

In a multiplication function, Table No. 6, a plurality of emitter cycles were used, and a G pulse was produced between each cycle of the emitter. These G pulses are prevented from reaching the PSC or PS1 relays by the MS(D1–D2) contacts which open during a multiplication function. The first G pulse following the restoring of the MS relay will again start the program unit into operation.

In a read-out operation, Table No. 7, the PT5 relay will be actuated during the first emitter cycle. The opening of the PT5(C2–C3) contacts will then prevent any G pulse from getting to the PSC or PS1 relays. Again, the first G pulse following the restoration of the PT5 relay will restart the program unit into the sequential output of pulses.

PROGRAM UNIT COMMANDS

As has been described, the operation of the program unit will cause a series of G pulses to be impressed upon the various plugboard output hubs of the program stepper relays PS1–PS12.

Also, in the description of the various transfers of numerical information, it was stated that various relays had been energized by the program unit. As, for example, in step A of the transfer from the typewriter to the IOB, the program unit had caused the K relay to have been energized. Or, in step A of the transfer from the IOB to the A register, the program unit had just caused the AI, IAI and ED relays to have been energized.

Figure 20:
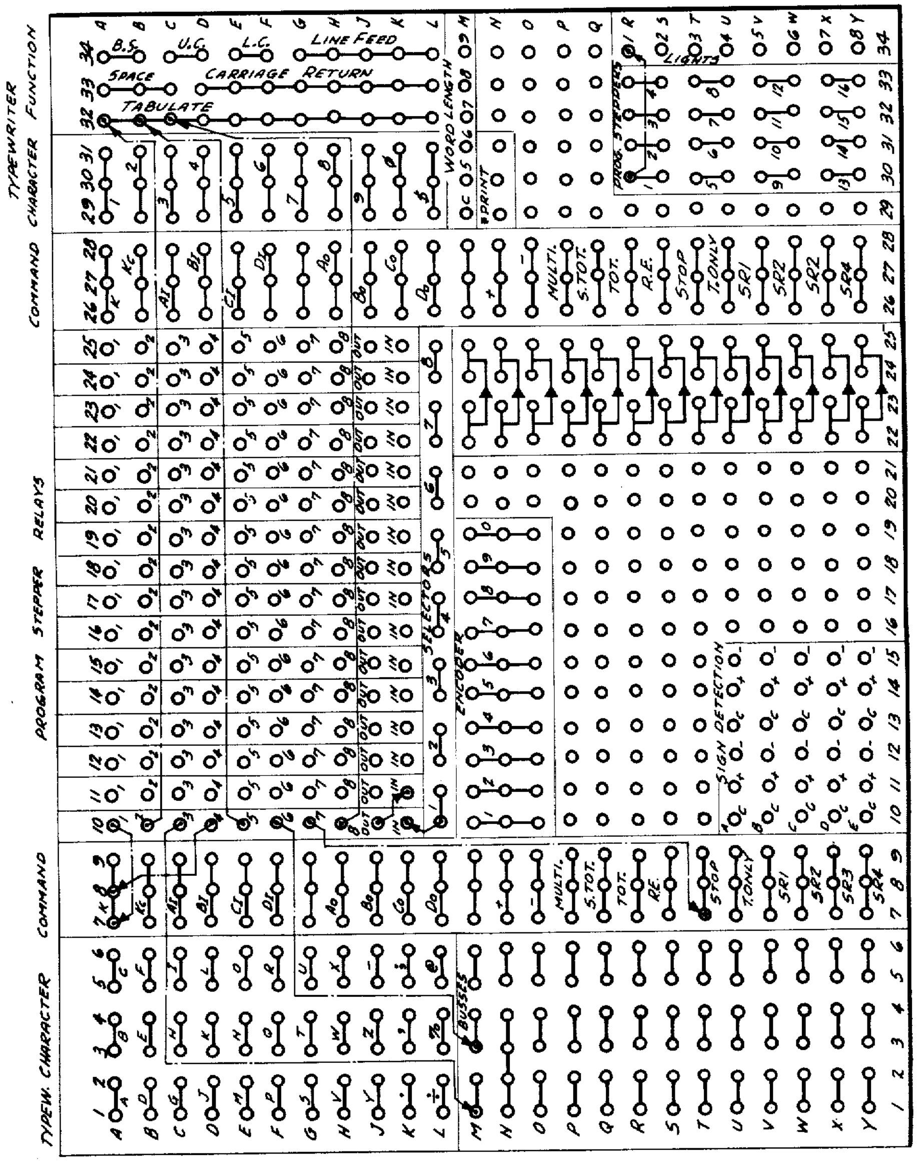
FIG. 20 is a representation of the plugboard hubs, with illustrative jumper wire connections between hubs to enable the computer to perform a programmed operation.

In general, these preliminary functions are caused by connecting the program stepper relay output hubs to the various "command" hubs on the plugboard 22 (FIG. 20). In this section of the description, the effect of a G pulse on the various command hubs will be described.

"STOP" Command

This command is used to stop the programming unit at any desired time, as, for example, when it is desired to type information by the typist.

On FIG. 40, a G pulse on any of the "STOP" hubs (T7, T8, T9, T26, T27 or T28) will pass through the contacts PSM(C1–C2) and PSS(A3–A2) to energize the E-coil of the PSS relay, to return its switches to normal position. The opening of PSS(D5–D6) will prevent the succeeding G pulses from getting through to the PSC relay and the program stepper relays PS1–PS12, and the program operations will cease.

Any letter or number can now be typed without affecting the computer.

The program unit can be started back into operation by the typist pressing the "GO" button 21, on the typewriter. This will generate an "S" pulse, as previously described in connection with FIG. 24, which, on FIG. 40, passes through PSS(A5–A4), PSC(B8–B7), PSS(A1–A2) to energize PSS(E-coil). The contacts PSS(D5–D6) now allow G pulses to go to the PSC relay and the program stepper relays PS1–PS12.

"K" Command

This command is used to stop the operation of the programming unit and to allow numbers to be entered from the typewriter into the IOB.

On FIG. 40, a G pulse on any of the "K" hubs (A7, A8, A9, A26, A27 or A28) will pass through diode XR1(A8–A7) and PSS(A3–A2) to energize PSS(E-coil) to stop the operation of the program unit. The G pulse also passes through diode XR1(B8–B7) and on FIG. 41 through K(A1–A2) to energize K(E-coil).

The energization of the K relay allows numbers to be entered into the IOB by the typist, as previously described.

The program unit is again started into operation by the operator pressing the "GO" button on the typewriter, in the same manner as following a "STOP" operation.

"AI" Command

This command (A Input) is used to transfer numbers from the IOB into the A register.

The G pulse appearing on any one of the "AI" hubs (C7, C8, C9, C26, C27 or C28, FIG. 29) passes through AI(A1–A2) to energize AI(E-coil).

Similarly, the "BI," "CI" and "DI" hubs are used to energize the BI, CI and DI relays, respectively.

"+" Command

This command is used in the positive addition of numbers from the IOB to a desired register.

On FIG. 41, the G pulse on any one of the "+" hubs (N7, N8, N9, N26, N27 or N28) passes through REV(C2–C1) and IAI(A1–A2) to energize the IAI(E-coil).

The next G pulse can now pass through IAI(B3–B2), FIG. 26, and through ED(A1–A2) to energize the ED(E-coil) to start an emitter cycle.

"—" Command

This command is used to subtract a number from the IOB to a desired register.

On FIG. 41, the G pulse on any of the "—" hubs (O7, O8, O9, O26, O27 or O28) passes through REV(D2–D1) and ISI(A1–A2) to energize the ISI(E-coil).

The next G pulse can pass through ISI(B3–B2) (FIG. 26) to energize the E-coil of the ED relay to start an emitter cycle.

The "+" and "—" comamnds are always used with an "AI," "BI," "CI" or "DI" command to select the register into which the addition or subtraction is to be made, and both the IAI and ISI relays will start an emitter cycle when energized.

"AO" Command

This command (A Output) is used in the transfer of numerical information from the A register to the IOB.

The G pulse appearing on any of the "AO" hubs (H7, H8, H9, H26, H27, H28), FIG. 29, passes through the (A1–A2) contacts of the A register output relays AO1, AO2, AO4 and AO8 to energize the E-coils of these relays.

Similarly, the "BO," "CO" and "DO" hubs are used to energize the output relays of the B, C, and D registers, respectively.

"REV. ENTRY" Command

This command is used when it is desired to type out a number from a register with the plus or minus sign of the number being changed. As, for example, if a positive number is in the A register, the "REV. ENTRY" command will enable the number to be transferred from the A register to the IOB, and the number will then be typed out on the typewriter with a "Cr" symbol thereafter indicating a negative number. At the same time, if the reverse entry command has been given, the sign of the number will be reversed if the number is transferred to another register. Again, for example, if a positive number is in the IOB to be transferred to the B register, and the "BI," "+" and "REV. ENTRY" commands have been given, the number will be transferred to the B register in minus (complementary) form. To transfer the number in positive form with the reverse entry command in effect, the "—" hub must be energized in the transfer from the IOB to the B register.

On FIG. 32, the G pulse appearing on any of the "REV. ENTRY" hubs (S7, S8, S9, S26, S27 or S28) will pass through REV(A1–A2) to energize REV(E-coil).

In a read-out operation wherein the number in the IOB is positive, the RNV relay will have been energized to close the contacts RNN(C2–C3), FIG. 33. Normally, the last J pulse after all numbers had been read out would pass through RNN(C2–C3) and REV(C5–C4) to operate the typewriter space bar, indicating a positive number. Now, however, with the REV relay energized, the J pulse will instead pass through REV(C5–C6) to operate the "CR" key on the typewriter.

Similarly, if a negative number were in the IOB, such that the RNB relay would have been energized, the last J pulse will operater the space bar if the REV relay is energized.

The REV relay will be restored to its normal position at the same time as are relays RNN, RNB and RZS.

On FIG. 41, the operation of the REV relay will cause a G pulse on the "+" hubs to energize the ISI relay or a G pulse on the "—" hubs to energize the IAI relay.

"MULT" Command

This command is used to perform a multiplication function in the computer.

A G pulse on one of the "MULT" hubs (P7, P8, P9, P26, P27 or P28) FIG. 37, will pass through ML(A1–A2) to energize ML(E-coil).

As has been described in connection with the multiplication process, the ML relay has to be energized twice during a multiplication, once after each of the two numbers has been entered into the IOB. This will require the "MULT" hubs to be twice energized by G pulses during such a process.

"SR1" Command

This command is used to shift the number to the right one space during a multiplication, so that, in effect, the decimal point will be shifted to the left.

On FIG. 37, a G pulse on one of the SR1 hubs (V7, V8, V9, V26, V27 or V28) will pass through SR1(A1–A2) to energize SR1(E-coil).

The SR2, SR3 and SR4 hubs can be similarly energized in order to energize the SR2, SR3 and SR4 relays, as desired.

In addition, the computer is designed so that the shift right function that is programmed can be overridden by the operator at the typewriter if desired. As, for example, suppose a multiplication operation had been programmed so that a "shift right one" would occur. The SR1 relay would be energized by the G pulse from the programmer at the SR1 hubs, as above described. Also let it be assumed that the particular operation requires a "shift right two" function. The typist, after typing the second number into the IOB, will then type the particular letter key whose binary code is 100011. This will energize the KF1, KF2 and K32 relays, FIG. 36, and the next G pulse will pass through K(A6–A5), KF32(C5–C6), KF16(C5–C4), KF8(B5–B4), KF4(A5–A4), KF2(A5–A6), KF1 (A5–A6), to FIG. 37, through XR1(C6–C5), SR2(C1–C2), SR1(A3–A2) to energize SR1(E-coil) to restore it to normal position, and on FIG. 37 through SR2(A1–A2) to energize SR2(E-coil). Thus, the SR2 relay is energized and the SR1 relay is restored to override the programmed shift right function.

In the same manner, the typist can actuate a desired shift right relay during a multiplication function even though no shift right function had been programmed, by operating the proper typewriter key. The typewriter keys to energize the SR1, SR2, SR3 and SR4 relays are those keys having a binary code 101111, 100011, 101101 and 111110, respectively.

"TOT" Command

This comand is used whenever it is desired to read out the total in any register, and is always programmed with an "AO," "BO," "CO" or "DO" command to select the register from which the total is desired.

On FIG. 29, a previous G pulse on an "AO" hub will have caused the AO1, AO2, AO4 and AO8 relays to be energized. The next G pulse on any one of the "TOT" hubs (R7, R8, R9, R26, R27 or R28) will pass through AO1(B2–B3) and AR(A1–A2) to energize the AR(E-coil).

Similarly, the G pulse on the "TOT" hubs will energize the BR, CR or DR relays if the BO1, CO1 or DO1 relays had been energized.

On FIG. 26, the energization of any of the AR, BR, CR or DR relays will allow the next G pulse to pass through the contacts B3–B2 thereof to energize the E-coil of the ED relay to start an emitter cycle.

The particular register whose contents are read out on this operation will be cleared; i.e., returned to zero storage position because of the energization of the register restore relay AR, BR, CR or DR.

"S-TOT" Command

This command is used whenever it is desired to obtain a sub-total, that is, to read out the contents of a register without clearing that register. Again, the "S-TOT" command is used with an "AO," "BO," "CO" or "DO" command to select the desired register from which the subtotal is desired.

On FIG. 26, a G pulse appearing on any one of the "S-TOT" hubs (Q7, Q8, Q9, Q26, Q27, Q28) will pass through ED(A1–A2) directly to energize the E-coil of the ED relay to start an emitter cycle. The AR, BR, CR or DR relays are not energized, and thus the contents of these registers will not be disturbed in a sub-total operation.

In the above described functions, an emitter cycle will be caused by a G pulse at any of the following command hubs: "+," "−," "MULT," "TOT" or "S-TOT." If the command is by "TOT" or "S-TOT," then the U pulse (FIG. 32) is free to pass through IAI(C1–C2), ISI(C1–C2) and MC(C1–C2) to energize the read-out relays. If the command had been by the "+," "−" or "MULT" hubs, then one of these three relays (IAI, ISI or MC) would have been energized to prevent a read-out function.

"* PRINT" Command

This command is used in check writing functions, for check protection purposes. To illustrate, suppose the number 6321850 is in the IOB to be read out. In normal operations this would be typed out as "63 218.50." For check protection and form, it is desired to print some symbol, as, for example, a "$" in every space before the first significant figure and to insert commas in the appropriate places. That is, it is desired to print out the above number in the following form: "$$$$63,218.50."

On FIG. 33, the G pulse on any one of the "* PRINT" hubs (N29, N30 or N31) will pass through RPS(A1–A2) to energize the E-coil of the RPS relay.

All of the J pulses which would normally pass through RZS(D2–D1) and through RPS(D2–D1) to actuate the typewriter space bar will now instead pass through RPS(D2–D3) to actuate the typewriter "$" key. The latter J pulses (after a significant figure has been typed) which would ordinarily pass through RZS(C2–C3) and RPS(C2–C1) to actuate the typewriter space bar will now pass through RPS(C2–C3) to actuate the comma key of the typewriter.

The RPS relay will be restored to its normal position at the same time as are the RZS, REV, RNN and RNB relays (FIG. 32).

Typewriter Character or Function Commands

These hubs can be used whenever it is desired to have the computer operate any desired typewriter key or function (such as carriage return, tabulate, etc.).

The operation for any typewriter character or function is identical, so let it be assumed that it is desired to have the typewriter type the letter "A."

Figure 38:
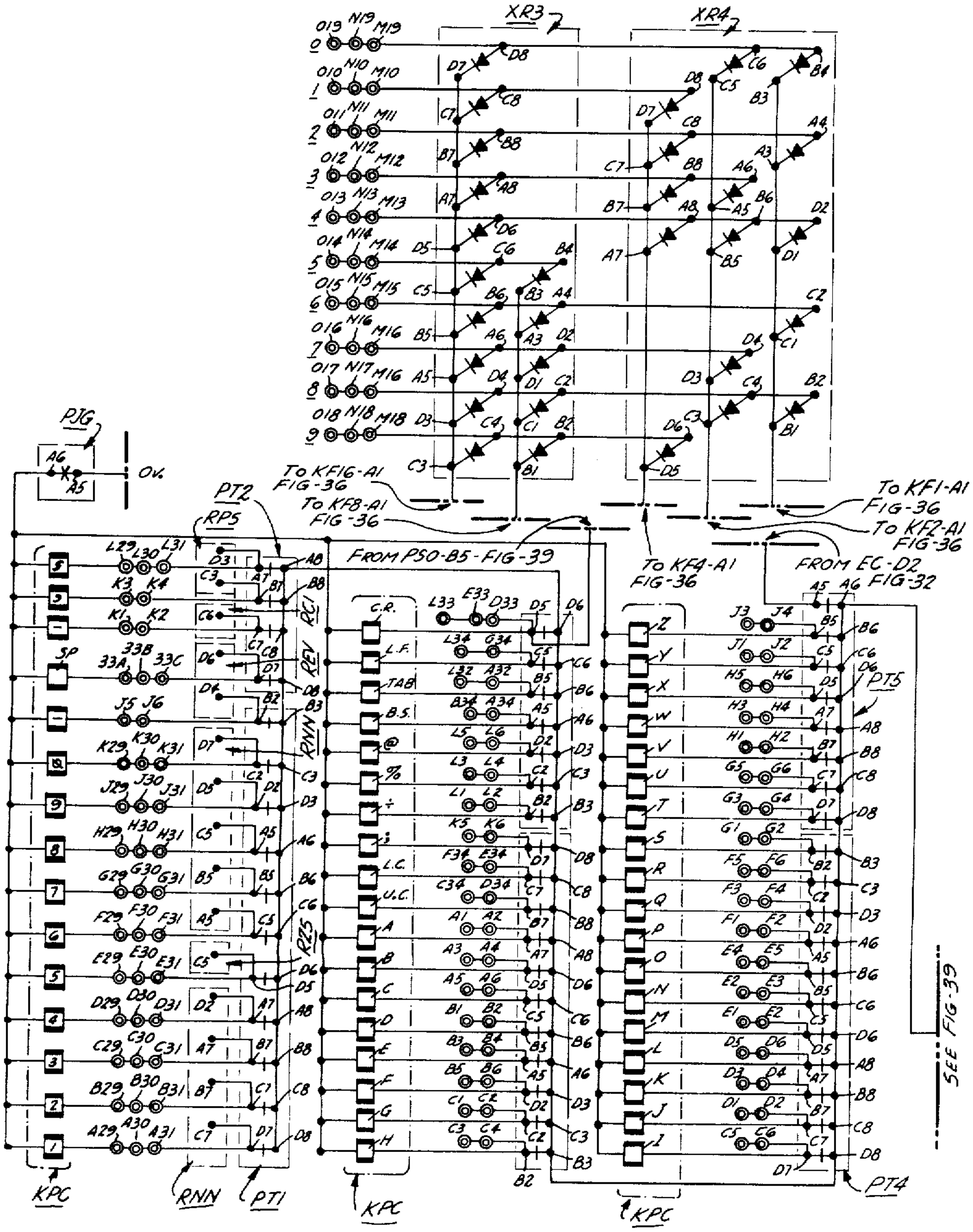
Figure 39:
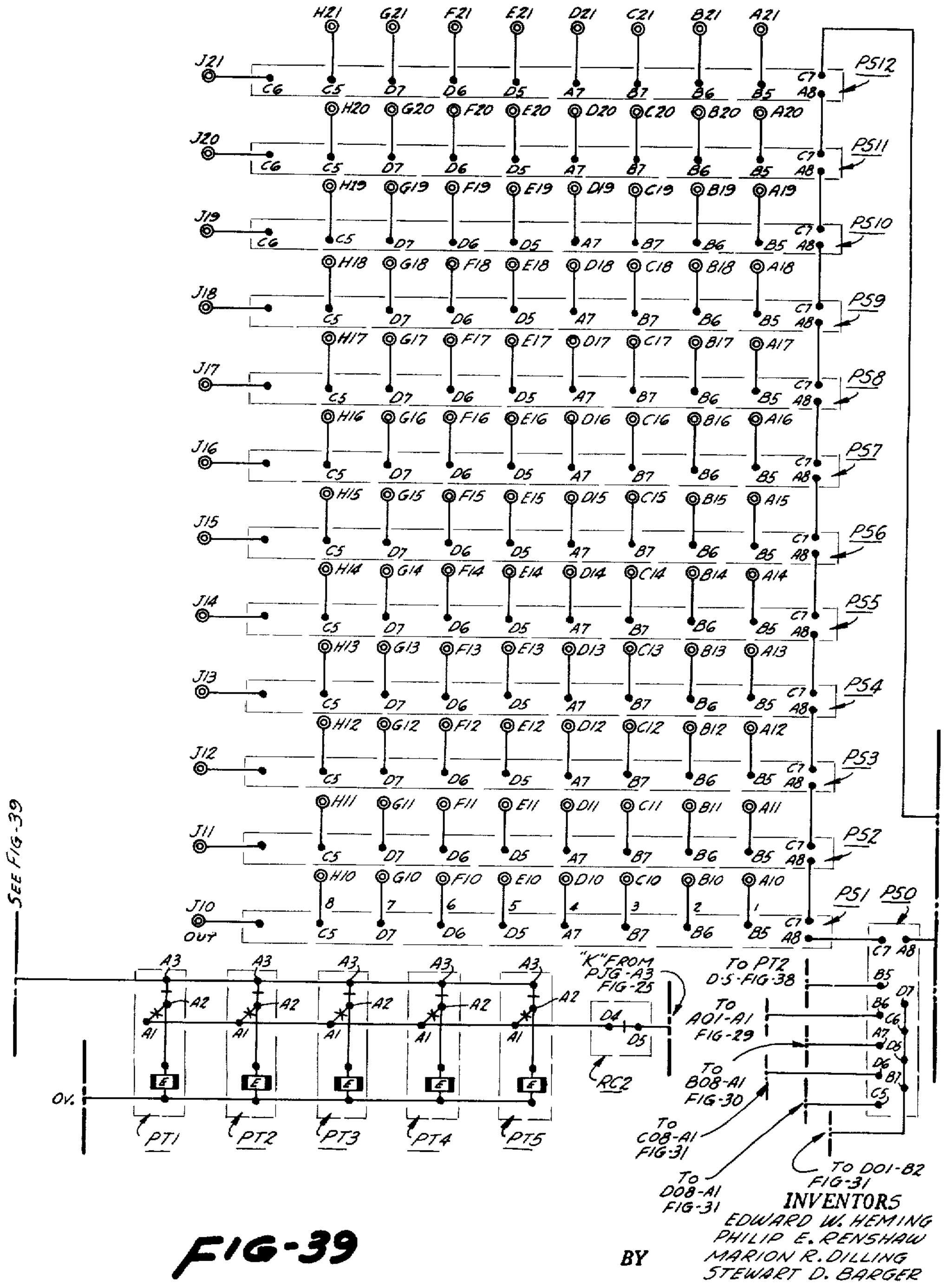

The G pulse appearing on either of the "A" hubs (A1 or A2), FIG. 38, passes through PT3(A7–A8) to FIG. 39 through PT1–PT5(A3–A2) to energize the PT1–PT5(E-coils).

The next G pulse energizes the PJG relay by the following route: (FIG. 40) MS(D1–D2), PSS(D2–D1), PR(B2–B1), PT5(D2–D1), PT5(C2–C1) (FIG. 25), PJG(A1–A2) to PJG(E-coil).

The next J pulse energizes the "A" key puller coil on the typewriter by the following path: (FIG. 25) 40 v., T–W timing switch, PJG(C2–C3), (FIG. 40), PT5(B1–B2), RC2(D2–D1), RZS(B2–B1) (FIG. 39), PSO(A8–C7), PS1(A8) to whichever contact it is connected to; e.g., (B5) to hub A10, jumper wire to hub A1 (FIG. 38), to "A" key puller coil and PJG(A6–A5).

The K, or echo, pulse resulting from a typewriter operation restores the PJG relay by passing through (FIG. 25), RC2(D5–D4) and PJG(A3–A2) to PJG(E-coil). The K pulse also passes through RC2(D5–D4), (FIG. 39), and PT1–PT5(A1–A2) to restore the PT1–PT5 relays to complete the operation.

"K-Const" Command

This command is used whenever it is desired to have the computer type out a number on the typewriter and also have the same number entered into the IOB. As, for example, an invoice may be under preparation wherein the costs of the various items are to be taxed by a constant value, such as a 3% sales tax. It may be desired that the "3" be typed on the typewriter by the computer unit and that the "3" be entered into the IOB as a multiplier.

The G pulse on any one of the "Kc" hubs (B7, B8, B9, B26, B27 or B28), FIG. 40, energizes the K relay in the same manner as does a "K" command previously described. This conditions the IOB to accept numerical information from the typewriter.

The program doesn't stop, as with a K command, because the G pulse cannot get through the diode XR1(B8–B7) to restore the PSS relay.

The next G pulse can then be applied to one of the "3" typewriter character hubs (C29, C30 or C31, FIG. 38) to cause the typewriter to type out the number "3" on the invoice, as described in connection with the typewriter character commands, supra.

The operation of the "3" key enters the digit "3" into the IOB exactly as if the typist had struck this key.

Any number of digits may be typed out on the typewriter and entered into the IOB following a "K-const" command, since the K relay will not be restored until the first time that an L pulse is generated by the emitter in response to a command for a transfer from the IOB to one of the computer unit registers.

"ENCODER" COMMANDS

The "Encoder" commands are used whenever it is desired to program a number into the IOB without also typing the number by the typewriter as was done in response to a "K-const" command last discussed.

If it is desired to enter a "3" into the IOB, a G pulse is applied to any one of the "3" hubs of the encoder (O12, N12 or M12, FIG. 38). The G pulse will pass through diode XR3(A8–A7) and then on FIG. 36 through KF16 (A1–A2) to energize the E-coil of the KF16 relay. Similarly, the G pulse passes through diodes XR4(B8–B7) and XR4(B6–B5) to energize KF4(E-coil) and KF2(E-coil). With KF2, KF4 and KF16 all energized, the next G pulse will transfer the number "3" into the first position of the IOB and will restore the KF2, KF4 and KF16 relays, as previously described.

"T. ONLY" COMMAND

This command is used generally at the end of a program to permit normal operation of the typewriter without any further communication with the computer.

When the "T.ONLY" command is programmed, the PSC relay (FIG. 40) is also energized to move its relay switches to operated position. The G pulse appearing on any one of the "T.ONLY" hubs (U7, U8, U9, U26, U27 or U28) passes through diode XR1(B4–B3) and PR (A1–A2) to energize PR(E-coil).

The next G pulse passes through MS(D1–D2), PSS(D5–D6), PR(B2–B3) and PSC(A3–A2) to energize the PSC(E-coil) to return the PSC relay contacts to normal position. The same G pulse after passing through PR(B2–B3) passes through the (B3–B2) contacts of any stepper relay, PS1–PS12, not yet home in the ninth position thereof to energize the E-coil thereof to advance that relay one position. Successive G pulses will follow the same path to continue to advance the stepper relay until it returns home to its ninth position, at which time its contacts B2–B3 will open.

The next G pulse will pass through PR(C3–C2), PS1–PS12(A2–A1), and PR(A3–A2) to restore the PR relay. The same G pulse also passes through PR(B5–B6), PS12–PS0(C2–C1), PSM(C1–C2) and PSS(A3–A2) to energize PSS(E-coil) to return the PSS relays to normal position.

The hold contacts PSS(D2–D3), FIG. 23, open discontinuing G pulse generation.

The programmer unit is thus shut down and all communication between the typewriter and computer is discontinued until another selector switch is closed to start a new program. The now open contacts PSC(B7–B8) prevent the S pulse resulting from a "Go" button operation from energizing the PSS relay.

CONTROL PANEL AND TYPEWRITER SWITCH OPERATIONS

As has been described above, the control panel has various manually operable switches 17 thereon; namely, the "T-Only," "Clear," "Rev.-Go," and the six program selector switches. The operations resulting from the closing of a program selector switch have already been described, and the operations resulting from the closing of the other control panel switches will now be explained. In addition, the operations produced by the "Go" button 21 and the "null" key on the typewriter will also be described.

"GO" BUTTON

The "Go" button 21, located on the typewriter for operation by the typist, is used to start a program back into operation after it has been stopped by a "program stop" or "K" command. For example, a "K" command may have been given to the computer to enable the typist to enter a number from the typewriter into the IOB. The program will be stopped by this command, for it is unknown in advance as to how long the number will be; i.e., how many digits there are in the number. The typist then types the desired number (from one to ten digits in length) which number is entered into the IOB. The computer program will remain inactive until the typist then notifies the program to recommence by pressing the "Go" button.

As indicated, on FIG. 24, the closing of the "Go" button produces an S pulse which passes through the "Go" switch contacts 3 and 4, and then (FIG. 40) through PSS(A5–A4), PSC(B8–B7), PSS(A1–A2) to energize the PSS relay. The closing of the contacts PSS(D5–D6) again allows G pulses to pass therethrough to the program stepper relays.

REVERSE-GO BUTTON

This button 17 is located on the control panel 16 at the typewriter for operation by the typist, after having typed a number into the IOB. The "Reverse-Go" button accomplishes the same sign reversal as does the "Reverse-Entry" command previously described.

The "Reverse-Go" button operation again causes an S pulse (FIG. 24) which passes through the "Reverse-Go" switch contacts 3 and 4 to energize the PSS relay on FIG. 40 in the same manner as did the "Go" button operation above, to start the program unit back into operation.

In addition, the S pulse passes through the Reverse-Go switch contacts 5 and 6, PSC(B5–B6) (FIG. 32), through REV(A1–A2) to energize the REV relay, as in the previously described Reverse Entry command operations.

Thus, after a number has been typed into the IOB, the typist can start the program back into operation by pressing either the "Go" button or the "Reverse-Go" button.

CLEAR BUTTON

The clear button, located on the control panel 16, can be used by the operator to clear the A, B, C and D registers whenever desired, as, for example, after a program has been completed.

The operation of this function is largely identical to that described in the general discussion of the program unit, to which reference is made.

On pressing the "Clear" button, an S pulse is generated (FIG. 24) and passes through PSS(C1–C2) and MC(C4–C5) (FIG. 41), through clear switch contacts (6–5) (FIG. 40), to energize the U-coil of the PSO relay to unlatch the 10-contacts (C1–C2–C3 and D2–D3) thereof. The S pulse (FIG. 41) also passes through the clear switch contacts (4–3) (FIG. 40), through PSS(B2–B1) and PSS(A1–A2) to energize the PSS relay.

With the PSO relay unlatched and the PSS relay energized, the program unit will operate as before to sequentially energize the contacts B5, B6, B7, A7, D5, D6, D7, C5 and C6 of the PSO relay (FIG. 39) with G pulses.

The G pulse on contact B5 (FIG. 38) goes through PT2(D5–D6) and (FIG. 39), through PT1–PT5(A1–A2) to energize the PT1–PT5 relays. The identical sequence of operations will follow as were discussed in connection with the "Typewriter character or function" operation, to cause the carriage return operating coil of the typewriter to be energized so that the typewriter carriage is returned to the left, in a position for the contents of the various computer registers to be typed out.

The next program pulse appearing on PSO(B6) will, on FIG. 29, be applied in the same manner as an "AO" command to energize the A register output relays AO1, AO2, AO4 and AO8.

The next program pulse appearing on PSO(B7) will, on FIG. 29, be applied in the same manner as a "TOT" command, to energize the AR relay.

The next G pulse (FIG. 26) will pass through the contacts AR(B3–B2) to energize the ED relay and cause an emitter cycle.

With the A register output relays, the AR relay and the ED relay energized, the computer performs a read-out function as described in detail previously. The reading out of the A register also clears the contents of the register so that the counters stand in zero position.

When the read-out operation of the A register has completed, the next two command pulses appearing at PSO terminals A7 and D5 will energize the B register output relays and the BR relay, and a read-out and clearing operation of the B register will ensue, again as previously described.

When this is completed, the next two command pulses will cause the C register to be read out and cleared, and the last two command pulses will read out and clear the D register.

The program unit then finishes its cycle of operation so that the PSS, PSC and PSO relays are all back in their original positions.

Thus, by simply pressing the "Clear" button, the contents of each register will be typed out and all of the registers will return to zero-indicating position.

T-Only Switch on Typewriter

The T-only switch 17 on the control panel 16 can be actuated at any time by the typist.

If the programmer unit is in the middle of a program, the remainder of the program can be cancelled out by pressing the T-only switch. The S pulse generated by this will pass, on FIG. 40, through the T-only contacts (5–6), diode XR1(B4–B3) and PR(A1–A2) to energize PR(E-coil). Successive G pulses will then return the particular program stepper relay PS1–PS12 back home to its ninth position as described above in connection with the "T-only" command hubs.

If the programmer unit is not in program, the S pulse generated by closing the T-only switch (FIG. 24) will pass (FIG. 40) through the T-only switch contacts (5–6) to energize the PR relay as before, and will also pass through the T-only switch contacts (3–4), PSS(B2–B1) and PSS(A1–A2) to energize the PSS(E-coil) to start the programmer unit into operation and to start the G-pulse generator into operation.

None of the stepper relays PS1–PS12 is in operation, so the first G pulse passes through PR(C3–C2), PS12–PS1(A2–A1), PR(A3–A2) to energize PR(E-coil) and through PR(B5–B6), PS12–PS0(C2–C1), PSM(C1–C2), and PSS(A3–A2) to energize PSS(E-coil). Thus, the first G pulse restores the PR and PSS relays and shuts down the G-pulse generator.

In some instances it may be that a plugboard has been pulled while some computer function is still in operation and that this then prevents the computer from completing this function. In such a case, the T-only switch can also be used to allow the computer to finish its cycle of operation.

As above, an S pulse is generated by closing the T-only switch, and this S pulse passes through the T-only switch contacts (5–6), FIG. 40, and then passes through MC(D5–D4) and XR1(D4–D3) to D3 on REV (FIG. 41) through IAI(A1–A2) to energize the IAI relay.

The next G pulse passes through IAI(B3–B2), FIG. 26, to energize the ED relay to start an emitter cycle. Relay ED holds the G-pulse generator in operation by the hold contacts ED(B2–B3), FIG. 23, and the emitter cycle permits the computer to finish its previously unfinished function.

If a multiplication function had been interrupted, the S pulse above will pass through the contacts MC(D5–D6), FIG. 41, and on FIG. 37 through ML(A1–A2) to energize ML(E-coil) to enable the multiplication function to finish.

Thus, the T-only switch on the control panel 16 can be used to complete unfinished computer functions, cancel out the remainder of a program and disconnect the typewriter from the computer so that the typewriter can be used in a normal manner.

The Null Key

The "null" key is the particular typewriter key having a binary code 111111 and is used in case the typist makes an error in typing a number into the IOB.

If an error is made, the operator simply strikes the null key to energize the KF1, KF2, KF4, KF8, KF16 and KF32 relays, FIG. 36. The next G pulse then passes, FIG. 36, through K(A6–A5), KF32(C5–C6), KF16(C5–C6), KF8(C5–C6), KF4(C5–6), KF2(C5–C6), KF1(C5–C6) to MC(B2), FIG. 27, and then through IR1–IR6(A1–A2) to energize the IR1–IR6 relays.

The next G pulse clears the IOB completely and restores the IR1–IR6 relays as previously described. The typist then backspaces to the beginning of the number and types the correct number into the IOB.

USE OF PROGRAM UNIT IN AN INVOICE OPERATION

Now that the functions of the computer unit, the operations of the program unit, and the manner in which the program unit can control the functions of the computer unit have all been described, it is possible to examine into the manner whereby a specific program can be set up to perform a specific job.

To illustrate the use of the program unit, let it be assumed that the typist wishes to prepare a number of similar invoices, in which the body of one of the invoices, exclusive of the usual heading, is as follows:

| Quantity | Price | Description | Extension | Total |
|---|---|---|---|---|
| 6 | 1.20 | 6310 ABC relays | 7.20 | |
| 20 | 29.80/t | 6750 UHF coils | 59.60 | |
| 2 | .33 | UDX C 2600 | .66 | |
| 14 | 3.75 | 6F6 Tubes | 52.50 | |
| 1 | 2.40 | 115 NO5 delay | 2.40 | 122.36 |
| | | TAX 3.% | 3.67 | 126.03 |

The typist will first set the typewriter margin stops so that when the carriage is returned to the right the invoice will be in position for the typist to type the number of items in the "Quantity" column. The tab stops are set so that the carriage can be tabbed consecutively to the "Price," "Description," "Extension" and "Total" columns.

The typist then inserts a blank invoice into the typewriter and types out the usual heading in a normal manner. When this is complete, the typist then starts the program unit into operation by pressing one of the program selector switches 17, as, for example, the 1 Sel. Sw. The program unit will then proceed to carry out a program, in accordance with the wiring of the plugboard 22 to prepare the above invoice.

The program is prepared, and the plugboard is wired, in accordance with the following programming form shown in Table No. 10. The first column indicates the various inputs and outputs of a program stepper relay (PS1–PS12), the second column indicates the functions of the computer or typewriter which it is desired to control at any position of one particular stepper relay, and column three indicates the jumper connections 24 between hubs 23 on the plugboard which must be made to accomplish the results desired at each step. Column 4 indicates the Fig. number on which the pulse on the last indicated hub of each step appears.

the typewriter to move the carriage to the "Price" column.

(3) The quantity is to be multiplied by the price, so the computer is instructed by the command "MULT" that the number of articles in the IOB is the multiplicand.

*Table No. 10*

PROGRAMING FORM

| (1) | (2) | (3) | (4) | (1) | (2) | (3) | (4) |
|---|---|---|---|---|---|---|---|
| PS1 | | | | PS2 | | | |
| Ind | 1 | R30–R34 | 41 | Ind | 1 | R31–S30 | 40 |
| In | 1 Sel. Sw | L10–K10 | 40 | In | PS1 | J10–K11 | 40 |
| 1 | K | A10–A7 | 40 | 1 | Ao | A11–N1, N2–H7 | 29 |
| 2 | Tab | B10–A32 | 38 | 2 | B1 | B11–D7 | 30 |
| 3 | MULT | C10–M1, M2–P7 | 37 | 3 | + | C11–N7 | 41 |
| 4 | K | D10–A8 | 40 | 4 | Ao | D11–N3 | 29 |
| 5 | Tab | E10–B32 | 38 | 5 | TOT | E11–R7 | 29 |
| 6 | MULT | F10–M3 | 37 | 6 | STOP | F11–T8 | 40 |
| 7 | STOP | G10–T7 | 40 | 7 | CR | G11–D33 | 38 |
| 8 | Tab | H10–C32 | 38 | 8 | | | |
| Out | PS2 | J10–K11 | 40 | Out | PS1 | J11–L11 | 41 |

| (1) | (2) | (3) | (4) | (1) | (2) | (3) | (4) |
|---|---|---|---|---|---|---|---|
| PS3 | | | | PS4 | | | |
| Ind | 2 | R32–S34 | 41 | Ind | 2 | R33–S32 | 40 |
| In | 2 Sel. Sw | L12–K12 | 40 | In | PS3 | J12–K13 | 40 |
| 1 | Tab | A12–D32 | 38 | 1 | x | A13–H5 | 38 |
| 2 | Bo | B12–J7 | 30 | 2 | Space | B13–A33 | 38 |
| 3 | S. TOT | C12–Q7 | 41 | 3 | K-const | C13–B7 | 40 |
| 4 | C.R | D12–D34 | 38 | 4 | 3 | D13–C29 | 38 |
| 5 | Tab | E12–E32 | 38 | 5 | Period | E13–K1 | 38 |
| 6 | Tab | F12–F32 | 38 | 6 | % | F13–L3 | 38 |
| 7 | T | G12–G3 | 38 | 7 | MULT | G13–M4 | 37 |
| 8 | A | H12–A1 | 38 | 8 | Bo | H13–J8 | 30 |
| Out | PS3 | J12–K13 | 40 | Out | PS4 | J13–K14 | 40 |

| (1) | (2) | (3) | (4) | (1) | (2) | (3) | (4) |
|---|---|---|---|---|---|---|---|
| PS5 | | | | PS6 | | | |
| Ind | 2 | T30–S33 | 40 | Ind | 2 | T31–U30 | 40 |
| In | PS4 | J13–K14 | 40 | In | PS5 | J14–K15 | 40 |
| 1 | SR2 | A14–W7 | 37 | 1 | Tab | A15–H32 | 38 |
| 2 | MULT | B14–M5 | 37 | 2 | Bo | B15–J9 | 30 |
| 3 | Tab | C14–G32 | 38 | 3 | TOT | C15–R8 | 29 |
| 4 | Ao | D14–N4 | 29 | 4 | T-only | D15–U7 | 40 |
| 5 | BI | E14–D8 | 30 | 5 | | | |
| 6 | + | F14–N8 | 41 | 6 | | | |
| 7 | Ao | G14–N5 | 29 | 7 | | | |
| 8 | TOT | H14–R7 | 29 | 8 | | | |
| Out | PS5 | J14–K15 | 40 | Out | | | |

PS1

The PS1 relay is arbitrarily selected to start the program when the 1 Sel. Sw. is closed by the typist.

(Ind) It is desired to light the "1" indicator light to indicate that the typewriter is in a sub-program wherein the items of the invoice are to be listed and the price extended. To light this indicator light, a jumper connection is made between plugboard hubs R30 and R34. FIG. 20 illustrates a plugboard wired for the program stepper relay 1 in the present program. For sake of clarity, the wiring for the relays PS2–PS6 have not been shown in FIG. 20, but such connections must, of course, be made to carry out the following program.

(In) The program stepper relay PS1 is to be initiated into operation by the S pulse from the closing of the 1 Sel. Sw. so a jumper connection is made between plugboard hubs L10 to K10.

(1) The first step desired is for the computer IOB to be placed in communication with the typewriter to receive the number of items typed in column 1 of the invoice, and thus a "K" command is given. The G pulse through the first step of the PS1 relay is passed through the jumper wire from hubs A10 to A7 to energize the K relay and stop the program. The typist now types the number of articles (6) in the first column of the invoice, and this number enters the IOB.

After typing this number (6), the typist then presses the "Go" button to restart the program.

(2) It is now desired to move the typewriter carriage to the "Price" column, so the next command from the program unit is "Tab," which energizes the tab key of The number is then transferred by the computer from the IOB to the multiplier relays M1–M6. A jumper wire is connected from hub C10 to hub M1 of one of the plugboard busses and a second jumper wire is connected from hub M2 of the bus to hub P7 so that the G pulse will go to the multiplier section of the computer.

(4) The "K" command is again given so that the price of the articles can be entered on the invoice. This will again stop the operation of the program unit so that this information enters into the IOB. After the typist finishes typing the price, the "Go" button is again pressed to restart the program into operation.

(5) The "Tab" command is again given to move the typewriter carriage to the "Description" column. The typist can immediately type the description of the article in the "Description" column while the computer unit is performing the multiplication process.

(6) The second "MULT" command is given to start the multiplication function.

(7) The multiplication function will probably be completed before the typist finishes typing the description, so a "Stop" command is given, to stop the operation of the program unit. After finishing the description, the typist will again hit the "Go" button to resume the program operation.

(8) The command "Tab" is again given to move the typewriter carriage to the "Extension" column.

(Out) The sub-program is not yet complete, so the pulse on the "Out" terminal is used to start the PS2 relay into operation, by means of the jumper wire between hubs J10 and K11.

PS2

(Ind) Since we are in the same sub-program, we wish to keep the "1" indicator light lit, which is accomplished by a jumper wire from hub R31 to S30.

(In) The PS2 relay is started into operation by the G pulse from the PS1 relay through the jumper wire from hubs J10 to K11.

(1) The product of the quantity and price has been put into the A register as a result of the multiplication operation, and it is now desired to read this total out in the "Extension" column of the invoice. However, this product must first be sent to the B register where all of the costs of the various items can be accumulated. The first step is to command "A*o*" which will transfer the A register contents to the IOB, while retaining the A register contents therein.

(2) The command "BI" is given to direct the computer to transfer the IOB contents to the B register.

(3) The "+" command is given to cause the transfer of the IOB contents in plus form to the B register.

(4) The command "A*o*" again will transfer the contents of the A register to the IOB.

(5) The "TOT" command then reads the IOB contents out to the typewriter to type "7.20" in the extension column. This command will also restore the A register to zero-indicating position.

(6) The "Stop" command is then given to stop the program while the operator determines whether any more items are to be included in the invoice. If so, as in the sample invoice above, the operator presses the "Go" button to resume program operation.

(7) The next command, "CR," is used to energize the carriage return key of the typewriter to return the carriage to the right and to move the carriage to the next line.

(8) The next step of the PS1 relay is not used, and the PS1 relay will advance to the "out" position thereof.

(9) Since it is desired to repeat the above sub-program, the "out" signal is used to energize the PS1 relay by a jumper wire between hubs J11 and L11, and the sub-program starts again.

The program will again stop with the carriage in the "Quantity" column so that the typist can list the next item of the invoice.

It will be noted the price of the items in the second line of the sample invoice is expressed as 29.80/*t*, or, that is, 29.80 for ten units. The product of the quantity and the price must be shifted to the right one place to correct the extension, and the typing of the "*t*" will automatically provide this correction, since it will operate the SR1 relay, as previously described.

The operator continues to type out the quantity, price and description of each item, as above, until all of the items have been listed and extended. In order to compute the sales tax, a second sub-program is started by the typist pressing the 2 Sel. Sw. instead of the "Go" button after the extended cost of a line has been typed out on the typewriter from the computer. The pressing of the 2 Sel. Sw. cancels out the rest of the first sub-program (i.e., the carriage return) and starts the second sub-program.

PS3

The third program stepper relay PS3 is used to start the second program (Ind) The second indicator light should now be lit instead of the first indicator light, so a jumper connection is made from hubs R32 to S34.

(In) The PS2 relay is initiated into operation by the S pulse from the closing of the 2 Sel. Sw. by means of the jumper wire between hubs L12–K12.

(1) The first command, "Tab" is given to move the typewriter carriage from the "Extension" column to the "Total" column, so that the total cost of the items can be printed out on the invoice.

(2) The accumulated cost of the items has been stored in the B register so the next command is B*o*, to transfer the B register contents to the IOB.

(3) The "S.TOT" command reads the IOB out to the typewriter where the accumulated costs are typed out as "122.36." The "S.TOT" command does not clear the B register and the above number stays therein.

(4) The end of the line has been reached, and the "CR" command returns the typewriter carriage to the right, moving it to the next line.

(5 and 6) The two "Tab" commands move the carriage two tab stops into the description column.

(7) The next command "T" directs the computer, by means of a jumper from hub G12 to hub G3, to cause the typewriter to type out the letter "T" on the invoice.

(8) The next command "A" is used to type out the letter "A" on the invoice.

(Out) The sub-program is still in operation, and the G pulse is directed by a jumper wire between hubs J12 and K13 to energize the U-coil of the PS4 relay.

PS4

(Ind) Since we are still in the second sub-program, the "2" indicator light is lit by a jumper wire between hubs R33–S32.

(In) The PS4 relay is set into operation by the G pulse on the out hub of the PS3 relay.

(1) The next command "X" is used to finish typing the word "TAX" on the invoice.

(2) The "Space" command operates the space bar of the typewriter.

(3) Since the amount of the tax is to be used as a multiplier of the total amount of the invoice stored in the B register, it is desired to type the amount of the tax on the invoice and to enter this amount into the IOB. The "K-const" command energizes the K relay to place the typewriter in communication with the IOB, but does not stop the program as would a "K" command.

(4) The "3" command is used to type the number "3" on the invoice. This action of the typewriter causes the number "3" to be entered into the IOB.

(5 and 6) The "Period" command is given to cause the typewriter to print out a period after the "3," and a "%" sign is then typed after the period. As has been brought out previously, these indicia will not be entered into the IOB even though the K relays contacts are still closed, since only numerical indicia can enter the IOB.

(7) The "MULT" signal instructs the computer that the IOB contents are to be transferred into the multiplier relays M1–M6.

(8) The "B*o*" command transfers the accumulated contents of the B register into the IOB.

(Out) The sub-program is to continue so the G pulse on the out hub is transferred by a jumper wire between hubs J13 and K14 to unlatch the PS5 relay.

PS5

(Ind) The same sub-program continues so the "2" indicator light is lit by jumper wire from hub T30 to hub S33.

(In) The initiating pulse comes from the last hub of the PS4 relay.

(1) Since the number stored in the multiplier relays M1–M6 is in percent form, the product should be shifted to the right two places to place the decimal between the second and third positions of the A register, and consequently a "SR2" command is given.

(2) The "MULT" signal starts the multiplication of 3% times 122.36 which, when shifted right two places, will give the product 3.67 in the A register. The first L pulse from the emitter will restore the K relay to its normal position to disconnect the typewriter from the IOB.

(3) The "Tab" command moves the typewriter carriage over to the "Extension" column, wherein it is desired to type out the tax as calculated above.

(4, 5 and 6) However, before the tax is read out, it is first necessary to add the tax to the accumulated total in the B register, so the consecutive commands "A*o*," "BI," and "+" are given to perform the transfer of the A register contents to the B register in plus form.

(7) The "A*o*" command again transfers the tax in the A register to the IOB.

(8) The "TOT" command then causes the tax in the IOB to be read out to the typewriter in the "Extension" column of the invoice. The "TOT" command also causes the A register to clear.

(Out) The sub-program is to continue in operation so the out hub J14 of the PS5 relay is wired to the in hub K15 of the PS6 relay.

PS6

(Ind) The second sub-program continues, so the "2" indicator light remains lit, by a jumper between hubs T31 and U30.

(In) The "in" signal comes from the out hub of the PS5 relay.

(1) The first command "Tab" causes the typewriter to move over to the "Total" column in preparation for the typing of the total cost of the items with the tax included.

(2) The "B*o*" command transfers the B register contents to the IOB.

(3) The "TOT" command causes a read-out of the total in the IOB and clears the B register.

(4) After the last read-out operation, the "T-only" command returns the typewriter to full manual operation, and allows the typist to prepare the next invoice.

To summarize the operations which the typist must perform in the above operation, the typist first inserts a blank invoice into the typewriter and types the usual heading thereon. To list the items, the typist presses the "1" selector switch, and types the number of items. The operator then presses the "Go" button and types the price of an item. The "Go" button is again pressed, and the typist types the description of the item. Again the "Go" button is pressed and the product of the number of items and the cost per item is automatically typed out. If there is another item to list, the typist presses the "Go" button and repeats the above operation. If there are no more items, the typist merely presses the "2" selector switch. The tax is then computed automatically and the total cost is automatically printed out.

If desired, the second program, which is completely automatic, could be expanded to provide an automatic computation of a discount before the tax is computed, with the discount amount being typed out on the invoice by the computer.

The number and variety of programs which can be performed will be dependent upon the accounting systems of the user, and each program can be prepared and set up as in the above example. The fact that the plugboard is removable enables a number of plugboards to be wired for different programs with a desired plugboard being inserted into the computer for use with the program unit.

MISCELLANEOUS FUNCTIONS OF THE PROGRAM AND COMPUTER UNITS

In addition to the various operations previously described, the program and computer units have been designed to perform additional functions which are now described.

Program Start Memory

The program start memory function is built into the program unit to automatically "memorize" a "Go" button command given by the typist during a multiplication function in the computer.

In order that this may be made clearer, let it be assumed that the computer is being used in a billing operation wherein the following type bill is being made:

| Items | Price | Description | Extension |
|---|---|---|---|
| 12 | 14.50 | Rugs | 174.00 |

In normal operation, as far as the typist is concerned, the number of items is first typed in the "Items" column, the number 12 being entered automatically into IOB as the multiplier. The typist then presses the "Go" button, and the typewriter tabs to the "Price" column. The typist then types the price (this being entered into the IOB as the multiplicand) and presses the "Go" button to start the multiplication and to tab the typewriter to the "Description" column. The typist then types out the description of the items and presses the "Go" button to tab the typewriter over to the "Extension" column wherein the cost is typed out from the computer.

In the above operation, the description can be typed during the time that the multiplication function is occurring in the computer, since the description is not to be entered into the IOB in any manner. The length of time generally required for the operator to type the description is longer than the time required for the computer to complete the multiplication function. Because of this, a "program stop" command is inserted into the program after the typewriter has been tabbed to the "Description" column. Thus, in the normal course of events, the typewriter will be tabbed to the description column and the computer will go through a multiplication function while the typist types out the description. The multiplication function will end and the program will stop because of the "program stop" command while the typist continues typing the description. When the typist finally completes the description, the "Go" button is pressed to start the program again, which will tab the typewriter over to the "Cost" column and the cost will be typed out from the computer.

If the multiplication function is lengthy, due to the size of the numbers and/or if the description is quite short such that the description is completed before the multiplication function is ended, the S pulse from the "Go" button will not affect the PSS relay because the PSS contacts A5–A4 (FIG. 40) are open. As soon as the multiplication function is over, the "program stop" command will energize the PSS relay, as above described, and will stop the operation of the program unit. Another "Go" button operation is required to restart the program, but since the typist has already pressed the "Go" button following the typing of the description, without any effect, he may assume that the computer is not functioning properly and call for a repairman.

It is to avoid this semblance of malfunction that the "program start memory" has been incorporated into the program unit.

After the typist has finished typing the description, assuming the multiplication function is still in operation, the S pulse from the "Go" button operation will pass, on FIG. 40, through $\underline{\text{PSS(A5–A6)}}$, $\underline{\text{MS(A6–A5)}}$ (since the multiplication process is in operation), PSM(A1–A2) to energize the PSM relay.

Contacts $\underline{\text{PSM(D7–D8)}}$ allow the PSM pilot light at the typewriter to light, indicating to the typist that the computer is functioning properly.

When the multiplication function is over, the program unit will then issue the "program stop" command, a G pulse, which appears on one of the stop hubs (T7, T8, T9, T26, T27 or T28). Ordinarily, this would energize the PSS relay to shut down the program, but now this pulse is prevented from reaching the PSS relay because of the now open contacts $\underline{\text{PSM(C1–C2)}}$. Since the PSS relay is not energized by the stop command, the program unit remains in operation.

The next G pulse, applied to advance whichever stepper relay PS1–PS12 is now in operation, also passes through $\underline{\text{PSM(A3–A2)}}$ to energize the PSM (E-coil) to restore the PSM to normal position.

The MS relay contacts (A5–A6) will prevent any S pulse from energizing the PSM relay unless a multiplication function is in operation.

Sign Detection

This feature of the program unit is very useful in programs wherein different sub-programs should be followed, depending upon whether a given number is positive or negative. An example of such a program is that wherein a computation of an employee's F.I.C.A. withholding statement is made in payroll determinations. In such computations it is necessary to compare the year-to-date earnings with the F.I.C.A. upper limit of $4200. As long as the F.I.C.A. upper limit is greater than the year-to-date earnings, an F.I.C.A. deduction must be made from the earnings. However, if the F.I.C.A. upper limit is less than the year-to-date earnings, then no deduction should be made. In other words, if the difference is positive, then a program should be followed which will deduct the F.I.C.A. deduction, but if the difference is negative, then a program should be followed which does not perform such a deduction.

The A, B, C or D registers are designed so that negative numbers are stored therein in nine-complementary form. For example, "−627" would be represented by 9999999372 in one of the registers. The significance of this is that for any numbers of 7 digits or less, the eighth and ninth position counters of the register will stand at 9 whenever the number is negative, and will be other than 9 when the number in the register is positive. Thus, the eighth and ninth position counters indicate whether the number in the register is negative or positive simply by standing at nine or not.

As indicated on FIG. 29, the sign detection hubs U10, U11 and U12 are connected to the ninth position A register counter contacts A2, A3 and A1, respectively. The switches (A1–A2) and (A2–A3) are operated by the 9-pushbar of the A8 relay, and, as indicated, when the relay stands at other than 8, the contacts A3–A2 are closed and A2–A1 are open. The switch contacts will be reversed when the counter stands at 9.

By way of example, the hub U11 can be jumper-wired to the input hub K11 of the PS2 relay (FIG. 40) and the hub U12 can be jumper-wired to the input hub K12 of the PS3 relay. The hub U10 could be jumper-wired to the output hub J10 of the PS1 relay (FIG. 39). When the PS1 relay advances such that the G pulse appears at hub J10 thereof, the G pulse will then pass through A8(A3–A2) to energize the U-coil of the PS2 relay if the number in the A register is positive, or will pass through A8(A2–A1) to energize the U-coil of the PS3 relay if the number in the A register is negative. Thereafter, the program will be determined by whichever of PS2 or PS3 has been energized.

Filters

Figure 28:
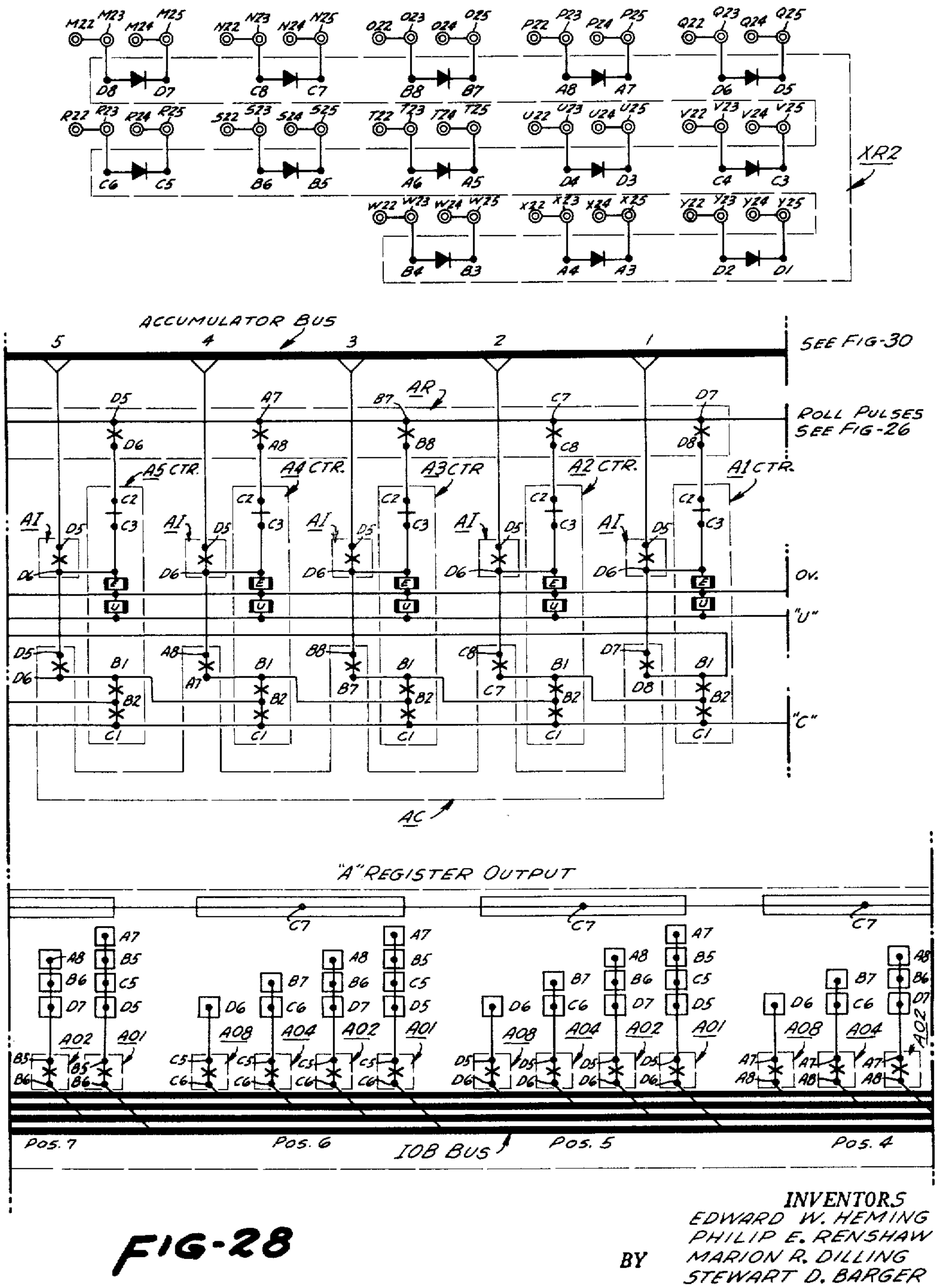

This section of the computer, which includes the block of plugboard hubs bounded by M–V–22–26, is shown connected to the various diodes of diode panel XR1 on FIG. 28.

This section of the computer is used when it is desired to decrease the number of program steps necessary in any given program. As has been previouly described in connection with a transfer from the IOB to the A register, two separate G pulses are used to energize the AI relay and the IAI relay. Actually, these relays could be energized at the same time, but this would necessitate wiring the relays together, and it would be impossible thereafter to energize one relay without energizing the other.

However, this can be done by utilizing the above filters. For example, hub M23 could be jumper-wired to the "AI" hub C7 (FIG. 29), and the hub M24 could be jumper-wired to the "+" hub (FIG. 41). A G pulse on hub M22 would then go to both the "AI" and "+" hubs simultaneously to energize the AI and IAI relays by the same G pulse. At any other time that it is desired to energize the IAI relay, without energizing the AI relay, a G pulse could be applied to hub M24. The diode XR1(D7–D8) prevents the G pulse from energizing the AI relay.

Thus, by the use of the diode XR1(D7–D8) the AI and IAI relays can be energized simultaneously, or the IAI relay can be energized by itself. The other diodes on the XRI diode panel can be used for similar purposes, as desired.

It is to be understood that the form of the invention hrein shown and described is to be taken as a preferred embodiment of the same, and that various changes may be made in the shape, size and arrangement of parts without departing from the spirit of the invention or the scope of the attached claims.

Having thus described our invention, what we claim and desire to secure by Letters Patent is:

1. Programming apparatus of the character described, comprising: a typewriter; a computer unit having a plurality of accumulating registers; a pulse generator means for generating a series of electrical pulses; a plurality of pulse energized transfer means in said computer unit operable when energized by said pulse generator means to utilize said pulses to transfer numerical information from said typewriter to any desired register, from one desired register to another, or from any desired register back to said typewriter, there being a separate transfer means for transferring numerical information from said typewriter to each one of said registers, a separate transfer means for transferring numerical information from one of said registers to each one of the other registers, and a separate transfer means for transferring numerical information from each one of said registers to said typewriter; a plurality of program devices each having a switch member, a plurality of output terminals and a pulse operated means for moving said switch member into successive engagement with all of said output terminals; a plurality of electrical connections from selected output terminals of said program devices to selected of said transfer means whereby the switch members of each program device may be successively connected to different transfer means in predetermined sequences; a plurality of manually operable switches; means responsive to the operation of any one of said manually operable switches for connecting said pulse generator to the pulse operated means and switch member of a desired program device, each of said manually operable switches having a different program device associated therewith; means responsive to the engagement of the switch member with a selected output terminal of said desired program device for connecting said pulse generator to the pulse operated means and switch member of another desired program device; and means for temporarily disconnecting said pulse generator from the pulse operated means and switch member of the desired program devices during the operation of any of said transfer means.

2. Programming apparatus of the character described, comprising: a typewriter; a computer unit having a plurality of accumulating registers; a pulse generator means for generating a series of electrical pulses; a plurality of pulse energized transfer means in said computer unit operable when energized by said pulse generator means to utilize said pulses to transfer numerical information from said typewriter to any desired register, from one desired register to another, or from any desired register back to said typewriter, there being a separate transfer means for transferring numerical information from said typewriter to each one of said registers, a separate transfer means for transferring numerical information from one of said registers to each one of the other registers, and a separate transfer means for transferring numerical information from each one of said registers to said typewriter; a plurality of program devices each having a switch member, a plurality of output terminals and a pulse operated means for moving said switch member into successive engagement with all of said output terminals; a plurality of electrical connections from selected output terminals of said program devices to selected of said transfer means whereby the switch members of each program device may be successively connected to different transfer means in predetermined sequences; a plurality of manually operable switches; and means responsive to the operation of any one of said manually operable switches for connecting said pulse generator to the pulse operated means and switch member of a desired program device, each of said manually operable switches having a different program device associated therewith.

3. Programming apparatus of the character described, comprising: a typewriter; a computer unit having a plurality of accumulating registers; a pulse generator means for generating a series of electrical pulses; a plurality of pulse energized transfer means in said computer unit operable when energized by said pulse generator means to utilize said pulses to transfer numerical information from said typewriter to any desired register, from one desired register to another, or from any desired register back to said typewriter, there being a separate transfer means for transferring numerical information from said typewriter to each one of said registers, a separate transfer means for transferring numerical information from one of said registers to each one of the other registers, and a separate transfer means for transferring numerical information from each one of said registers to said typewriter; a plurality of program devices each having a switch member, a plurality of output terminals and a pulse operated means for moving said switch member into successive engagement with all of said output terminals; a plurality of electrical connections from selected output terminals of said program devices to selected of said transfer means whereby the switch members of each program device may be successively connected to different transfer means in predetermined sequences; a plurality of manually operable switches; means responsive to the operation of any one of said manually operable switches for starting said pulse generator and for connecting said pulse generator to the pulse operated means and switch member of a desired program device, each of said manually operable switches having a different program device associated therewith; and means for temporarily disconnecting said pulse generator from the pulse operated means and switch member of the desired program devices during the operation of any of said transfer means.

4. Programming apparatus of the character described, comprising: a typewriter; a computer unit having a plurality of accumulating registers; a pulse generator means for generating a series of electrical pulses; a plurality of pulse energized transfer means in said computer unit operable when energized by said pulse generator means to utilize said pulses to transfer numerical information from said typewriter to any desired register, from one desired register to another, or from any desired register back to said typewriter, there being a separate transfer means for transferring numerical information from said typewriter to each one of said registers, a separate transfer means for transferring numerical information from one of said registers to each one of the other registers, and a separate transfer means for transferring numerical information from each one of said registers to said typewriter; a plurality of program devices each having a switch member, a plurality of output terminals and a pulse operated means for moving said switch member into successive engagement with all of said output terminals; a plurality of electrical connections from selected output terminals of said program devices to selected of said transfer means whereby the switch members of each program device may be successively connected to different transfer means in predetermined sequences; means for connecting said pulse generator to the pulse operated means and switch member of a desired program device; and means responsive to the engagement of the switch member with a selected output terminal of said desired program device for connecting said pulse generator to the pulse operated means and switch member of another desired program device.

5. Programming apparatus of the character described, comprising: a typewriter; a computer unit having a plurality of accumulating registers; a pulse generator means for generating a series of electrical pulses; a plurality of pulse energized transfer means in said computer unit operable when energized by said pulse generating means to utilize said pulses to transfer numerical information from said typewriter to any desired register, from one desired register to another, or from any desired register back to said typewriter, there being a separate transfer means for transferring numerical information from said typewriter to each one of said registers, a separate transfer means for transferring numerical information from one of said registers to each one of the other registers, and a separate transfer means for transferring numerical information from each one of said registers to said typewriter; a plurality of program devices each having a switch member, a plurality of output terminals and a pulse operated means for moving said switch member into successive engagement with all of said output terminals; a plurality of electrical connections from selected output terminals of said program devices to selected of said transfer means whereby the switch members of each program device may be successively connected to different transfer means in predetermined sequences; means for connecting said pulse generator to the pulse operated means and switch member of a desired program device; means responsive to the engagement of the switch member with a selected output terminal of said desired program device for connecting said pulse generator to the pulse operated means and switch member of another desired program device; and means for temporarily disconnecting said pulse generator from the pulse operated means and switch member of the desired program devices during the operation of any of said transfer means.

6. Programming apparatus of the character described, comprising: a typewriter; a computer unit having a plurality of accumulating registers; a pulse generator means for generating a series of electrical pulses; a plurality of electrical pulse energized transfer means in said computer unit operable when energized by said pulse generator means to utilize said pulses to transfer numerical information from said typewriter to any desired register, from one desired register to another, or from any desired register back to said typewriter, there being a separate transfer means for transferring numerical information from said typewriter to each one of said registers, a sepaarte transfer means for transferring numerical information from one of said registers to each one of the other registers, and a separate transfer means for transferring numerical information from each one of said registers to said typewriter; a plugboard; a first group of hubs on said plugboard, each hub corresponding to and separately connected to each of said plurality of transfer means whereby any of said transfer means may be energized by the presence of an electrical pulse appearing on the plugboard hub connected thereto; a plurality of stepping relays, each having a coil, an input terminal and a plurality of output terminals, means for connecting the input terminal of a stepping relay succesively to different output terminals thereof in response to successive energizations of the coil thereof; a second group of hubs on said plugboard corresponding to and connected separately to all of the output terminals of said stepping relays; a plurality of electrical connections from selected hubs of said first group of hubs to selected hubs of said second group of hubs; circuit means for connecting said pulse generator to the coil and input terminal of said stepping relays; a plurality of manually operable switches; and means responsive to the operation of any one of said switches for connecting the circuit from said pulse generator to the coil and input terminal of a desired stepping relay, each of said switches having a different stepping relay associated therewith.

7. Apparatus as set forth in claim 6 further including a clear function program device having a switch member, a plurality of output terminals and a pulse operated means for moving said switch member into successive engagement with all of said output terminals; a plurality of electrical connections one each from different of said clear function program device output terminals to each of said transfer means for transferring numerical information from said accumulating register to said typewriter; a manually operable clear switch; and means responsive to operation of said clear switch for starting said pulse generator and for connecting said pulse generator to the pulse operated means and switch member of said clear function program device.

8. Programming apparatus of the character described, comprising: a typewriter; a computer unit having a plurality of accumulating registers; a pulse generator means for generating a series of electrical pulses; a plurality of electrical pulse energized transfer means in said computer unit operable when energized by said pulse generator means to utilize said pulses to transfer numerical information from said typewriter to any desired register, from one desired register to another, or from any desired register back to said typewriter; there being a separate transfer means for transferring numerical information from said typewriter to each one of said registers, a separate transfer means for transferring numerical information from one of said registers to each one of the other registers, and a separate transfer means for transferring numerical information from each one of said registers to said typewriter; a plugboard; a first group of hubs on said plugboard, each hub corresponding to and separately connected to each of said plurality of transfer means whereby any of said transfer means may be energized by the presence of an electrical pulse appearing on the plugboard hub connected thereto; a plurality of stepping relays, each having a coil, an input terminal and a plurality of output terminals, means for connecting the input terminal of a stepping relay successively to different output terminals thereof in response to successive energizations of the coil thereof; a second group of hubs on said plugboard corresponding to and connected separately to all of the output terminals of said stepping relays; a plurality of electrical connections from selected hubs of said first group of hubs to selected hubs of said second group of hubs; circuit means for connecting said pulse generator to the coil and input terminal of a desired one of said stepping relays; and means responsive to the energization of one of the output terminals of said desired stepping relay for connecting said pulse generator to the coil and input terminal of another desired stepping relay.

9. Programming apparatus of the character described, comprising: a typewriter; a computer unit having a plurality of accumulating registers; a pulse generator means for generating a series of electrical pulses; a plurality of electrical pulse energized transfer means in said computer unit operable when energized by said pulse generator means to utilize said pulses to transfer numerical information from said typewriter to any desired register, from one desired register to another, or from any desired register back to said typewriter, there being a separate transfer means for transferring numerical information from said typewriter to each one of said registers, a separate transfer means for transferring numerical information from one of said registers to each one of the other registers, and a separate transfer means for transferring numerical information from each one of said registers to said typewriter; a plugboard; a first group of hubs on said plugboard, each hub corresponding to and separately connected to each of said plurality of transfer means whereby any of said transfer means may be energized by the presence of an electrical pulse appearing on the plugboard hub connected thereto; a plurality of stepping relays, each having a coil, an input terminal and a plurality of output terminals, means for connecting the input terminal of a stepping relay successively to different output terminals thereof in response to successive energizations of the coil thereof; a second group of hubs on said plugboard corresponding to and connected separately to all of the output terminals of said stepping relays; a plurality of electrical connections from selected hubs of said first group of hubs to selected hubs of said second group of hubs; circuit means for connecting said pulse generator to the coil and input terminal of said stepping relays; a plurality of manually operable switches; means responsive to the operation of any one of said switches for connecting the circuit from said pulse generator to the coil and input terminal of a desired stepping relay, each of said switches having a different stepping relay associated therewith; and means for temporarily disconnecting the connected circuits from the pulse generator to the coil and input terminal of said desired stepping relay during the operation of any of said transfer means.

10. Programming apparatus of the character described, comprising: a typewriter; a computer unit having an input register, first and second accumulating registers and a multiplicand register; a pulse generator means for generating a series of electrical pulses; first transfer means operable when electrically energized to allow transfer of numerical information from said typewriter to said input register; second, third, fourth, fifth, sixth and seventh transfer means operable when electrically energized to utilize said pulses to transfer numerical information respectively from said input register to said first accumulating register from said input register to said second accumulating register, from said first accumulating register to said second accumulating register, from said input register to said multiplicand register, from said first accumulating register to said typewriter and from said second accumulating register to said typewriter; eighth and ninth transfer means operable when electrically energized to cause the numerical transfers by said second, third and fourth transfer means to be in positive and negative form respectively; tenth transfer means operable when electrically energized for repeatedly transferring numerical information from said input register to said first accumulating register a number of times in accordance with a number stored in said multiplicand register; a program device having a switch member, a plurality of output terminals and a pulse operated means for moving said switch member into successive engagement with all of said output terminals; a plurality of electrical connections from said output terminals to preselected of said transfer means whereby said switch member may be successively connected to different of said transfer means in a predetermined program; a manually operable switch; and means responsive to the operation of said manually operable switch for connecting said pulse generator to the pulse operated means and switch member of said program device.

11. Apparatus as set forth in claim 10 further including pulse energizable means operable when energized to cause said typewriter to perform a desired typewriter function, and an electrical connection from one of said output terminals to said last named pulse energizable means.

12. Programming apparatus of the character described, comprising: a typewriter; a computer unit having an input register, first and second accumulating registers and a multiplicand register; a pulse generator means for generating a series of electrical pulses; first transfer means operable when electrically energized to allow transfer of numerical information from said typewriter to said input register; second, third, fourth, fifth, sixth and seventh transfer means operable when electrically energized to utilize said pulses to transfer numerical information respectively from said input register to said first accumulating register, from said input register to said second accumulating register, from said first accumulating register to said second accumulating register, from said input register to said multiplicand register, from said first accumulating register to said typewriter and from said second accumulating register to said typewriter; eighth and ninth transfer means operable when electrically energized to cause the numerical transfers by said second, third and fourth transfer means to be in positive and negative form respectively; tenth transfer means operable when electrically energized for repeatedly transferring numerical information from said input register to said first accumulating register a number of times in accordance with a number stored in said multiplicand register; a plurality of program devices each having a switch member, a plurality of output terminals and a pulse operated means for moving said switch member into successive engagement with all of said output terminals; a plurality of electrical connections from selected output terminals of said program devices to selected of said transfer means whereby the switch members of each program device may be successively connected to different transfer means in predetermined sequences; a plurality of manually operable switches; and means responsive to the operation of any one of said manually operable switches for connecting said pulse generator to the pulse operated means and switch member of a desired program device, each of said manually operable switches having a different program device associated therewith.

13. Programming apparatus of the character described, comprising: a typewriter; a computer unit having an input register, first and second accumulating registers and a multiplicand register; a pulse generator means for generating a series of electrical pulses; first transfer means operable when electrically energized to allow transfer of numerical information from said typewriter to said input register; second, third, fourth, fifth, sixth and seventh transfer means operable when electrically energized to utilize said pulses to transfer numerical information respectively from said input register to said first accumulating register, from said input register to said second accumulating register, from said first accumulating register to said second accumulating register, from said input register to said multiplicand register, from said first accumulating register to said typewriter and from said second accumulating register to said typewriter; eighth and ninth transfer means operable when electrically energized to cause the numerical transfers by said second, third and fourth transfer means to be in positive and negative form respectively; tenth transfer means operable when electrically energized for repeatedly transferring numerical information from said input register to said first accumulating register a number of times in accordance with a number stored in said multiplicand register; a plugboard; a first group of hubs on said plugboard corresponding to and separately connected to said transfer means whereby any of said ten transfer means may be separately electrically energized upon energization of the hub connected thereto; a stepping relay having a coil, an input terminal, a plurality of output terminals, and means for connecting said input terminal successively to different of said output terminals in response to successive energizations of said coil; a second group of hubs on said plugboard corresponding to and connected separately to all of said output terminals of said stepping relay; a plurality of electrical connections from different of said second group of hubs to selected ones of said first group of hubs whereby said stepping relay output terminals of said stepping relay may be successively connected to preselected of said transfer means; and circuit means for connecting said pulse generator to said stepping relay coil and input terminal.

14. Apparatus as set forth in claim 13 further including a clear function stepping relay having a coil, an input terminal, a plurality of output terminals and means for connecting said input terminal successively to different of said output terminals in response to successive energizations of said coil; a permanent connection from one of said output terminals to said sixth transfer means; a permanent connection from another of said output terminals to said seventh transfer means; a manually operable clear switch; means responsive to operation of said clear switch for starting said pulse generator and for connecting said pulse generator to said coil and input terminal of said clear function stepping relay.

15. Apparatus as set forth in claim 13 further including pulse energizable means operable when energized to cause said typewriter to perform a desired typewriter function, a hub on said plugboard connected to said last named pulse energizable means, and an electrical connection from said last named hub to a selected one of said second group of hubs.

16. Programming apparatus of the character described, comprising: a typewriter; a computer unit having an input register, first and second accumulating registers and a multiplicand register; a pulse generator means for generating a series of electrical pulses; first transfer means operable when electrically energized to allow transfer of numerical information from said typewriter to said input register; second, third, fourth, fifth, sixth and seventh transfer means operable when electrically energized to utilize said pulses to transfer numerican information respectively from said input register to said first accumulating register, from said input register to said second accumulating register, from said first accumulating register to said second accumulating register, from said input register to said multiplicand register, from said first accumulating register to said typewriter and from said second accumulating register to said typewriter; eighth and ninth transfer means operable when electrically energized to cause the numerical transfers by said second, third and fourth transfer means to be in positive and negative form respectively; tenth transfer means operable when electrically energized for repeatedly transferring numerical information from said input register to said first accumulating register a number of times in accordance with a number stored in said multiplicand register; a plugboard; a first group of hubs on said plugboard corresponding to and separately connected to said transfer means whereby any of said ten transfer means may be separately electrically energized upon energization of the hub connected thereto; a plurality of stepping relays, each having a coil, an input terminal and a plurality of output terminals, means for connecting the input terminal of a stepping relay successively to different output terminals thereof in response to successive energizations of the coil thereof; a second group of hubs on said plugboard corresponding to and connected separately to all of the output terminals of said stepping relays; a plurality of electrical connections from selected hubs of said first groups of hubs to selected hubs of said second group of hubs; circuit means for connecting said pulse generator to the coil and input terminal of a desired one of said stepping relays; and means responsive to the energization of one of the output terminals of said desired stepping relay for connecting said pulse generator to the coil and input terminal of another desired stepping relay.

17. Programming apparatus of the character described, comprising: a typewriter; a computer unit having an input register, first and second accumulating registers and a multiplicand register; a pulse generator means for generating a series of electrical pulses; first transfer means operable when electrically energized to allow transfer of numerical information from said typewriter to said input register; second, third, fourth, fifth, sixth and seventh transfer means operable when electrically energized to utilize said pulses to transfer numerical information respectively from said input register to said first accumulating register, from said input register to said second accumulating register, from said first accumulating register to said second accumulating register, from said input register said multiplicand register, from said first accumulating register ot said typewriter and from said second accumulating register to said typewriter; eighth and ninth transfer means operable when electrically energized to cause the numerical transfers by said second, third and fourth transfer means to be in positive and negative form respectively; tenth transfer means operable when electrically energized for repeatedly transferring numerical information from said input register to said first accumulating register a number of times in accordance with a number stored in said multiplicand register; a plugboard; a first group of hubs on said plugboard corresponding to and separately connected to said transfer means whereby any of said ten transfer means may be separately electrically energized upon energization of the hub connected thereto; a plurality of stepping relays, each having a coil, an input terminal and a plurality of output terminals, means for connecting the input terminal of a stepping relay successively to different output terminals thereof in response to successive energizations of the coil thereof; a second group of hubs on said plugboard corresponding to and connected separately to all of the output terminals of said stepping relays; a plurality of electrical connections from selected hubs of said first group of hubs to selected hubs of said second group of hubs; circuit means for connecting said pulse generator to the coil and input terminal of said stepping relays; a plurality of manually operable switches; means responsive to the operation of any one of said switches for connecting the circuit from said pulse generator to the coil and input terminal of a desired stepping relay, each of said switches having a different stepping relay associated therewith; and means for temporarily disconnecting the connected circuits from the pulse generator to the coil and input terminal of said desired stepping relay during the operation of any of said transfer means.

References Cited in the file of this patent

UNITED STATES PATENTS

| | | |
|---|---|---|
| 2,262,235 | Hofgaard | Nov. 11, 1941 |
| 2,658,681 | Palmer et al. | Nov. 10, 1953 |
| 2,728,521 | Benson et al. | Dec. 27, 1955 |
| 2,812,902 | Runde et al. | Nov. 12, 1957 |
| 2,842,310 | Matthew | July 8, 1958 |
| 2,878,872 | Burns et al. | Mar. 24, 1959 |